United States Patent
Liang et al.

(10) Patent No.: US 12,497,603 B2
(45) Date of Patent: Dec. 16, 2025

(54) CAS EFFECTOR PROTEINS, GENE EDITING SYSTEMS, AND USES THEREOF

(71) Applicants: GUANGZHOU REFORGENE MEDICINE CO., LTD., Guangdong (CN); ZHEJIANG SYNSORBIO TECHNOLOGY CO., LTD., Zhejiang (CN)

(72) Inventors: Junbin Liang, Guangzhou (CN); Liancheng Huang, Guangzhou (CN); Hui Xu, Guangzhou (CN); Yang Sun, Shaoxing (CN); Zhiqin Peng, Guangzhou (CN); Kaiwei Si, Guangzhou (CN); Desheng Huangfu, Guangzhou (CN)

(73) Assignees: GUANGZHOU REFORGENE MEDICINE CO., LTD., Guangzhou (CN); ZHEJIANG SYNSORBIO TECHNOLOGY CO., LTD., Shaoxing (CN)

( * ) Notice: Subject to any disclaimer, the term of this patent is extended or adjusted under 35 U.S.C. 154(b) by 0 days.

(21) Appl. No.: 18/957,929

(22) Filed: Nov. 25, 2024

(65) Prior Publication Data
US 2025/0197827 A1    Jun. 19, 2025

Related U.S. Application Data

(63) Continuation of application No. PCT/CN2023/096059, filed on May 24, 2023.

(30) Foreign Application Priority Data

May 25, 2022   (CN) .......................... 202210576535.8

(51) Int. Cl.
| | |
|---|---|
| C12N 9/22 | (2006.01) |
| C12N 15/11 | (2006.01) |
| C12N 15/70 | (2006.01) |
| C12Q 1/34 | (2006.01) |
| C12Q 1/6823 | (2018.01) |

(52) U.S. Cl.
CPC .............. *C12N 9/22* (2013.01); *C12N 15/111* (2013.01); *C12N 15/70* (2013.01); *C12Q 1/34* (2013.01); *C12Q 1/6823* (2013.01); *C07K 2319/09* (2013.01); *C12N 2310/20* (2017.05); *G01N 2333/922* (2013.01)

(58) Field of Classification Search
CPC ........ C12N 9/22; C12N 15/111; C12N 15/70; C12N 2310/20; C12Q 1/34; C12Q 1/6823; C07K 2319/09; G01N 2333/922
See application file for complete search history.

(56) References Cited

U.S. PATENT DOCUMENTS

| | | |
|---|---|---|
| 2016/0298096 A1 | 10/2016 | Charpentier et al. |
| 2018/0155716 A1 | 6/2018 | Zhang et al. |
| 2019/0225955 A1 | 7/2019 | Liu et al. |
| 2019/0367893 A1 | 12/2019 | Van Der Oost et al. |
| 2020/0283755 A1 | 9/2020 | Zhang et al. |

FOREIGN PATENT DOCUMENTS

| | | |
|---|---|---|
| CN | 113403294 A | 9/2021 |
| CN | 114934031 A | 8/2022 |

OTHER PUBLICATIONS

Witkowski et al., Biochemistry 38:11643-11650, 1999.*
Tang et al., Phil Trans R Soc B 368:20120318, 1-10, 2013.*
Seffernick et al., J. Bacteriol. 183(8):2405-2410, 2001.*
Singh et al., Current Protein and Peptide Science 19(1):5-15, 2018.*
Sadowski et al., Current Opinion in Structural Biology 19:357-362, 2009.*
Haft et al., GenBank accession No. WP_294519280 Jul. 12, 2023.*
International Search Report in PCT/CN2023/096059 mailed on Sep. 3, 2023, 10 pages.
Written Opinion in PCT/CN2023/096059 mailed on Sep. 3, 2023, 8 pages.
Hiroshi Nishimasu et al., Crystal Structure of *Staphylococcus aureus* Cas9, Cell, 162(5): 1113-1126, 2015.
Daniel H. Haft et al., A Guild of 45 CRISPR-Associated (Cas) Protein Families and Multiple CRISPR/Cas Subtypes Exist in Prokaryotic Genomes, PLoS Computational Biology, 1(6): 0474-0483, 2005.
Michael Richter et al., Shifting the genomic gold standard for the prokaryotic species definition, Proc Natl Acad Sci USA, 106(45): 19126-19131, 2009.
Hu, Ziying et al., A compact Cas9 ortholog from *Staphylococcus auricularis* (SauriCas9) expands the DNA targeting scope, PLOS Biology, 2020, 18 pages.
"GCA_902786545.1, NCBI database", Feb. 15, 2020.
"RUG13183, NCBI database", Dec. 27, 2018.
"WP_085022725.1, NCBI database", Jun. 2, 2024.

* cited by examiner

*Primary Examiner* — Delia M Ramirez
(74) *Attorney, Agent, or Firm* — METIS IP LLC

(57) ABSTRACT

Provided are a novel Cas effector protein, a gene editing system, and uses thereof. The Cas effector protein is CasRfg.3 and similar proteins. The CasRfg.3 (also referred to as Ca2) protein of the present disclosure has a relatively shorter amino acid sequence compared to the commonly used SpCas9 protein, allowing it to be easily packaged into small-capacity gene therapy vectors. The CasRfg.3 corresponds to a unique PAM sequence. Additionally, the CasRfg.3 exhibits excellent specificity in targeting and editing nucleic acid sequences, shows good adaptation to temperature variations, and has a wide temperature tolerance range, functioning effectively under high-temperature conditions, such as being capable of cleaving or modifying target nucleic acids at temperatures ranging from 25° C. to 55° C. The novel Cas effector protein of the present disclosure has significant application value in fields like gene therapy.

10 Claims, 15 Drawing Sheets

Specification includes a Sequence Listing.

SEQ ID NO: 9

FIG. 15

CAS EFFECTOR PROTEINS, GENE EDITING SYSTEMS, AND USES THEREOF

CROSS-REFERENCE TO RELATED APPLICATIONS

This application is a Continuation of International Application No. PCT/CN2023/096059, filed on May 24, 2023, which claims priority to Chinese Patent Application No. 202210576535.8, filed on May 25, 2022, the entire contents of each of which are incorporated herein by reference.

SEQUENCE LISTING

The instant application contains a Sequence Listing which has been submitted electronically in XML format and is hereby incorporated by reference in its entirety. The XML copy, created on Mar. 4, 2025, is named "2025 Mar. 4-Sequence Listing-20954-0001US00", and is 108,209 bytes in size.

TECHNICAL FIELD

The present disclosure relates to the technical field of gene editing, and in particular, to novel Cas effector proteins, gene editing systems, and uses thereof.

BACKGROUND

A CRISPR-CAS system may be categorized into two major classes: Class 1 and Class 2 CRISPR-CAS systems. The Class 1 CRISPR-CAS system utilizes complexes composed of multiple Cas proteins to degrade exogenous nucleic acids, and the Class 2 CRISPR-CAS system employs a single large Cas effector protein to degrade exogenous nucleic acids. The Class 1 CRISPR-CAS system may be further divided into types I, III, and IV, while the Class 2 CRISPR-CAS system may be divided into types II, V, and VI. These six types further segmented into at least 19 subtypes. Most CRISPR-CAS systems possess a Cas1 protein. Many prokaryotes harbor multiple CRISPR-CAS systems, indicating these systems may coexist and potentially share certain components.

Cas9 is one of the first and most representative Cas proteins discovered in *Streptococcus pyogenes*, and it belongs to the type II of the Class 2 CRISPR-CAS system. SpCas9, derived from *Streptococcus pyogenes*, is currently the most commonly used Cas9. Cas9 is a DNA endonuclease activated by a small crRNA molecule complementary to a target DNA sequence and a single, separate trans-activating CRISPR RNA (tracrRNA). The crRNA consists of a direct repeat (DR) sequence, responsible for binding the protein with crRNA, and a spacer sequence (guide sequence). The spacer sequence may be artificially designed to complement specific target nucleic acid sequence. In this manner, the CRISPR system can target DNA or RNA targets through the artificial design of the spacer sequence of the crRNA. The crRNA may be fused with the tracrRNA to form a single-guide RNA (sgRNA) for enhanced functionality. The sgRNA, when combined with Cas9, binds to its target DNA and directs Cas9 to bind or cleave the target DNA.

There is an ongoing need to develop reagents with improved sequence-specific nucleic acid detection, cleavage, and modulation that can be applied under various experimental conditions in the fields of genetic research and genome editing.

Current sequence-specific genome editing tools, including Cas9, may not be used under all conditions or in all organisms. For example, sequence-specific nucleases are generally sensitive to heat and are thus unsuitable for use in strictly thermophilic microorganisms. Strictly thermophilic microorganisms refer to those that grow at temperatures between 41° C. and 122° C., and optimally thrive in a range of 45° C.-80° C. Examples of the strictly thermophilic microorganisms include microorganisms used in industrial fermentation or microorganisms for in vitro applications at higher temperatures.

To date, SpCas9 from *Streptococcus pyogenes* and SaCas9 from *Staphylococcus aureus* are the most well-characterized and widely used Cas9 for genome engineering. Reports indicate that SpCas9 becomes inactive at temperatures ≥42° C., while SaCas9 unfolds and loses activity at ≥36° C.

SpCas9 is relatively large, at 1,368 amino acids, which significantly limits its application. Researchers from Fudan University truncated SpCas9 to 1,248 amino acids, retaining a certain degree of activity, but its size is still large, making it challenging to package it together with gRNA coding sequences into adeno-associated viruses (AAV).

Moreover, existing Cas proteins have limitations in terms of the gene editing targets they can select, such as being constrained by the insufficient diversity of PAM sequences.

SUMMARY

The present disclosure aims to provide novel Cas effector proteins, gene editing systems, and uses thereof.

A first aspect of the present disclosure provides a CRISPR-CAS complex comprising:
(1) a Cas9 protein; and
(2) a guide RNA.

The Cas9 protein has a feature selected from any one of (a)-(f) below or any combination thereof:
(a) isolated from a strain of *Anaerovibrio* sp. of the phylum Firmicutes;
(b) containing or being the polypeptide set forth in SEQ ID NO: 1, or containing or being a conservative variant of the polypeptide set forth in SEQ ID NO: 1 or a homolog thereof;
(c) containing a RuvC domain and an HNH domain;
(d) capable of forming a complex with a guide RNA, binding to a target nucleic acid under the guidance of a guide RNA, or cleaving or modifying the target nucleic acid under the guidance of a guide RNA;
(e) recognizing a PAM sequence as shown in 5'-DDRGDNN-3', where D represents A, G, or T, R represents A or G, and N represents A, C, G, or T; and
(f) performing any of the functions in (d) at a temperature ranging from 25° C. to 55° C.

In one or more embodiments, the Cas9 protein comprises a polypeptide selected from the group consisting of:
(i) a polypeptide having the amino acid sequence set forth in SEQ ID NO: 1;
(ii) a polypeptide that has at least 90% (preferably at least 92%; more preferably at least 94%; more preferably at least 95%, such as at least 96%, 98%, 99%, or 99.5%) sequence identity to the amino acid sequence of polypeptide set forth in SEQ ID NO: 1;
(iii) a polypeptide formed by substituting, deleting, or adding one or more (e.g., 1-60, preferably 1-50, more preferably 1-40, more preferably 1-30, more preferably 1-20, more preferably 1-15, more preferably 1-10, more preferably 1-5, more preferably 1-3, or 1-2)

amino acid residues in the amino acid sequence of the polypeptide in (i), and retaining the function of the polypeptide in (i);

(iv) a fragment of any one of the polypeptides in (i)-(iii) that contains a RuvC domain, a HNH domain, and a domain for binding to a target nucleic acid sequence, and retains the function of the polypeptide in (i); and (v) a polypeptide formed by adding to the N or C terminus of any of the aforementioned polypeptides (i)-(iv) a sequence including (but not limited to) a tag sequence, a localization sequence (such as a nuclear localization sequence), or a signal peptide sequence.

In one or more embodiments, the polypeptide has a conserved RuvC structural domain sequence.

In one or more embodiments, the polypeptide has a conserved HNH structural domain sequence.

In one or more embodiments, the Cas9 protein is a Cas9-nickase, which is a variant of the Cas9 protein. The Cas9-nickase is capable of binding to a target nucleic acid sequence under the guidance of the guide RNA and cleaving a single strand of the target nucleic acid. Preferably, the Cas9-nickase contains mutations at one or more of D10, E520, H603, N626, H749, or D752 of the amino acid sequence of the polypeptide set forth in SEQ ID NO: 1.

In one or more embodiments, the Cas9 protein is a dCas9 (dead Cas9), which is a variant of the Cas9 protein comprising an inactivated RuvC structural domain and an inactivated HNH structural domain, or a reduced or lost nucleic acid cleavage function thereof. The dCas9 is capable of binding to a target nucleic acid sequence under the guidance of the guide RNA. Preferably, the dCas9 contains mutations at one or more of D10, E520, H603, N626, H749, or D752 of the amino acid sequence of the polypeptide set forth in SEQ ID NO: 1.

In one or more embodiments, the guide RNA includes a guide sequence, a direct repeat sequence (DR sequence), and a trans-activating crRNA (tracrRNA) sequence. The guide sequence is complementary to a target sequence, and the tracrRNA interacts with the Cas9 protein and the DR sequence.

In one or more embodiments, the tracrRNA is linked to the DR sequence to become a scaffold sequence of the guide RNA, and the scaffold sequence has a length in a range of ≤190 nt. The length of the scaffold sequence may also be ≤100 nt, ≤110 nt, ≤120 nt, ≤130 nt, ≤140 nt, ≤150 nt, ≤160 nt, ≤170 nt, or ≤180 nt.

In one or more embodiments, the guide sequence has a length in a range of 10 nt-60 nt. The length of the guide sequence may also be 10 nt-50 nt, 10 nt-40 nt, 10 nt-30 nt, 15 nt-60 nt, 15 nt-50 nt, 15 nt-40 nt, or 15 nt-30 nt.

In one or more embodiments, the guide RNA includes a stem-loop (hairpin) structure. Preferably, the guide RNA includes ≤3 stem-loop (hairpin) structures. More preferably, the guide RNA includes a skeleton containing a stem-loop 1, a stem-loop 2, a stem-loop 3, a bulge 1, and a duplex 1, as shown in FIG. 18.

In one or more embodiments, a stem portion of the stem-loop 1 has 8 to 35 (e.g., 10, 12, 14, 16, 18, 20, 22, 24, 26, 28, 30, 32) base pairs; or a stem portion of the stem-loop 2 has 4 to 12 (e.g., 5, 6, 7, 8, 9, 10, 11) base pairs; or a stem portion of the stem-loop 3 has 3 to 10 (e.g., 4, 5, 6, 7, 8, 9) base pairs; or the duplex 1 has 4 to 11 (e.g., 5, 6, 7, 8, 9, 10) base pairs; or the bulge 1 has 2-8 (e.g., 4, 6) non-complementary bases; or a loop portion of the stem-loop 1 has 4 to 12 (e.g., 5, 6, 7, 8, 9, 10, 11, 12) non-complementary bases; or a loop portion of the stem-loop 2 has 2 to 10 (e.g., 3, 4, 5, 6, 7, 8, 9) non-complementary bases; or a loop portion of the stem-loop 3 has 6 to 20 (e.g., 7, 8, 9, 10, 12, 15, 18, 19) non-complementary bases.

In one or more embodiments, the stem-loop structure includes a skeleton containing the stem-loop 1, the stem-loop 2, the stem-loop 3, the bulge 1, the duplex 1, and optionally other stem-loop structures or segments.

In one or more embodiments, the guide RNA has the nucleotide sequence set forth in SEQ ID NO: 3 or a truncated form thereof. Preferably, the truncated form has a nucleotide sequence set forth in any one of SEQ ID NOs: 4-7.

In one or more embodiments, DNA encoding the guide RNA is included in an expression vector.

In one or more embodiments, the complex (compound) comprises a combination, a composition or a mixture.

In one or more embodiments, the Cas9 protein is capable of performing any one of the following functions at 25° C. to 55° C.: forming a complex with a guide RNA, binding to a target nucleic acid under the guidance of the guide RNA, and cleaving or modifying the target nucleic acid under the guidance of the guide RNA.

In one or more embodiments, the PAM sequence recognized by the Cas9 protein is shown as 5'-DDRGDNN-3', wherein D represents A, G, or T, R represents A or G, and N represents A, C, G or T.

Another aspect of the present disclosure provides an isolated Cas9 protein. The Cas9 protein has one or more of the features selected from the group consisting of (a) through (f), or any combination thereof:

(a) isolated from a strain of *Anaerovibrio* sp. of the phylum Firmicutes;

(b) containing or being the polypeptide set forth in SEQ ID NO: 1, or containing or being a conservative variant of the polypeptide set forth in SEQ ID NO: 1 or a homolog thereof;

(c) containing a RuvC domain and an HNH domain;

(d) capable of forming a complex with a guide RNA, binding to a target nucleic acid under the guidance of a guide RNA, or cleaving or modifying the target nucleic acid under the guidance of a guide RNA;

(e) a PAM sequence recognized by the Cas9 protein as shown in 5'-DDRGDNN-3', where D represents A, G, or T, R represents A or G, and N represents A, C, G, or T; and (f) performing any of the functions in (d) at a temperature ranging from 25° C. to 55° C.

In one or more embodiments, the Cas9 protein comprises a polypeptide selected from the group consisting of:

(i) a polypeptide having the amino acid sequence set forth in SEQ ID NO: 1;

(ii) a polypeptide that has at least 90% (preferably at least 92%; more preferably at least 94%; more preferably at least 95%, such as at least 96%, 98%, 99%, or 99.5%) sequence identity to the amino acid sequence of polypeptide set forth in SEQ ID NO: 1;

(iii) a polypeptide formed by substituting, deleting, or adding one or more (e.g., 1-60, preferably 1-50, more preferably 1-40, more preferably 1-30, more preferably 1-20, more preferably 1-15, more preferably 1-10, more preferably 1-5, more preferably 1-3, or 1-2) amino acid residues in the amino acid sequence of the polypeptide in (i), and retaining the function of the polypeptide in (i);

(iv) a fragment of any one of the polypeptides in (i)-(iii) that contains a RuvC domain, a HNH domain, and a domain for binding to a target nucleic acid sequence, and retains the function of the polypeptide in (i); and (v) a polypeptide formed by adding to the N or C terminus of any of the aforementioned polypeptides (i)-(iv) a sequence including (but not limited to) a tag sequence, a localization sequence (such as a nuclear localization sequence), or a signal peptide sequence.

In one or more embodiments, the Cas9 protein is a Cas9-nickase, which is a variant of the Cas9 protein. The Cas9-nickase is capable of binding to a target nucleic acid sequence under the guidance of the guide RNA and cleaves a single strand of the target nucleic acid. Preferably, the Cas9-nickase contains mutations at one or more of D10, E520, H603, N626, H749, or D752 of the amino acid sequence of the polypeptide set forth in SEQ ID NO: 1.

In one or more embodiments, the Cas9 protein is a dCas9 (dead Cas9), which is a variant of the Cas9 protein comprising an inactivated RuvC structural domain and an inactivated HNH structural domain, or a reduced or lost nucleic acid cleavage function thereof. The dCas9 is capable of binding to a target nucleic acid sequence under the guidance of the guide RNA. Preferably, the dCas9 contains mutations at one or more of D10, E520, H603, N626, H749, or D752 of the amino acid sequence of the polypeptide set forth in SEQ ID NO: 1.

In one or more embodiments, the guide RNA includes a guide sequence, a homologous repeat sequence (DR sequence), and a trans-activating crRNA (tracrRNA) sequence. The guide sequence is complementary to a target sequence, and the tracrRNA interacts with the Cas9 protein and the DR sequence.

In one or more embodiments, the tracrRNA is linked to the DR sequence to become a scaffold sequence of the guide RNA, and the scaffold sequence has a length in a range of ≤190 nt. The length of the scaffold sequence may also be ≤100 nt, ≤110 nt, ≤120 nt, ≤130 nt, ≤140 nt, ≤150 nt, ≤160 nt, ≤170 nt, or ≤180 nt.

In one or more embodiments, the guide sequence has a length ranging from 10 nt-60 nt. The length of the guide sequence may also be 10 nt-50 nt, 10 nt-40 nt, 10 nt-30 nt, 15 nt-60 nt, 15 nt-50 nt, 15 nt-40 nt, or 15 nt-30 nt.

In one or more embodiments, the guide RNA includes a stem-loop (hairpin) structure. Preferably, the guide RNA includes ≤3 stem-loop (hairpin) structures. More preferably, the guide RNA includes a skeleton containing a stem-loop 1, a stem-loop 2, a stem-loop 3, a bulge 1, and a duplex 1, as shown in FIG. 18.

In one or more embodiments, the Cas9 protein is capable of performing any one of the following functions at 25° C. to 55° C.: forming a complex with a guide RNA, binding to a target nucleic acid under the guidance of the guide RNA, and cleaving or modifying the target nucleic acid under the guidance of the guide RNA.

In one or more embodiments, the PAM sequence recognized by the Cas9 protein is shown as 5'-DDRGDNN-3', wherein D represents A, G, or T, R represents A or G, and N represents A, C, G or T.

Another aspect of the present disclosure provides a fusion protein comprising: any one of the Cas9 proteins described above, and a heterologous functional structural domain fused thereto.

In one or more embodiments, the heterologous functional structural domain is fused to an N-terminus, a C-terminus, or an internal portion of the Cas9 protein.

In one or more embodiments, the heterologous functional structural domain is selected from: a reporter protein or detection tag, a localization signal, a deaminase, a DNA-binding domain, an epitope tag, a transcriptional activation domain, a transcriptional repression domain, a nuclease, a methylase, a demethylase, a histone deacetylase (HDAC), a DNA or RNA ligase, or any combination thereof.

In one or more embodiments, the heterologous functional structural domain is selected from: an adenosine deaminase, a cytidine deaminase, a base excision repair inhibitor, a nuclear localization signal (NLS), a nuclear export signal (NES), or any combination thereof.

In one or more embodiments, the heterologous functional structural domain is linked to the Cas9 protein through a linker.

Another aspect of the present disclosure provides a conjugate. The conjugate comprises: any one of the Cas9 proteins described above, and a heterologous functional moiety conjugated thereto.

In one or more embodiments, the heterologous functional moiety is conjugated to a N-terminal, a C-terminal, or an internal portion of the Cas9 protein.

In one or more embodiments, the heterologous functional moiety is selected from: a reporter protein or detection marker, a localization signal, a deaminase, a DNA binding domain, an epitope tag, a transcriptional activation domain, a transcriptional repression domain, a nuclease, a methylase, a demethylase, a histone deacetylase (HDAC), a DNA or RNA ligase, a functional chemical molecule, or any combination thereof.

In one or more embodiments, the heterologous functional moiety is selected from: an adenosine deaminase, a cytidine deaminase (AID), a base excision repair inhibitor, a nuclear localization signal (NLS), a nuclear export signal (NES), or any combination thereof.

In one or more embodiments, there is a linker between the heterologous functional moiety and the Cas9 protein.

Another aspect of the present disclosure provides a guide RNA which guides any of the previously described Cas9 proteins bind to a target sequence. The guide RNA comprises a guide sequence, a direct repeat (DR) sequence, and a trans-activating crRNA (tracrRNA) sequence. The guide sequence is complementary to the target sequence, and the tracrRNA may interact with the Cas9 protein and the DR sequence.

In one or more embodiments, the tracrRNA is ligated to the DR sequence to become a scaffold sequence of the gRNA, and the scaffold sequence has a length in a range of 20 nt-190 nt.

In one or more embodiments, the guide RNA includes a stem-loop (hairpin) structure.

In one or more embodiments, the guide RNA includes ≤3 stem-loop (hairpin) structures.

In one or more embodiments, the stem-loop structure includes a skeleton containing a stem-loop 1, a stem-loop 2, a stem-loop 3, a bulge 1, and a duplex 1, as shown in FIG. 18.

In one or more embodiments, a stem portion of the stem-loop 1 has 8 to 35 (e.g., 10, 12, 14, 16, 18, 20, 22, 24, 26, 28, 30, 32) base pairs; or a stem portion of the stem-loop 2 has 4 to 12 (e.g., 5, 6, 7, 8, 9, 10, 11) base pairs; or a stem portion of the stem-loop 3 has 3 to 10 (e.g., 4, 5, 6, 7, 8, 9) base pairs; or the duplex 1 has 4 to 11 (e.g., 5, 6, 7, 8, 9, 10) base pairs; or the bulge 1 has 2-8 (e.g., 4, 6) non-complementary bases; or a loop portion of the stem-loop 1 has 4 to 12 (e.g., 5, 6, 7, 8, 9, 10, 11, 12) non-complementary bases; or a loop portion of the stem-loop 2 has 2 to 10 (e.g., 3, 4, 5, 6, 7, 8, 9) non-complementary bases; or a loop portion of the stem-loop 3 has 6 to 20 (e.g., 7, 8, 9, 10, 12, 15, 18, 19) non-complementary bases.

In one or more embodiments, the guide RNA has the nucleotide sequence set forth in SEQ ID NO: 3 or a truncated form thereof. Preferably, the truncated form has the nucleotide sequence set forth in any one of SEQ ID NOs: 4-7.

Another aspect of the present disclosure provides an isolated polynucleotide, which encodes any one of the aforementioned Cas9 proteins, any one of the aforementioned fusion proteins, or a protein portion of any one of the aforementioned conjugates.

In one or more embodiments, the polynucleotide is a natural sequence or a codon-optimized sequence.

In one or more embodiments, the polynucleotide of the Cas9 protein has the nucleotide sequence set forth in SEQ ID NO: 2, or a degenerate sequence thereof.

Another aspect of the present disclosure provides a recombinant vector. The recombinant vector contains (a) the polynucleotide as previously described, (b) a polynucleotide encoding any of the previously described guide RNAs, or a combination of (a) and (b).

In one or more embodiments, the polynucleotide is further operably linked to a promoter, an enhancer, and/or a terminator.

In one or more embodiments, the promoter includes a constitutive promoter, an inducible promoter, a broadly expressed promoter, or a tissue-specific promoter.

In one or more embodiments, the vector includes a viral vector or a non-viral vector. Preferably, the vector includes (but is not limited to): a lentiviral vector, an adenoviral vector, an adeno-associated viral vector (AAV), a retroviral vector, a phage vector, or a herpes simplex virus (HSV) vector.

Another aspect of the present disclosure provides a recombinant cell comprising any one of the recombinant vectors previously described.

In one or more embodiments, the recombinant cell includes a eukaryotic cell or a prokaryotic cell.

In one or more embodiments, the eukaryotic cell includes (but is not limited to): a mammalian cell (e.g., a non-human mammalian cell, a human cell), a plant cell, a fungal cell (e.g., yeast), or an insect cell.

In one or more embodiments, the prokaryotic cell includes (but is not limited to): *Escherichia coli, Bacillus subtilis, Salmonella, Clostridium,* or *Streptomyces.*

Another aspect of the present disclosure provides a method for preparing any one of the aforementioned Cas9 proteins, any one of the aforementioned fusion proteins, or a protein portion of any one of the aforementioned conjugates. The method comprises: culturing the aforementioned recombinant cell, and isolating the Cas9 protein, the fusion protein, or the protein portion of the conjugate from the culture.

Another aspect of the present disclosure provides any one of the aforementioned Cas9 proteins, any one of the aforementioned fusion proteins, a protein portion of any one of the aforementioned conjugates, or any one of the aforementioned CRISPR-CAS complexes for use in binding, cleaving, or modifying a target nucleic acid sequence, or for use in preparing a reagent for binding, cleaving, or modifying the target nucleic acid sequence.

In one or more embodiments, the Cas9 protein, the fusion protein, or the conjugate forms a complex with the guide RNA to bind, cleave, or modify a nucleic acid sequence at a specific site of the target nucleic acid sequence. Preferably, a PAM sequence, 5'-DDRGDNN-3', is present near the specific site of the target nucleic acid sequence, where D represents A, G, or T; R represents A or G; and N represents A, C, G, or T.

In one or more embodiments, the Cas9 protein is a Cas9 nuclease, which is used to cleave a target nucleic acid sequence, or is used to prepare a reagent to cleave the target nucleic acid sequence.

In one or more embodiments, the Cas9 protein is a Cas9-nickase, which is used to bind or cleave a target nucleic acid sequence, or is used to prepare a reagent that binds or cleaves the target nucleic acid sequence.

In one or more embodiments, the Cas9 protein is dCas9, which is used to modulate transcriptional activation or transcriptional repression of a target nucleic acid, or to prepare a reagent that modulates transcriptional activation or transcriptional repression of the target nucleic acid.

In one or more embodiments, the target nucleic acid is within a cell. Preferably, the target nucleic acid is: a disease-associated nucleic acid (target), or a plant or animal trait-associated nucleic acid (target).

In one or more embodiments, the target nucleic acid is DNA or RNA.

Another aspect of the present disclosure provides a delivery system. The delivery system comprises: a delivery vector; and any one of the previously described Cas9 proteins, any one of the previously described fusion proteins, any one of the previously described conjugates, any one of the previously described CRISPR-CAS complexes, or any one of the previously described vectors. Preferably, the delivery vector includes (but is not limited to): a nanoparticle, a liposome, and an extracellular vesicle.

Another aspect of the present disclosure provides a method for binding, cleaving, or modifying a target nucleic acid. The method comprises: causing any of the previously described CRISPR-CAS complexes to bind to, cleave, or modify the target nucleic acid.

In one or more embodiments, the target nucleic acid is within a cell. Preferably, the target nucleic acid is a disease-associated nucleic acid (target), or a plant or animal trait-associated nucleic acid (target).

In one or more embodiments, CRISPR-Cas complex (protein+guide RNA) is introduced directly into a cell to bind to the target nucleic acid. Preferably, the Cas9 protein in the CRISPR-Cas complex is processed (including injection) into the cell, or is introduced into the cell via a membrane-translocating peptide, and the guide RNA in the CRISPR-Cas complex is processed (including injection) into the cell.

In one or more embodiments, a polynucleotide encoding the CRISPR-Cas complex or an expression construct (e.g., an expression vector) containing the polynucleotide is introduced into the cell, where the polynucleotide or the expression construct is expressed and forms the CRISPR-Cas complex (protein+guide RNA) and binds to the target nucleic acid.

In one or more embodiments, the target nucleic acid is eukaryotic DNA or eukaryotic RNA.

In one or more embodiments, the eukaryotic DNA or eukaryotic RNA includes (but is not limited to): non-human mammalian DNA or RNA, non-human primate DNA or RNA, human DNA or RNA, plant DNA or RNA, insect DNA or RNA, avian DNA or RNA, reptilian DNA or RNA, rodent DNA or RNA, fish DNA or RNA, worm/nematode DNA or RNA, yeast DNA or RNA, or the like.

In one or more embodiments, the Cas9-nickase or dCas9-targeted target sequence is located in a promoter region.

In one or more embodiments, the method is performed at a temperature ranging from 25° C. to 55° C.

Another aspect of the present disclosure provides a method for detecting the presence of a target nucleic acid in a sample to be tested. The method comprises: causing any one of the previously described CRISPR-CAS complexes to bind to a target nucleic acid. The CRISPR-CAS complex includes any one of the aforementioned fusion proteins or any one of the aforementioned conjugates. The fusion protein or the conjugate contains a Cas9 protein and a detectable label. When the CRISPR-CAS complex binds to the target nucleic acid, the fusion protein or the conjugate containing the Cas9 protein binds to, cleaves, or modifies the target nucleic acid. The presence of the target nucleic acid in the sample to be tested is analyzed by observing the presence of the detectable label. Preferably, the detectable label includes a fluorescent group, a chromogenic agent, a developing agent, or a radioactive isotope.

Another aspect of the present disclosure provides a composition comprising: any one of the aforementioned Cas9 proteins, any one of the aforementioned fusion proteins, any one of the aforementioned conjugates, any one of the aforementioned CRISPR-CAS complexes, any one of the aforementioned vectors, or the aforementioned delivery system.

In one or more embodiments, the composition is a pharmaceutical composition.

In one or more embodiments, preferably, the composition further comprises a physiologically or pharmaceutically acceptable pharmacological carrier.

Another aspect of the present disclosure provides a kit or a drug kit comprising: any one of the aforementioned Cas9 proteins, any one of the aforementioned fusion proteins, any one of the aforementioned conjugates, any one of the aforementioned CRISPR-CAS complexes, any one of the aforementioned vectors, the delivery system, or the composition.

The foregoing is a general description of the present disclosure, and the following individual sections will provide a more detailed description of various aspects of the present disclosure. However, it should be noted that the description of the present disclosure should be understood as follows: to simplify and reduce redundancy, certain embodiments of the present disclosure are described only in one section, or only in the claims or examples. Therefore, it should also be understood that unless otherwise specifically stated or the combination is inappropriate, any embodiment of the present disclosure, including those described only in one aspect, one section, or only in the claims or examples, may be combined with any other embodiment described in the present disclosure.

BRIEF DESCRIPTION OF THE DRAWINGS

FIG. 15 is a schematic diagram comparing multiple sequence alignment of CasRfg.3, SaCas9, and SpCas9 for identification of catalytic residues in CasRfg.3;

DETAILED DESCRIPTION

Figure 1:
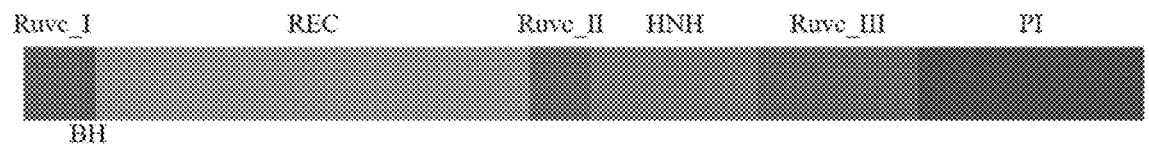
FIG. 1 is a schematic diagram illustrating a domain distribution of a CasRfg.3 protein.

The present inventors, after intensive research and screening, provide a novel Cas effector protein referred to as CasRfg.3 (also referred to as Ca2). The CasRfg.3 protein of the present disclosure has a relatively short amino acid sequence than the currently used SpCas9 protein, making it easily packable into small-capacity gene therapy vectors, such as AAV vectors. Additionally, the CasRfg.3 protein exhibits high specificity in targeting and editing nucleic acid sequences. The CasRfg.3 protein also has good temperature adaptability, with a wide temperature tolerance range, allowing it to function under high-temperature conditions, such as binding, cleaving, or modifying a target nucleic acid at a temperature between 25° C. and 55° C. This novel Cas effector protein has significant application value in fields such as gene therapy.

Terms

As used herein, "CasRfg.3 effector protein", "CasRfg.3", and "Ca2" are used interchangeably. "Cas9 protein" may include "Cas9 nuclease", or Cas9-nickase (Cas9n) or dCas9 modified on the basis of the Cas9 nuclease.

As used herein, "Cas9 nuclease" generally refers to the Cas9 protein in which the nuclease structural domain is not fully inactivated. Non-limiting examples include wild-type Cas9 and inactivated Cas9 (e.g., a Cas9 mutant that retains more than 99%, 95%, 90%, 80%, 70%, 60%, 50%, 40%, 30%, 20%, 10% or more of the nuclease activity of wild-type Cas9).

As used herein, the term "cleavage/cleaving/cleave" refers to the breaking of a covalent bond (e.g., a covalent phosphodiester bond) in the ribosyl phosphodiester backbone of a polynucleotide, including, but not limited to, the breaking of a single-stranded polynucleotide, the breaking of either single strand of a double-stranded polynucleotide that comprises two complementary single strands, and the breaking of both single strands of a double-stranded polynucleotide that comprises two complementary single strands.

As used herein, the term "modification/modify" is defined to include one or more of the following: nucleic acid base substitution, nucleic acid base deletion, nucleic acid base insertion, nucleic acid methylation, nucleic acid demethylation, and nucleic acid base deamidation.

As used herein, the terms "gRNA", "guide RNA", and "sgRNA" are often used interchangeably.

As used herein, the terms "isotropic repeated sequence" and "DR sequence" are used interchangeably.

As used herein, the terms "trans-activated crRNA", "trans-activated CRISPR RNA" and "tracrRNA" are used interchangeably.

As used herein, the terms "RuvC structural domain", "RuvC domain", "RuvC nuclease domain", and "RuvC nuclease structural domain" are used interchangeably. The terms "HNH structural domain", "HNH domain", "HNH nuclease domain", and "HNH nuclease structural domain" are used interchangeably.

As used herein, the term "target nucleic acid" refers to a polynucleotide having a target sequence. The target nucleic acid may include any polynucleotide, such as DNA (target DNA) or RNA (target RNA). The term "target nucleic acid" refers to a nucleic acid that the gRNA directs the Cas9 protein to, targets, or modifies. The term "target nucleic acid" may be any endogenous or exogenous polynucleotide for a cell (e.g., a eukaryotic cell). For example, the "target nucleic acid" may be a polynucleotide present in eukaryotic cells, a sequence (or a portion thereof) encoding a gene product (e.g., a protein) or a non-coding sequence (or a portion thereof). In some embodiments, the "target nucleic acid" may include one or more disease-associated genes and polynucleotides as well as genes associated with biochemical pathways of signaling. The "disease-associated" gene or polynucleotide refers to any gene or polynucleotide that produces a transcription or translation product at an abnormal level or in an abnormal form in cells of a tissue affected by a disease (e.g., a genetic disease, a chronic disease, an infectious disease, or a cancer, etc.) as compared to control tissues or cells without the disease. In some embodiments, the target nucleic acid is DNA. In some embodiments, the target nucleic acid is an entire chromosomal DNA molecule. The target nucleic acid may be any target nucleic acid (including DNA or RNA) molecule, including naturally occurring nucleic acid molecules with engineered RNA molecules.

As used herein, the term "target sequence" refers to a small sequence in a target nucleic acid molecule that is complementary (fully or partially complementary) or hybridizes to a guide sequence of a gRNA molecule. A length of the target sequence is often tens of bp, for example, about 10 bp, about 20 bp, about 30 bp, about 40 bp, about 50 bp, or about 60 bp.

As used herein, a "specific guide sequence," also referred to as a "guide sequence," refers to a segment in the guide RNA that directs a CRISPR-CAS complex to a target nucleic acid sequence for specific binding. The specific guide sequence is complementary (partially complementary or fully complementary) to and/or hybridizes with the target sequence of the target nucleic acid.

Methods for measuring the binding of Cas9 protein, conjugates, or fusion proteins to target nucleic acids are known in the art and include, but are not limited to, chromatin immunoprecipitation assays, electrophoretic mobility shift assays, reporter protein or reporter gene product assays, and microplate capture assays. Similarly, methods for measuring the cleavage or modification of target nucleic acids are known in the art.

As used herein, the term "sequence identity" (also referred to as identity or percent identity) refers to a degree of sequence matching between two polypeptides or two nucleic acids. Comparison is typically made when the two sequences are aligned to generate a highest possible sequence identity. Such alignments may be performed using publicly available and commercially available alignment algorithms and programs, including but not limited to Clustal, MAFFT, Probcons, T-Coffee, Probalign, and BLAST, which may be reasonably selected by those of ordinary skill in the art. A person skilled in the art may able to determine the appropriate parameters for sequence alignment, including any algorithms necessary to achieve optimal alignment or comparison over the full length of the sequences being compared.

As used herein, the term "conserved variant polypeptide" refers to a polypeptide that maintains essentially the same biological function or activity as a wild-type polypeptide (e.g., in the context of the present disclosure, the CasRfg.3 polypeptide isolated from a strain of *Anaerovibrio* sp. of the phylum Firmicutes). The conserved variant polypeptide may be: (i) a polypeptide in which one or more conserved or non-conserved amino acid residues (preferably conserved amino acid residues) are substituted, where such substituted amino acid residues may or may not be encoded by the genetic code; (ii) a polypeptide with substituent groups at one or more amino acid residues; (iii) a polypeptide formed by fusion of the mature polypeptide with another compound, such as a compound that extends the half-life of the polypeptide (e.g., polyethylene glycol); or (iv) a polypeptide formed by fusion of an additional amino acid sequence to the polypeptide sequence, such as a leader sequence, a secretion sequence, a sequence for purifying the polypeptide, a protein tag sequence, or a fusion protein formed with an antigen IgG fragment. In accordance with the teachings herein, these fragments, derivatives, and analogs fall within the scope known to those skilled in the art. In a more specific manner, the "conservative variant polypeptide" refers to a polypeptide in which up to 100, preferably up to 80, more preferably up to 60, more preferably up to 50, even more preferably up to 30, even more preferably up to 20, even more preferably up to 10, or 5 amino acids are substituted with amino acids of similar or closely related properties compared to the amino acid sequence set forth in SEQ ID NO: 1. The "conservative variant polypeptide" essentially retains the same biological function or activity as the Cas9 protein of the present disclosure.

As used herein, the term "mutation" refers to the substitution of a residue in a sequence (e.g., nucleic acid or amino acid sequence) with another residue, or the replacement of one or more residues in the sequence with a different residue, or the occurrence of a deletion or insertion.

As used herein, the term "insertion/deletion" refers to the insertion or deletion of nucleotide bases in a nucleic acid. Such insertions or deletions may result in a frameshift mutation in a coding region of a gene.

As used herein, the terms "variant" or "mutant" refer to a peptide or polypeptide whose amino acid sequence has been altered by the insertion, deletion, or substitution of one or more amino acids compared to a reference sequence, but which retains at least one biological activity. Variants described in any embodiment of the present disclosure include amino acid sequences that exhibit at least 90%, preferably at least 92%, more preferably at least 94%, even more preferably at least 95%, such as at least 96%, 98%, 99%, or 99.5% sequence identity to the reference sequence (e.g., SEQ ID NO: 1 as described in the present disclosure) while retaining the biological activity of the reference sequence (e.g., as a nuclease). Sequence identity between two aligned sequences may be determined using the BLAST algorithm provided by NCBI, or the like. Mutants also include amino acid sequences having one or more mutations (insertions, deletions, or substitutions) in the amino acid sequence of the reference sequence, while still retaining the biological activity of the reference sequence. The one or more mutations generally refer to 1 to 60 mutations, preferably 1 to 50 mutations, more preferably 1 to 40 mutations, even more preferably 1 to 30 mutations, even more preferably 1 to 20 mutations, even more preferably 1 to 15 mutations, even more preferably 1 to 10 mutations, even more preferably 1 to 5 mutations, or more preferably 1 to 3 mutations, or 1 to 2 mutations. The substitutions are preferably conservative substitutions. For example, in the art, when a residue is substituted by an amino acid of similar or closely related properties, it typically does not alter the function of the protein or polypeptide. "Amino acids of similar or closely related properties" include, for example, families of amino acid residues with similar side chains, such as amino acids with basic side chains (e.g., lysine, arginine, histidine), amino acids with acidic side chains (e.g., aspartic acid, glutamic acid), amino acids with uncharged polar side chains (e.g., glycine, asparagine, glutamine, serine, threonine, tyrosine, cysteine), amino acids with nonpolar side chains (e.g., alanine, valine, leucine, isoleucine, proline, phenylalanine, methionine, tryptophan), amino acids with β-branched side chains (e.g., threonine, valine, isoleucine), and amino acids with aromatic side chains (e.g., tyrosine, phenylalanine, tryptophan, histidine). Therefore, in the polypeptides of the present disclosure, replacing one or more residues with another amino acid residue from the same side-chain class will not substantially affect the activity of the polypeptides.

The "substituted by an amino acid of similar or closely related properties" refers to a substitution between amino acids with similar side chain properties. Thus, the substitution may be, for example, (1) a substitution between aromatic amino acids (Phe, Trp, Tyr), (2) a substitution between nonpolar aliphatic amino acids (Gly, Ala, Val, Leu, Met, Ile, Pro), (3) a substitution between uncharged polar amino acids (Ser, Thr, Cys, Asn, Gln), (4) a substitution between basic amino acids (Lys, Arg, His), or (5) a substitution between acidic amino acids (Asp, Glu).

As used herein, the term "operably linked" refers to a condition in which certain portions of a DNA sequence are capable of regulating or controlling the activity of other portions of the same DNA sequence. For example, if a promoter controls the transcription of a protein-coding sequence, then the promoter is operably linked to the coding sequence.

As used herein, the term "linker" refers to chemical groups or molecules connecting two molecules or portions, such as two domains of a fusion protein, a Cas9 enzyme and a deaminase. In some embodiments, a linker is located between or flanked by two groups, molecules, or other parts and connects them through a covalent bond. In some embodiments, the linker is an amino acid or multiple amino acids (e.g., a peptide or protein). In some embodiments, the linker is an organic molecule, group, polymer, or chemical portion. A length and a type of the linker may be designed as needed.

As used herein, the term "functional chemical molecule" refers to a chemical molecule that is neither an amino acid nor a peptide. Examples of the functional chemical molecule include (but are not limited to) a fluorescent group, a chromogenic agent, a developing agent, or a radioactive isotope.

Isolated Cas9 Protein

The present disclosure provides an isolated Cas9 protein.

In some embodiments, the Cas9 protein is optionally selected from:
  a Cas9 nuclease with nuclease activity;
  a Cas9-nickase (Cas9n) or a dCas9 obtained by modifying the Cas9 nuclease; or
  a fusion protein or a conjugate comprising the Cas9 nuclease, the Cas9-nickase, or the dCas9.

In some embodiments, the Cas9 protein has one or more of the features selected from the group consisting of (a) through (f), or any combination thereof:
  (a) isolated from a strain of Firmicutes species, specifically *Anaerovibrio* sp.;
  (b) containing or being the polypeptide set forth in SEQ ID NO: 1, or containing or being a conservative variant of the polypeptide set forth in SEQ ID NO: 1 or a homolog thereof;
  (c) containing a RuvC domain and an HNH domain;
  (d) capable of forming a complex with a guide RNA, binding to a target nucleic acid under the guidance of the guide RNA, or cleaving or modifying the target nucleic acid under the guidance of the guide RNA;
  (e) a PAM sequence recognized by the Cas9 protein as shown in 5'-DDRGDNN-3', where D represents A, G, or T, R represents A or G, and N represents A, C, G, or T; and
  (f) performing any of the functions in (d) at a temperature ranging from 25° C. to 55° C.

In some embodiments, the Cas9 protein is isolated from a strain of *Anaerovibrio* sp. of the phylum Firmicutes. In some embodiments, the Cas9 protein is isolated from a species with a genome having an Average Nucleotide Identity (ANI) value ≥95% compared to the genome identified as GCA_902786545.1 in the NCBI database. In some embodiments, the Cas9 protein is isolated from a species with a genome having an ANI value ≥95% compared to the genome of strain RUG13183 in the NCBI database.

The term "Average Nucleotide Identity (ANI)" refers to a measure of a similarity between two genomes at a nucleic acid level, based on the comparison of all orthologous protein-coding genes. For bacteria/archaea, an ANI threshold of 95% is generally used as the criterion to determine whether two genomes belong to a same species (Richter M, Rosselló-Móra R. Shifting the genomic gold standard for the prokaryotic species definition. Proc Natl Acad Sci USA. 2009 Nov. 10; 106 (45): 19126-31). Accordingly, in the context of the present disclosure, species with an ANI value ≥95% to the genomes referenced above are considered to be the same species. Cas9 proteins isolated from such species are homologous, functionally similar, and fall within the scope of the present disclosure.

In some embodiments, the Cas9 protein comprises a polypeptide selected from the group consisting of:
  (i) a polypeptide having the amino acid sequence set forth in SEQ ID NO: 1;

(ii) a polypeptide that has at least 90% (preferably at least 92%; more preferably at least 94%; more preferably at least 95%, such as at least 96%, 98%, 99%, or 99.5%) sequence identity to the amino acid sequence of polypeptide set forth in SEQ ID NO: 1;

(iii) a polypeptide formed by substituting, deleting, or adding one or more (e.g., 1-60, preferably 1-50, more preferably 1-40, more preferably 1-30, more preferably 1-20, more preferably 1-15, more preferably 1-10, more preferably 1-5, more preferably 1-3, or 1-2) amino acid residues in the amino acid sequence of the polypeptide in (i), and retaining the function of the polypeptide in (i);

(iv) a fragment of any one of the polypeptides in (i)-(iii) that contains a RuvC domain, a HNH domain, and a domain for binding to a target nucleic acid sequence, and retains the function of the polypeptide in (i); and (v) a polypeptide formed by adding to the N or C terminus of any of the aforementioned polypeptides (i)-(iv) a sequence including (but not limited to) a tag sequence, a localization sequence (such as a nuclear localization sequence), or a signal peptide sequence.

In some embodiments, the Cas9 protein sequence includes a RuvC nuclease domain and an HNH nuclease domain. The HNH nuclease domain cleaves a complementary strand of a guide sequence, while the RuvC nuclease domain cleaves a non-complementary strand, enabling the specific generation of double-strand breaks (DSB).

In some embodiments, the Cas9 nuclease includes a PI (PAM interaction) domain.

In some embodiments, one or more amino acid residues (e.g., catalytic residues) in the Cas9 protein (including but not limited to the CasRfg.3 protein) may be mutated to modulate its activity in binding, cleaving, or modifying the target nucleic acid. Cas9 generates double-strand breaks via the two nuclease domains, RuvC and HNH. Further, by mutating a key residue, a Cas9-nickase (Cas9n) may be formed, where one of the RuvC or HNH domains is inactivated. The Cas9-nickase, guided by the guide RNA, may bind to the target nucleic acid sequence and cleave the single strand of the target nucleic acid (e.g., target DNA). Thus, to induce a double-strand break at the target nucleic acid, two correctly recognized Cas9n molecules are required to cleave the target nucleic acid, which provides an enhanced specificity compared to the wild-type Cas9 nuclease.

In some embodiments, one or more amino acid residues (e.g., catalytic residues) in the Cas9 protein (including but not limited to the CasRfg.3 protein) may be mutated such that its nuclease activity under the guidance of the guide RNA is completely or partially lost. For example, the RuvC domain and the HNH domain may both be inactivated. This type of modified protein is referred to as dead Cas9 (dCas9). Although the dCas9 has reduced or lost nuclease activity and does not cleave the target nucleic acid, it may still bind to the target nucleic acid and be used to activate or repress transcription of the target nucleic acid. In some embodiments, the dCas9 sequence includes inactivated or reduced activity RuvC and HNH domains. In some embodiments, the nuclease activity of the Cas9 protein may be reduced by modification, such that compared to the wild-type protein, the nuclease activity is at least 50%, 60%, 70%, 80%, 90%, 95%, 97%, or 100% inactivated. The nuclease activity of the Cas9 protein may be reduced by multiple techniques known in the art, such as introducing mutations into the nuclease (catalytic) domains of the protein. In some embodiments, certain catalytic residues responsible for the nuclease activity are identified, and these residues may be substituted with different amino acid residues (e.g., glycine or alanine) to reduce the nuclease activity. In some embodiments, the amino acid substitutions are conservative substitutions (i.e., conservative replacements). In some embodiments, the amino acid substitutions are non-conservative substitutions.

The document titled "Crystal Structure of *Staphylococcus aureus* Cas9" (http://dx.doi.org/10.1016/j.cell.2015.08.007) is incorporated by reference herein. This publication details the crystal structure of SaCas9 and compares it with the SpCas9 sequence. It also identifies the catalytic residues of SaCas9 and SpCas9 (e.g., Figure S3 of the publication). The catalytic residues of SaCas9 include D10, E477, H557, N580, H701, and D704.

Figure 15:
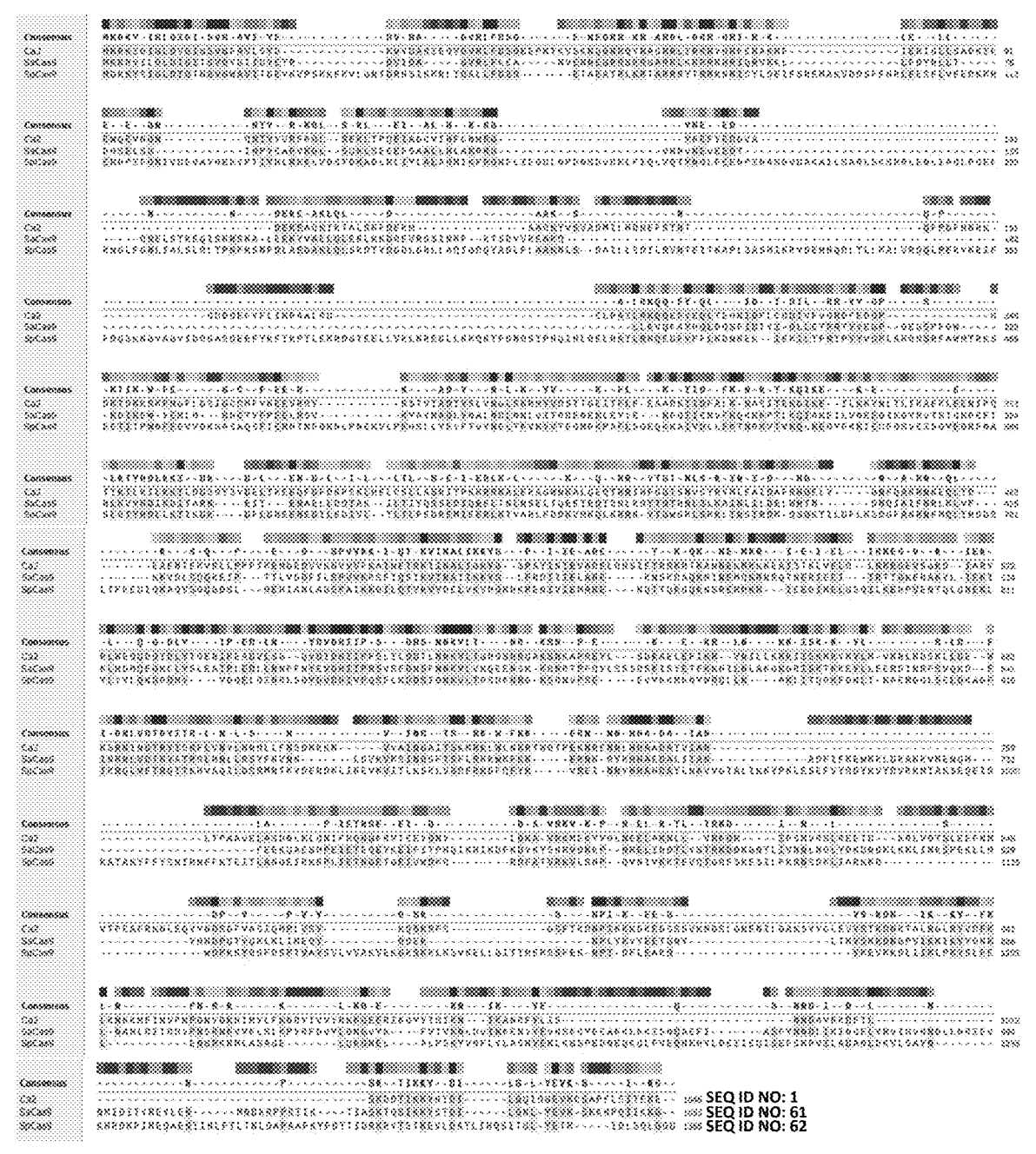

The inventors used the online MAFFT v7.504 program (E-INS-i algorithm, with default parameters for other settings) to perform multiple sequence alignments of the CasRfg.3 (also referred to as Ca2) protein with SaCas9 and SpCas9 (as shown in FIG. 15). At the corresponding positions of the catalytic residues of SaCas9, the catalytic residues of CasRfg.3 were identified as D10, E520, H603, N626, H749, and D752. Therefore, by mutating one or more of these catalytic residues in CasRfg.3, a dead CasRfg.3 or CasRfg.3 nickase may be generated. For other Cas9 proteins of the present disclosure (e.g., conservative variants or homologs of CasRfg.3), this method may also be used to identify corresponding dCas9 or Cas9 nickase.

In some embodiments, the Cas9 protein is fused with a deaminase domain to form a single-base editor capable of editing specific base pairs at target nucleic acid sites. For example, the Cas9 protein is fused with adenosine deaminase to obtain a single-base editor capable of converting an A·T base pair into a G·C base pair. As another example, the Cas9 protein is fused with cytosine deaminase to obtain a single-base editor capable of converting a C·G base pair into a T·A base pair.

In some embodiments, the Cas9-nickase is a variant of the Cas9 nuclease that contains an inactivated RuvC domain or an inactivated HNH domain, and may bind to a target nucleic acid sequence and cleave the single strand of the target nucleic acid (e.g., target DNA) under the guidance of the guide RNA. In some embodiments, the Cas9-nickase contains mutations at one or more positions corresponding to D10, E520, H603, N626, H749, and/or D752 of the amino acid sequence of the polypeptide set forth in SEQ ID NO: 1. In some embodiments, the Cas9-nickase is fused with a deaminase domain to form a single-base editor capable of editing specific base pairs at target nucleic acid sites. For example, the Cas9-nickase is fused with adenosine deaminase to obtain a single-base editor capable of converting an A·T base pair into a G·C base pair. As another example, the Cas9-nickase is fused with cytosine deaminase to obtain a single-base editor capable of converting a C·G base pair into a T·A base pair.

In some embodiments, the dCas9 is a variant of the Cas9 nuclease that contains an inactivated RuvC domain and an inactivated HNH domain, or has reduced or lost nuclease function, and may bind to a target nucleic acid sequence under the guidance of the guide RNA. In some embodiments, the dCas9 contains mutations at one or more positions corresponding to D10, E520, H603, N626, H749, and/or D752 of the amino acid sequence of the polypeptide set forth in SEQ ID NO: 1. In some embodiments, the Cas9-nickase is fused with a deaminase domain to form a single-base editor capable of editing specific base pairs at target nucleic acid sites. For example, the Cas9-nickase is fused with adenosine deaminase to obtain a single-base editor capable of converting an A·T base pair into a G·C base pair. As another example, the Cas9-nickase is fused with cytosine deaminase to obtain a single-base editor capable of converting a C·G base pair into a T·A base pair.

In some embodiments, the present disclosure provides a CasRfg.3 protein, conservative variant polypeptides or homologs thereof, or other proteins/polypeptides/molecules (e.g., detection reagents or pharmaceutical/chemical components) covalently or non-covalently linked to the CasRfg.3 protein, conservative variant polypeptides or homologs thereof. Such additional other proteins/polypeptides/molecules may be conjugated thereto through chemical coupling, gene fusion, or other non-covalent interactions (e.g., biotin-streptavidin binding). These derivative proteins do not affect the function of the original protein, such as its ability to bind to the guide RNA to form a complex and its ability to bind, cleave, or modify the target nucleic acid at a specific site under the guidance of the guide RNA.

In some embodiments, a full-length Cas9 protein, such as a full-length CasRfg.3 protein (SEQ ID NO: 1), conservative variant polypeptides, or homologs thereof, may not be used. Instead, functional fragments of these proteins may be used. The term "functional fragment" refers to a fragment or a derivative of the polypeptide set forth in SEQ ID NO: 1, a conservative variant polypeptide thereof, or a homolog thereof, which has a shorter sequence than the full-length sequence. The missing residues in the functional fragment may be located at the N-terminal, C-terminal, and/or the internal portion. The functional fragment retains at least a portion of the functionality of the polypeptide set forth in SEQ ID NO: 1. Non-limiting examples of the functional fragment include the RuvC domain, the HNH domain, or a PI domain of the CasRfg.3 protein. For example, the RuvC and HNH domains of the CasRfg.3 protein may be used.

In some embodiments, additional domains may be inserted into the Cas9 protein while maintaining some of the original Cas9 protein's functions, such as its ability to form a complex with the guide RNA, target and bind to the target nucleic acid, cleave the target nucleic acid, or modify the target nucleic acid. For example, a deaminase domain, a transcriptional activation domain (e.g., VP64 or VPR), a transcriptional repression domain (e.g., KRAB or SID domain), or a nuclease structural domain (e.g., FokI) may be inserted into the Cas9 protein. These modified proteins are also within the scope of the present disclosure.

In some embodiments, the CasRfg.3 protein, conservative variant polypeptides, or homologs thereof may not be naturally occurring and may differ from naturally occurring sequences by at least one amino acid.

In some embodiments, the Cas9 protein may form a complex with the guide RNA provided in the present disclosure.

In some embodiments, the Cas9 protein may bind to the target nucleic acid under the guidance of the guide RNA provided in the present disclosure.

In some embodiments, the Cas9 protein may cleave or modify the target nucleic acid under the guidance of the guide RNA provided in the present disclosure.

In some embodiments, the Cas9 protein may be used to modulate transcriptional activation or transcriptional repression of the target nucleic acid under the guidance of the guide RNA provided in the present disclosure.

In some embodiments, the Cas9 protein may be used in combination with the guide RNAs in the present disclosure to regulate transcriptional activation or transcriptional repression of the target nucleic acid.

In some embodiments, in a temperature range of 25° C. to 55° C., the Cas9 protein may:

form a complex with the guide RNA of the present disclosure;

bind to the target nucleic acid under the guidance of the guide RNA of the present disclosure;

cleave or modify the target nucleic acid under the guidance of the guide RNA of the present disclosure; or combine with the guide RNA of the present disclosure to regulate the transcriptional activation or repression of the target nucleic acid.

Further, the temperature range may be 35° C. to 55° C. Still further, the temperature range may be 37° C. to 55° C., 40° C. to 55° C., 45° C. to 55° C., or 50° C. to 55° C.

In some embodiments, a PAM sequence recognized by the Cas9 protein (including, but not limited to, CasRfg.3) is 5'-DDRGDNN-3' (D is A, G, or T; R is A or G; N is A, C, G, or T). Further, in some embodiments, a PAM sequence corresponding to the Cas9 protein (including but not limited to CasRfg.3) is selected from: 5'-ATAGGCT-3', 5'-AAGGCT-3', 5'-AGGGTCG-3', 5'-GAGGTCC-3', 5'-TTGGGCT-3', 5'-TGGGGTA-3', 5'-TGGGGGC-3', 5'-GGGGGGA-3', 5'-AGAGGGAT-3', 5'-AGGGTCC-3', 5'-ATAGGGA-3', 5'-GTAGAAT-3', 5'-GGGGAAG-3', 5'-TAAGGTT-3', 5'-TGGGTAG-3', or 5'-GGGGGAT-3'.

In some embodiments, the Cas9 protein (including but not limited to the CasRfg.3 protein) does not possess substantial or detectable additional nuclease activity (e.g., DNase/RNase activity). Here, "additional nuclease activity" refers to non-specific nuclease activity. For example, a complex containing the Cas9 protein, when activated by binding to the target nucleic acid (e.g., target DNA), undergoes a conformational change, causing the complex to act as a non-specific nuclease, cleaving and/or degrading nearby nucleic acid molecules (e.g., DNA or RNA molecules), thus exerting an "additional" effect.

Conjugate

The present disclosure provides a conjugate, comprising: the Cas9 protein of the present disclosure, and a heterologous functional moiety conjugated thereto.

In some embodiments, the Cas9 protein is a Cas9 nuclease with nuclease activity (including but not limited to the unmutated wild-type Cas9 protein, e.g., the CasRfg.3 protein), the Cas9-nickase (Cas9n, nCas9), the dCas9, or derivatives or functional fragments thereof, and the Cas9 protein may be conjugated with one or more heterologous functional moieties. These heterologous functional moieties may have various activities, such as a methyltransferase activity, a demethylase activity, a deaminase activity, a transcriptional activation activity, a transcriptional repression activity, a transcription release factor activity, a histone modification activity, a RNA cleavage activity, a DNA cleavage activity, a nucleic acid binding activity, a base editing activity, and a switchable activity (e.g., photo-inducible).

The heterologous functional moieties may include, but are not limited to: localization signals (e.g., a nuclear localization signal (NLS), a nuclear export signal (NES)), reporter proteins or reporter gene products (e.g., GST, HRP, CAT, GFP, HcRed, DsRed, CFP, YFP, BFP), tags or detection labels (e.g., fluorescent dyes such as FITC or DAPI), targeting moieties, DNA-binding domains (e.g., MBP, Lex A DBD, Gal4 DBD), antigenic epitope tags (e.g., His, myc, V5, FLAG, HA, VSV-G, Trx, etc.), transcriptional activation domains (e.g., VP64 or VPR), transcriptional repression domains (e.g., KRAB or SID portions), nucleases (e.g., FokI), deaminase or deaminase domains (e.g., ADAR1, ADAR2, APOBEC, AID, or TAD), base excision repair inhibitors (e.g., uracil-DNA glycosylase inhibitor (UGI)), methyltransferases, demethylases, transcription release factors, HDAC, ssRNA cleavage domains, dsRNA cleavage domains, ssDNA cleavage domains, dsDNA cleavage domains, DNA or RNA ligases, functional chemical molecules, or any combination thereof.

For example, the conjugate may include one or more NLSs, which may be located at the N-terminus, the C-terminus, and/or within the Cas9 protein.

In some embodiments, the conjugate may be obtained through a covalent bond or a non-covalent bond.

In some embodiments, the conjugate may be obtained through a linker, i.e., the heterologous functional moiety is linked to the Cas9 protein through a linker. The linker, the heterologous functional moiety, and the Cas9 protein may be connected via covalent or non-covalent bonds. Non-limiting examples of the linker include amino acids, peptides, amino acid derivatives (e.g., Ahx, β-Ala, GABA, or Ava), PEG, or the like.

Generally, the conjugation of the heterologous functional moiety does not affect the functionality of the original protein, such as its ability to bind to the guide RNA to form a complex or its ability to bind to or cleave target nucleic acids at specific sites under the guidance of the guide RNA.

In some embodiments, the conjugate may form a complex with the guide RNA of the present disclosure.

In some embodiments, the conjugate may bind to the target nucleic acid under the guidance of the guide RNA. For example, when conjugated with a nuclear localization signal (NLS), the conjugate may enter the nucleus of a eukaryotic cell under the guidance of the NLS and bind to the target nucleic acid.

In some embodiments, the conjugate may cleave or modify the target nucleic acid under the guidance of the guide RNA. For example, the Cas9 protein of the present disclosure may be conjugated with an NLS, and under the guidance of the NLS, enter the nucleus of a eukaryotic cells to cleave the target nucleic acid. Subsequently, the target nucleic acid may be further modified via a NHEJ or HDR repair mechanism (e.g., resulting in base insertion/deletion (indel) in the target nucleic acid) of the cell. For example, the Cas9 protein (e.g., the Cas9-nickase) of the present disclosure may be conjugated with a deaminase or with both a deaminase and a uracil-DNA glycosylase inhibitor (UGI), thus creating a single-base editor containing the Cas9 protein of the present disclosure. The single-base editor may also be conjugated with an NLS. The single-base editor may modify the target nucleic acid (e.g., perform base substitutions) under the guidance of the guide RNA of the present disclosure.

In some embodiments, the conjugate may be combined with the guide RNA to regulate transcriptional activation or repression of the target nucleic acid. For example, the Cas9 protein (e.g., the dCas9) of the present disclosure may be conjugated with a transcriptional activation domain (e.g., VP64 or VPR) or a transcriptional repression domain (e.g., KRAB or SID portion), and then combined with the guide RNA (e.g., targeting the promoter or enhancer regions of a gene of interest) to regulate transcriptional activation or repression of the target nucleic acid.

In some embodiments, the conjugate may, within a temperature range of 25° C. to 55° C.: form a complex with the guide RNA of the present disclosure;
    bind to the target nucleic acid under the guidance of the guide RNA of the present disclosure;
    cleave or modify the target nucleic acid under the guidance of the guide RNA of the present disclosure; or
    be combined with the guide RNA of the present disclosure to regulate transcriptional activation or repression of the target nucleic acid.

Further, the temperature range may be 35° C. to 55° C. Furthermore, the temperature range is 37° C.~55° C., 40° C.~55° C., 45° C.~55° C., or 50° C.~55° C.

In some embodiments, a PAM sequence recognized by the conjugate is 5'-DDRGDNN-3' (D is A, G, or T; R is A or G; N is A, C, G, or T). Further, in some embodiments, a PAM sequence corresponding to the conjugate is selected from: 5'-ATAGGCT-3', 5'-AAGGCT-3', 5'-AGGGTCG-3', 5'-GAGGTCC-3', 5'-TTGGGCT-3', 5'-TGGGGTA-3', 5'-TGGGGGC-3', 5'-GGGGGGA-3', 5'-AGAGGAT-3', 5'-AGGGTCC-3', 5'-ATAGGGA-3', 5'-GTAGAAT-3', 5'-GGGGAAG-3', 5'-TAAGGTT-3', 5'-TGGGTAG-3', and 5'-GGGGGAT-3'.

Fusion Protein

The present disclosure provides a fusion protein, comprising: the Cas9 protein described in any of the previous embodiments, and a heterologous functional domain fused thereto.

In some embodiments, the Cas9 protein is a Cas9 nuclease with nuclease activity (including but not limited to a wild-type Cas9 protein that has not undergone mutations [e.g., the CasRfg.3 protein], as well as active mutants of the wild-type Cas9 protein), Cas9-nickase (Cas9n, nCas9), dCas9, or derivatives or functional fragments thereof. The Cas9 protein may be fused or associated with one or more heterologous functional domains (e.g., through fusion proteins, linker peptides, etc.). These functional domains may exhibit various activities, such as a methyltransferase activity, a demethylase activity, a deaminase activity, a transcriptional activation activity, a transcriptional repression activity, a transcription release factor activity, a histone modification activity, a RNA cleavage activity, a DNA cleavage activity, a nucleic acid binding activity, a base editing activity, and a switchable activity (e.g., photo-inducible).

The heterologous functional domains may include, but are not limited to: localization signals (e.g., nuclear localization signal NLS, nuclear export signal NES), reporter proteins or reporter gene products (e.g., GST, HRP, CAT, GFP, HcRed, DsRed, CFP, YFP, BFP), labels or detection markers (e.g., FITC or DAPI fluorescent dyes), targeting regions, DNA-binding domains (e.g., MBP, Lex A DBD, Gal4 DBD), antigen epitope tags (e.g., His, myc, V5, FLAG, HA, VSV-G, Trx, etc.), transcriptional activation domains (e.g., VP64 or VPR), transcriptional repression domains (e.g., KRAB or SID regions), nucleases (e.g., FokI), deaminase or deamination domains (e.g., ADAR1, ADAR2, APOBEC, AID, or TAD), base excision repair inhibitors (e.g., uracil-DNA glycosylase inhibitor (UGI)), methylases, demethylases, transcriptional release factors, HDACs, ssRNA cleavage activity domains, dsRNA cleavage activity domains, ssDNA cleavage activity domains, dsDNA cleavage activity domains, DNA or RNA ligases, or any combination of the above.

In some embodiments, the Cas9 protein is a Cas9 nuclease with nuclease activity (including but not limited to the wild-type Cas9 protein [e.g., CasRfg.3 protein], as well as active mutants of the wild-type Cas9 protein). The Cas9 nuclease is fused with a deaminase domain to form a single-base editor, which may edit bases at specific sites in a target nucleic acid. For example, the Cas9 nuclease is fused with adenosine deaminase to obtain a single-base editor capable of converting an A·T base pair into a G·C base pair. As another example, the Cas9 nuclease is fused with cytosine deaminase to obtain a single-base editor capable of converting A C·G base pair into a T·A base pair.

In some embodiments, the Cas9 protein is a Cas9-nickase, which includes an inactive RuvC domain or an inactive HNH domain. Under the guidance of a guide RNA, the Cas9-nickase may bind to and cleave the single strand of a target nucleic acid sequence (e.g., target DNA). In some embodiments, the Cas9-nickase undergoes mutations at the D10, E520, H603, N626, H749, or D752 positions of the polypeptide set forth in SEQ ID NO: 1. In some embodiments, the Cas9-nickase is fused with a deaminase domain to form a base editor, which may edit bases at specific sites of the target nucleic acid. For example, the Cas9-nickase is fused with adenosine deaminase to obtain a single-base editor capable of converting an A·T base pair into a G·C base pair. As another example, the Cas9-nickase is fused with cytosine deaminase to obtain a single-base editor capable of converting A C·G base pair into a T·A base pair.

In some embodiments, the Cas9 protein is a dCas9, which includes an inactive RuvC domain and an inactive HNH domain, or has a reduced or lost nuclease activity. Under the guidance of a guide RNA, the dCas9 may bind to the target nucleic acid sequence. In some embodiments, the dCas9 undergoes mutations at the D10, E520, H603, N626, H749, or D752 positions of the polypeptide set forth in SEQ ID NO: 1. In some embodiments, the Cas9-nickase is fused with a deaminase domain to form a base editor, which may edit bases at specific sites of the target nucleic acid. For example, the dCas9 is fused with adenosine deaminase to obtain a single-base editor capable of converting an A·T base pair into a G. C base pair. As another example, the dCas9 is fused with cytosine deaminase to obtain a single-base editor capable of converting A C·G base pair into a T·A base pair.

In some embodiments, the fusion protein may include multiple (e.g., 2, 3, 4, 5, 6, 7, 8, or more) identical or different functional domains. For example, the fusion protein may include one or more nuclear localization signals (NLS), such as 1, 2, 3, 4, 5, or more NLS, for example ≥1, ≥2, ≥3, or ≥4 NLS. These NLS may be located at the N-terminus, C-terminus, or internally within the Cas9 protein.

In some embodiments, the heterologous functional domain is connected to the Cas9 protein via a linker. The linker, the heterologous functional domain, and the Cas9 protein may be connected via covalent or non-covalent bonds. Non-limiting examples of linkers include amino acids, peptides, amino acid derivatives (e.g., Ahx, β-Ala, GABA, or Ava), etc. In some embodiments, the functional domain is associated or fused with a linker sequence (e.g., a flexible linker sequence or a rigid linker sequence).

In some embodiments, the fusion of the heterologous functional domain does not affect the original function of the Cas9 protein, such as its ability to form a complex with the guide RNA described in the present disclosure, or its ability to bind or cleave the target nucleic acid at specific sites under the guidance of the guide RNA.

The position of one or more functional domains on the Cas9 protein enables the functional domains to be correctly spatially oriented, thereby imparting desired functional effects on the target. For example, if the functional domain is a transcriptional activator (e.g., VP16, VP64, or p65), the transcriptional activator is positioned to spatially orient in a way that influences the transcription of a target. Similarly, a transcriptional repressor may be positioned to influence the transcription of the target, and a nuclease (e.g., FokI) may be positioned to cleave or partially cleave the target. In some embodiments, the functional domain is located at the N-terminus of the Cas9 protein. In some embodiments, the functional domain is located at the C-terminus of the Cas9 protein. In some embodiments, the functional domain is located at both the N-terminus and C-terminus of the Cas9 protein. In some embodiments, the dCas9/nCas9 is modified, and the modified dCas9/nCas9 contains a first functional domain at the N-terminus and a second functional domain at the C-terminus.

In some embodiments, the fusion protein may form a complex with the guide RNA described in the present disclosure.

In some embodiments, the fusion protein may bind to the target nucleic acid under the guidance of the guide RNA described in the present disclosure. For example, the fusion protein may be fused with an NLS, enter the nucleus of a eukaryotic cell under the guidance of the NLS, and bind to the target nucleic acid.

In some embodiments, the fusion protein may cleave or modify the target nucleic acid under the guidance of the guide RNA described in the present disclosure. For example, the Cas9 protein of the present disclosure may be fused with an NLS, enter the nucleus of a eukaryotic cell under the guidance of the NLS, and cleave the target nucleic acid. Subsequently, the target nucleic acid may be further modified through an endogenous NHEJ or HDR repair mechanism (e.g., resulting in base insertion or deletion [indel] in the target nucleic acid) of the cell. For example, the Cas9 protein (e.g., the Cas9-nickase) of the present disclosure may be fused with a deaminase, or with both a deaminase and a uracil-DNA glycosylase inhibitor (UGI), forming a base editor containing the Cas9 protein of the present disclosure. The base editor may also be fused with an NLS. The base editor may modify (e.g., performing base substitution) the target nucleic acid under the guidance of the guide RNA of the present disclosure.

In some embodiments, the fusion protein may be combined with the guide RNA to regulate transcriptional activation or transcriptional repression of the target nucleic acid. For example, the Cas9 protein (e.g., the dCas9) of the present disclosure may be fused with a transcriptional activation domain (e.g., VP64 or VPR) or a transcriptional repression domain (e.g., KRAB or SID), and then combined with the guide RNA (e.g., targeting the promoter region or enhancer region of a gene of interest) to regulate transcriptional activation or transcriptional repression of the target nucleic acid.

In some embodiments, the fusion protein, within a temperature range of 25° C. to 55° C., may:
  form a complex with the guide RNA described in the present disclosure;
  bind to a target nucleic acid under the guidance of the guide RNA described in the present disclosure;
  cleave or modify the target nucleic acid under the guidance of the guide RNA described in the present disclosure; or
  be combined with the guide RNA described in the present disclosure to regulate transcriptional activation or transcriptional repression of the target nucleic acid.

Further, the temperature range may be 35° C.-55° C. Further, the temperature may be 37° C.-55° C., 40° C.-55° C., 45° C.-55° C., or 50° C.-55° C.

In some embodiments, a PAM sequence recognized by the fusion protein is 5'-DDRGDNN-3' (D is A, G, or T; R is A or G; N is A, C, G, or T). Further, in some embodiments, a PAM sequence corresponding to the fusion protein is selected from: 5'-ATAGGCT-3', 5'-AAGGCT-3', 5'-AGGGTCG-3', 5'-GAGGTCC-3', 5'-TTGGGCT-3', 5'-TGGGGTA-3', 5'-TGGGGGC-3', 5'-GGGGGGA-3', 5'-AGAGGAT-3', 5'-AGGGTCC-3', 5'-ATAGGGA-3', 5'-GTAGAAT-3', 5'-GGGGAAG-3', 5'-TAAGGTT-3', 5'-TGGGTAG-3', 5'-GGGGGAT-3'.

CRISPR-CAS Complex

The present disclosure also provides a CRISPR-CAS complex comprising:

(1) any Cas9 protein described in the present disclosure; and
(2) a guide RNA.

In some embodiments, the Cas9 protein is a Cas9 nuclease with nuclease activity, or a Cas9-nickase (Cas9n) or dCas9 that is a modified form of the Cas9 nuclease, or a fusion protein or conjugate containing the Cas9 nuclease, Cas9-nickase, or dCas9.

In some embodiments, the Cas9 protein has a feature selected from any one of (a)-(f) below or any combination thereof:

(a) isolated from a strain of *Anaerovibrio* sp. of the phylum Firmicutes;
(b) containing or being the polypeptide set forth in SEQ ID NO: 1, or containing or being a conservative variant of the polypeptide set forth in SEQ ID NO: 1 or a homolog thereof;
(c) containing a RuvC domain and an HNH domain;
(d) capable of forming a complex with a guide RNA, binding to a target nucleic acid under the guidance of the guide RNA, or cleaving or modifying the target nucleic acid under the guidance of the guide RNA;
(e) a PAM sequence recognized by the Cas9 protein as shown in 5'-DDRGDNN-3', where D represents A, G, or T, R represents A or G, and N represents A, C, G, or T; and
(f) performing any of the functions in (d) at a temperature ranging from 25° C. to 55° C.

The CRISPR-Cas complex of the present disclosure may be used in various applications, such as gene editing-based therapies. Since the CasRfg.3 protein is significantly smaller than many Cas9 proteins in the field, nucleic acids encoding the CasRfg.3 protein, its conservative variant polypeptides, or homologs thereof, as well as the corresponding guide RNA encoding sequences, are more suitable for packaging into delivery systems (e.g., a AAV vector) with size constraints.

Guide RNA

The present disclosure also provides a guide RNA, capable of interacting with or forming a complex with the Cas9 protein of the present disclosure, or directing the binding of the Cas9 protein of the present disclosure to a target nucleic acid, or guiding the Cas9 protein to bind to the target nucleic acid, or guiding the Cas9 protein to cleave or modify the target nucleic acid, or combining with the Cas9 protein to regulate transcriptional activation or transcriptional repression of the target nucleic acid.

In some embodiments, the guide RNA includes a guide sequence and a direct repeat (DR) sequence.

In some embodiments, the guide RNA comprises a guide sequence, a direct repeat (DR) sequence, and a trans-activating crRNA (tracrRNA) sequence.

The guide sequence interacts with, binds to, complements (partially or fully complements), or hybridizes with a target sequence on the target nucleic acid; or the guide sequence directs the Cas9-guide RNA complex to the target nucleic acid sequence for specific binding. The tracrRNA may interact or bind with the Cas9 protein, and the tracrRNA may complement (partially or fully complement), interact, or bind with the DR sequence.

In some embodiments, the CRISPR system described in the present disclosure includes the guide RNA. The CRISPR system may include one or more guide RNAs (e.g., 1 to 12; specifically, 1, 2, 3, 4, 5, 6, 7, 8, or more RNA guides).

In some embodiments, the DR sequence is linked to the 3' end of the guide sequence, e.g., by a covalent bond.

The DR sequence and the guide sequence are collectively referred to as crRNA. The tracrRNA and the crRNA may be covalently linked. In some embodiments, the tracrRNA is connected to the DR sequence to form a scaffold sequence of the gRNA, for example, by embedding one, two, three, four, five, six, or more nucleotides to connect the tracrRNA with the DR sequence, thereby forming a single-molecule gRNA. The sequence from the 5' end to the 3' end is arranged as follows: guide sequence→DR sequence→tracrRNA sequence.

A length of the scaffold sequence ranges from 20 nt to 190 nt.

Preferably, in some embodiments, the crRNA, the tracrRNA, or the scaffold sequence may form one or more stem-loop structures.

In some embodiments, the scaffold sequence may form one, two, three, four, five, six, or more stem-loop structures. In some embodiments, the scaffold sequence may form one, two, or three stem-loop structures. In some embodiments, the scaffold sequence may form ≥1, ≥2, or ≥3 stem-loop structures. In some embodiments, the scaffold sequence may form ≤1, ≤2, or ≤3 stem-loop structures.

Figure 18:
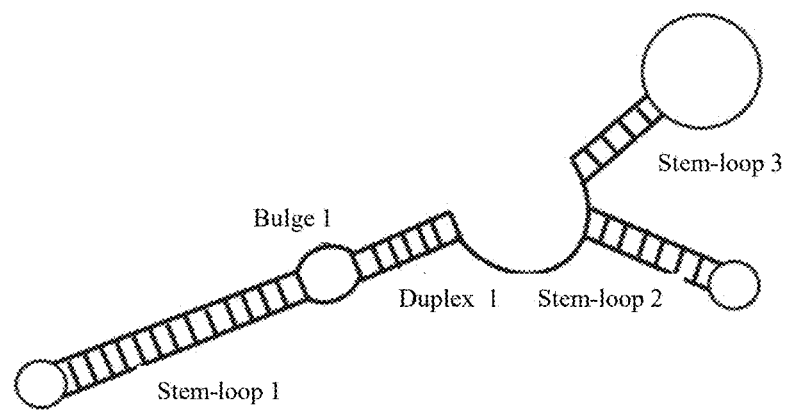
FIG. 18 is a schematic diagram illustrating a scaffold structure of a guide RNA comprising a stem-loop 1, a stem-loop 2, a stem-loop 3, a bulge 1, and a duplex 1.

In some embodiments, the scaffold sequence may form one or more stem-loop structures, a core structure of the stem-loop structure is shown in FIG. 18.

In some embodiments, the 5' end of the scaffold sequence is involved in forming a duplex structure.

In some embodiments, the scaffold sequence, from the 5' end to the 3' end, sequentially contains a duplex, a bulge, and a stem-loop 1. In some embodiments, the scaffold sequence, from the 5' end to the 3' end, sequentially contains a duplex, a bulge, a stem-loop 1, an optional linker sequence, and a stem-loop 2. In some embodiments, the scaffold sequence, from the 5' end to the 3' end, sequentially contains a duplex, a bulge, a stem-loop 1, an optional linker sequence 1, a stem-loop 2, an optional linker sequence 2, and a stem-loop 3.

In some embodiments, the length of the scaffold sequence is ≥20 nt, ≥30 nt, ≥40 nt, ≥50 nt, ≥60 nt, ≥70 nt, ≥80 nt, ≥90 nt, ≥100 nt, ≥110 nt, ≥120 nt, ≥130 nt, ≥140 nt, ≥150 nt, or ≥160 nt. In some embodiments, the length of the scaffold sequence is ≤100 nt, ≤110 nt, ≤120 nt, ≤130 nt, ≤140 nt, ≤150 nt, ≤160 nt, ≤170 nt, ≤180 nt, or ≤190 nt. The term "nt" refers to nucleotides.

In some embodiments, the length of the scaffold sequence is in a range of 20 nt-190 nt, 20 nt-160 nt, 20 nt-140 nt, 20 nt-120 nt, 20 nt-110 nt, 20 nt-100 nt, 40 nt-160 nt, 40 nt-140 nt, 40 nt-120 nt, 40 nt-110 nt, 40 nt-100 nt, 60 nt-160 nt, 60 nt-140 nt, 60 nt-120 nt, 60 nt-110 nt, 60 nt-100 nt, 80 nt-160 nt, 80 nt-140 nt, 80 nt-120 nt, 80 nt-110 nt, 80 nt-100 nt, 100 nt-160 nt, 100 nt-140 nt, or 100 nt-120 nt.

In some embodiments, a length of the guide sequence is in a range of 10 nt-60 nt, 10 nt-50 nt, 10 nt-40 nt, 10 nt-30 nt, 15 nt-60 nt, 15 nt-50 nt, 15 nt-40 nt, or 15 nt-30 nt.

In some implementations, the length of the guide sequence ranges from 16 nt-30 nt. In some implementations, the length of the guide sequence ranges from 18 nt-25 nt. In some implementations, the length of the guide sequence ranges from 20 nt-24 nt. In some embodiments, the length of the guide sequence is 16 nt, 17 nt, 18 nt, 19 nt, 20 nt, 21 nt, 22 nt, 23 nt, 24 nt, 25 nt, 26 nt, 27 nt, 28 nt, 29 nt, or 30 nt.

In some embodiments, the guide RNA comprises the nucleotide sequence set forth in SEQ ID NO: 3 or a truncated version thereof. In some embodiments, the truncated version includes the nucleotide sequence set forth in SEQ ID NO: 4-7.

The "direct repeat (DR) sequence" in the present disclosure refers to a DNA coding sequence in a CRISPR locus, and when described at the RNA level, each T should be understood as representing a U.

To reduce off-target interactions, such as reducing an interaction between a specific guide sequence and a low-complementarity target sequence, a mutation may be introduced into the CRISPR system so that it can distinguish between the target sequence and off-target sequences with greater than 80%, 85%, 90%, or 95% complementarity. In some embodiments, the complementarity is between 80% and 95%, for example, about 83%, 84%, 85%, 86%, 87%, 88%, 89%, 90%, 91%, 92%, 93%, 94%, or 95% (e.g., distinguishing a target with 18 nucleotides from an off-target with 1, 2, or 3 mismatched nucleotides). Therefore, in some embodiments, the complementarity between a specific guide sequence and its corresponding target sequence is greater than 94.5%, 95%, 95.5%, 96%, 96.5%, 97%, 97.5%, 98%, 98.5%, 99%, 99.5%, or 99.9%. In some embodiments, the complementarity is 100%.

It is known in the art that if a complementarity is sufficient for functionality, complete complementarity is not required. Cutting efficiency may be modulated by introducing mismatches, for example by introducing one or more mismatches, such as 1 or 2 mismatches between a specific guide sequence and a target sequence. If a mismatch (e.g., double mismatch) is located closer to a center (i.e., not at the 3' or 5' end), the mismatch has a greater effect on the cleavage efficiency. Therefore, the cleavage efficiency may be regulated by introducing one or more mismatches along the specific guide sequence. For example, if less than 100% target cleavage is desired, one or two mismatches between the guide sequence and the target sequence may be introduced into a spacer sequence.

Chemical modifications may be introduced to the phosphate backbone, sugars and/or bases of the guide RNA. Backbone modifications (e.g., phosphorothioate modifications) alter the charge on the phosphate backbone and aid in the delivery of the polynucleotide and resistance to nucleases (see, e.g., Eckstein, Nucl. Acid Ther., 24, pp. 374-387, 2014). Sugar modifications, such as 2'-O-methyl (2'-OMe), 2'-fluoro (2'-F), or locked nucleic acid (LNA) modifications, may enhance base pairing and nuclease resistance (see, e.g., Allerson, J. Med. Chem. 48.4:901-904, 2005). Sugar modifications may also include 2'-deoxy modifications. Chemically modified bases, such as 2-thiouridine or N6-methyladenosine, may strengthen or weaken base pairing (see, e.g., Bramsen, Front. Genet., 2012 Aug. 20; 3:154). In addition, the guide RNA may be conjugated at the 5' and/or 3' ends with various functional components, including fluorescent dyes, polyethylene glycol (PEG), or proteins. The 5' end of the guide RNA may have one or more additional nucleotides attached to the guide sequence. Non-limiting examples include two additional guanine nucleotides at the 5' end, which may enhance targeting specificity.

In some embodiments, modification of the guide RNA with 2'-OMe improves nuclease resistance, which alters a binding energy of Watson-Crick base pairing. In addition, the 2'-OMe modification may affect the interaction of the polynucleotide with transfection reagents, proteins, or any other molecule in the cell. Effects of these modifications may be empirically tested and obtained.

In some embodiments, the guide RNA comprises one or more phosphorothioate modifications. In some embodiments, to enhance base pairing and/or increase nuclease resistance, the guide RNA comprises one or more lock nucleic acids. In some embodiments, one or more ribonucleotides of the guide RNA may be substituted with deoxyribonucleotides.

Polynucleotide

The present disclosure also provides an isolated polynucleotide encoding the Cas9 protein, the fusion protein, or a protein portion of the conjugate described in any of the embodiments of the present disclosure.

In some embodiments, the isolated polynucleotide comprises (i) the nucleotide sequence set forth in SEQ ID NO: 2; (ii) a nucleotide sequence having one or more nucleotides deleted, added, and/or substituted relative to SEQ ID NO: 2; (iii) a polynucleotide having at least 40%, at least 50%, at least 60%, at least 70%, at least 80%, at least 85%, at least 90%, at least 95%, at least 96%, at least 97%, at least 98%, at least 99%, or at least 99.5% sequence identity to SEQ ID NO: 2; (iv) a polynucleotide that may hybridize under stringent conditions with any polynucleotide of (i)-(iii) or a complementary sequence thereof; (v) the complementary sequence of any polynucleotide of (i)-(iii). Degenerate sequences of the above polynucleotides may also be used/included.

In some embodiments, the polynucleotide is a native sequence (non-altered sequence), a mutant sequence, or a codon-optimized sequence.

In some embodiments, the polynucleotide is codon-optimized for expression in prokaryotes. In some embodiments, the polynucleotide is codon-optimized for expression in eukaryotes, such as human or human cells.

In some embodiments, the nucleic acid is a synthetic nucleic acid. In some embodiments, the nucleic acid is a DNA molecule. In some embodiments, the nucleic acid is an RNA molecule (e.g., an mRNA molecule encoding the Cas9 protein, derivatives thereof, or functional fragments thereof). In some embodiments, the mRNA is capped, polyadenylated, modified with 5-methylcytosine, pseudouridylated, or any combination of the above.

In some embodiments, the nucleic acid (e.g., DNA) is operably linked to a regulatory element (e.g., a promoter) to control expression of the nucleic acid. In some embodiments, the promoter is a constitutive promoter. In some embodiments, the promoter is an inducible promoter. In some embodiments, the promoter is a cell-specific promoter. In some embodiments, the promoter is an organism-specific promoter.

Suitable promoters may be those known in the art, including but not limited to pol I promoters, pol II promoters, pol III promoters, T7 promoters, U6 promoters, H1 promoters, retroviral Moloney murine leukemia virus (MLV) LTR promoters, cytomegalovirus (CMV) promoters, SV40 promoters, dihydrofolate reductase promoters, and β-actin promoters. For example, a U6 promoter may be used to regulate the molecular expression of the guide RNA described in the present disclosure.

In some embodiments, one or more nucleic acids are present in a vector (e.g., a viral vector or a bacteriophage). The vector may be a cloning vector or an expression vector. The vector may be a plasmid, a bacteriophage, a phagemid, or the like. The vector may include one or more regulatory elements, allowing the vector to replicate in a target cell (e.g., a bacterial cell or a mammalian cell). In some embodiments, the vector contains a nucleic acid encoding a single component of the CRISPR-associated (Cas) system of the present disclosure. In some embodiments, the vector contains multiple nucleic acids, each encoding a component of the CRISPR-associated (Cas) system of the present disclosure.

Recombinant Vector

The present disclosure further provides a recombinant vector comprising (a) any one of the polynucleotides Example 1: Screening of CasRfg.3 Protein Through extensive research and experimental validation, the inventors of the present disclosure identified a novel Cas9 nuclease (referred to as CasRfg.3 or Ca2) from a large pool of candidate proteins. This new Cas9 nuclease has a sequence that is significantly different from known Cas9 nucleases.

The genomic sequence of the CasRfg.3 protein is derived from the source shown in Table 1.

TABLE 1

Source of the genomic sequence of the CasRfg.3 protein

| Protein | Database | Genomic ID | Corresponding Coding Sequence Location in Genome | Species Source (as annotated by database) |
|---|---|---|---|---|
| CasRfg.3 protein | NCBI Genbank | GCA_902786545.1 | GCA_902786545.1:CAD ACU010000005.1:49546: 52686+ | species: Uncultured *Anaerovibrio* sp. (*Firmicutes*) Isolate: RUG13183 |

The sequence of the CasRfg.3 protein is shown below (SEQ ID NO: 1, 1046 aa):
MKRKIGIGLDVGIGSVGFAVLSYDKVYDARIEQVGVRLFDSGEEPKTKV

SKNQGRRQYRAGRRLIRRRYHRKERAKRFIERIGLLSADKIKEWQEVNG

NQNIYYVRFRGLSEKLTPQEIADCVIHFCNHRGYREFYEDDVADEKEAG

KIKTALSRFDEKMAAGKYVSVADMILHDNEFSTNTQFPDFHNHKGDDDE

KYFLIKRAALRDELRAILRKQQEFYEQLTEHNIDFLCDDIVFVQRDFED

GPGDKTDKKRKFMGFLDSIGCCMFYKEEVRGYRSTVIADIYSLVNGLSK

MMYVDSTTGEITFLPEAADKIIDFALKNASITEKDIKEILKKYNLTLIK

AEKLEENIPQTIKTLKILKKILDDSGYSYDELIKEEQFDFDRPSKLHEL

CSLLASNITPKRRRKALEKAGWNKALQEQTRRIHFGGTSNVCYRYMLEA

IDAFRHGELYGNFQARRNKEQLTDEAENTEKVRLLPPFTKEMDEDVVKN

VVVFKAINETRKIINALIGKYGSPAYINIEVADELGHSIETRRKMTKAN

NEKMKKKEAISTKLVELGLRKEGEVSGKDIARYRLWEQQDGIDLYTGEN

IPEADVLSGQYDIDHIIPFSLILDDTLNNKVLTGMGSNRQAKSNKAPRE

YLSDKAELEFIKRVNILLKKKIISKKKYKYLMVKNLRDSKLLDEWKSRN

INDTRYISRFLVNYLNNMLLFNSDKKKNVYAINGAITSKMRKLWLNKRT

WGTPEKNRENNLHHAADAIVIANLTPAAVELASDNLKLQNIFRQNGKRV

TEEYDNYLDKAVRKMEKYYHLNEELAKNLLVRKDRIPSMVRSLREETDK

RLVDTSLEEFNMVTPEAFRKNLEQYYNDSDFVASIQMPLVSYKQSKRFS

GSFTKDNPIKKKDKEDSSSVKMDSLGNENILDAKSYYCLEVYSTKDNKT

ALRGLRYVDFKLKNKKMFINVPNPDNYDKHIMYLFKNDYIVVYNKKGEE

RIKGYYTGIKNIKANRFYLISNNDAVRKDFTLSKDDTIKKYHIDILGQI

GGEVKCSAPFLSITEKE

Identification revealed that in the above protein, the amino acid residues at positions 1-52 (Ruvc_I), 473-530 (Ruvc_II), and 686-834 (Ruvc_III) (underlined) correspond to the RuvC nuclease domains; the amino acid residues at positions 531-685 (italicized) correspond to the HNH nuclease domain. The HNH nuclease domain cleaves the complementary strand, while the RuvC nuclease domain cleaves the non-complementary strand, producing a double-strand break (DSB) with specificity.

A domain distribution of the CasRfg.3 protein is shown in FIG. 1.

The native (wild-type) DNA encoding sequence for the CasRfg.3 protein is as follows (SEQ ID NO: 2, 3141 bp):
atgaaaagaaaaattggaatcgggttggatgttggtataggttctgtaggttttgctgtattgtcgtatgataaggtatatgatgccc gtatcgaacaggtaggggtccggcttttttgattctggggaagaacccaaaacaaaagtcagtaagaaccaggggagacggcaatataggg ctggtcgtagattgattcggcgtagataccatcgtaaagagcgggcaaagagatttattgagcggataggtttattaagtgcggacaaaatta aagaatggcaggaagtaaatggcaatcagaatatttactatgtgagatttaggggattgtcggaaaagctcaccccacaagaaattgccgatt gcgttatccatttttgcaaccatagaggttatcgtgaattctatgaagatgatgttgcggatgaaaaggaagctggcaagataaagaccgccct atccagatttgatgaaaaaatggcagctggtaagtatgtatccgttgccgatatgatttttgcatgataatgaattttctacaaacacccagtttc cagatttccataatcataaaggtgatgacgacgaaaaatattttcttattaaacgggcagcgttaagggatgaacttagggcaatactccggaagc aacaggaattctatgaacagttgacggaacataatattgatttcttatgtgacgacatagttttttgttcagcgggattttgaggatggacccggg gataaaactgataaaaagcgtaagtttatgggttttttggatagcataggctgctgtatgttttataaggaagaagttagaggctataggtccac agtaattgcagatatttattccttggtaaacggtttgtccaagatgatgtatgttgacagcaccactggtgaataacattttaccggaagctgc tgacaaaattattgattttgccctaaaaaatgcatccattactgaaaaagatatcaaagaaatactgaagaaatacaatttgacccttataaaggc tgaaaagctagaggaaaacataccgcagactataaagactctgaagatattgaaaaagatattggatgatagtgggtatagttatgatgaattg atcaaggaagaacaatttgatttgataggccatccaaactccatgaattatgtagtttgttagccagcaatattaccccaaaacgcagaagaa aagcattggaaaagctggctggaataaagcattgcaagaacaaaccaggagaatacactttggtggaacatcaaatgtatgctatcgctac atgctagaagctattgatgccttcagacatggtgaattatatggtaatttccaagcccgacgaaataaggaacagcttacagatgaagcagaa aatacggagaaggtaagattattaccaccgttcacaaaagaaatggatgaagatgtggtaaagaatgtagtggttttcaaggcaatcaatgaa

```
acccgcaagataatcaatgcccttataggcaagtacggttcgccggcatatatcaatattgaggtggctgatgaactggggcacagtattgaa accaggcggaaaatgaccaaagccaacaacgaaaaaatgaaaaaaaaggaggctattagtacaaagctggttgaactgggacttcgtaaa gaggggaagtatctggtaaagatatagcgcgttatcgtctatgggagcagcaggatgggatagatttatatacggggaaaatattccaga agcggatgtgctgagtgggcaatatgatattgatcacattatcccattttcgctgatattggatgataccctaaataataaggtactgactggtat ggggagcaatcgtcaggcaaaatccaataaagctcctagagaatatttatctgataaggctgaattggagtttataaagagagtaaatatctta ctgaagaaaaaataatctcaaagaaaaagtacaagtacttgatggtaaagaaccttcgtgacagtaaactgctggatgagtggaagtcaag aaatattaacgacaccagatatataagtcgttttttagtgaactatctaaataatatgttgctatttaacagcgataaaaagaaaaatgtatatgc aatcaatggtgccattacatccaaaatgcgaaaactgtggcttaataagcgaacctggggaactccggaaaagaacagggaaaataatttgc atcatgcagctgatgctatagttattgccaatcttactccagctgcagtggaactggccagtgataaccttaaactccagaatattttccgtcaaa atggcaagcgagtgacggaggaatatgataattatcttgataagcagttcgcaagatggagaagtattatcacttaaatgaagaattggcca agaatctgctggtacgaaaggatcgtattccatccatggtaaggtcattgcgggaggaaacggataagagattggtggatacaagtcttgag gaattcaatatggttacaccagaagcattccgcaaaaatctagagcagtattataatgactctgattttgttgcttccatacagatgccgttggta tcctataagcagtccaagcggttttctggaagctttactaaggataatcctataaagaaaaaagataaagaagactcatcaagtgtaaaaatgg actctttaggcaatgaaaatatttttggatgccaaatcgtattactgtttggaggtgtattccacaaaagataataagacggctttgcgcggccta ggtatgttgattttaaattgaaaaacaaaaagatgtttatcaatgttcctaatccagataattatgataagcatattatgtatttgtttaagaatg attatattgtggtgtacaacaaaaaggagaggaaagaattaaaggttattatacaggaataaaaaacatcaaagctaatagattttatttgataa gtaacaatgatgcggtgcgaaaagattttacattatctaaagatgatactataaaaaaatatcacattgatattcttgggcaaattggtggtgagg taaaatgttccgctccattcttgtcaataacggagaaagaataa
```

The codon-optimized DNA encoding sequence for the CasRfg.3 protein is as follows (SEQ ID NO: 10):

```
atgaagagaaagatcggcatcggcctggacgtgggcatcggcagcgtgggcttcgccgtgctgagctacgacaaggtgtac gacgccagaatcgagcaggtgggcgtgagactgttcgacagcggcgaggagcccaagaccaaggtgagcaagaaccagggcagaag acagtacagagccggcagaagactgatcagaagaagataccacagaaaggagagagccaagagattcatcgagagaatcggcctgctg agcgccgacaagatcaaggagtggcaggaggtgaacggcaaccagaacatctactacgtgagattcagaggcctgagcgagaagctga cccccaggagatcgccgactgcgtgatccacttctgcaaccacagaggctacagagagttctacgaggacgacgtggccgacgagaag gaggccggcaagatcaagaccgccctgagcagattcgacgagaagatggccgccggcaagtacgtgagcgtggccgacatgatcctgc acgacaacgagttcagcaccaacacccagttccccgacttccacaaccacaagggcgacgacgacgagaagtacttcctgatcaagaga gccgccctgagagacgagctgagagccatcctgagaaagcagcaggagttctacgagcagctgaccgagcacaacatcgacttcctgtg cgacgacatcgtgttcgtgcagagagacttcgaggacggccccggcgacaagaccgacaagaagagaaagttcatgggcttcctggaca gcatcggctgctgcatgttctacaaggaggaggtgagaggctacagaagcaccgtgatcgccgacatctacagcctggtgaacggcctga gcaagatgatgtacgtggacagcaccaccggcgagatcaccttcctgcccgaggccgccgacaagatcatcgacttcgccctgaagaac gccagcatcaccgagaaggacatcaaggagatcctgaagaagtacaacctgaccctgatcaaggccgagaagctggaggagaacatcc cccagaccatcaagaccctgaagatcctgaagaagatcctggacgacagcggctacagctacgacgagctgatcaaggaggagcagttc gacttcgacagacccagcaagctgcacgagctgtgcagcctgctggccagcaacatcacccccaagagaagaagaaaggccctggaga aggccggctggaacaaggccctgcaggagcagaccagaagaatccacttcggcggcaccagcaacgtgtgctacagatacatgctgga ggccatcgacgccttcagcacggcgagctgtacggcaacttccaggccagaagaaacaaggagcagctgaccgacgaggccgagaa caccgagaaggtgagactgctgccccccttcaccaaggagatggacgaggacgtggtgaagaacgtggtggtgttcaaggccatcaacg agacaagaaagatcatcaacgccctgatcggcaagtacgcgcagccccgcctacatcaacatcgaggtggccgacgagctgggccacag catcgagacaagaagaaagatgaccaaggccaacaacgagaagatgaagaagaaggaggccatcagcaccaagctggtggagctgg gcctgagaaaggagggcgaggtgagcggcaaggacatcgccagatacagactgtgggagcagcaggacggcatcgacctgtacaccg gcgagaacatccccgaggccgacgtgctgagcggccagtacgacatcgaccacatcatccccttcagcctgatcctggacgcacccctg
```

```
aacaacaaggtgctgaccggcatgggcagcaacagacaggccaagagcaacaaggccccagagagtacctgagcgacaaggccga gctggagttcatcaagagagtgaacatcctgctgaagaagaagatcatcagcaagaagaagtacaagtacctgatggtgaagaacctgag agacagcaagctgctggacgagtggaagagcagaaacatcaacgacaccagatacatcagcagattcctggtgaactacctgaacaacat gctgctgttcaacagcgacaagaagaagaacgtgtacgccatcaacggcgccatcaccagcaagatgagaaagctgtggctgaacaaga gaacctggggcaccccgagaagaacagagagaacaacctgcaccacgccgccgacgccatcgtgatcgccaacctgaccccgccg ccgtggagctggccagcgacaacctgaagctgcagaacatcttcagacagaacggcaagagagtgaccgaggagtacgacaactacct ggacaaggccgtgagaaagatggagaagtactaccacctgaacgaggagctggccaagaacctgctggtgagaaaggacagaatcccc agcatggtgagaagcctgagagaggagacagacaagagactggtggacaccagcctggaggagttcaacatggtgaccccgaggcct tcagaaagaacctggagcagtactacaacgacagcgacttcgtggccagcatccagatgccctggtgagctacaagcagagcaagaga ttcagcggcagcttcaccaaggacaacccatcaagaagaaggacaaggaggacagcagcagcgtgaagatggacagcctgggcaac gagaacatcctggacgccaagagctactactgcctggaggtgtacagcaccaaggacaacaagaccgccctgagaggcctgagatacgt ggacttcaagctgaagaacaagaagatgttcatcaacgtgcccaaccccgacaactacgacaagcacatcatgtacctgttcaagaacgac tacatcgtggtgtacaacaagaagggcgaggagagaatcaagggctactacaccggcatcaagaacatcaaggccaacagattctacctg atcagcaacaacgacgccgtgagaaaggacttcaccctgagcaaggacgacaccatcaagaagtaccacatcgacatcctgggccagat cggcggcgaggtgaagtgcagcgccccttcctgagcatcaccgagaaggag
```

According to the bacterial genomic sequence in Table 1, the DR sequence and tracrRNA sequence corresponding to the crRNA for the CasRfg.3 protein are as follows:

```
DR sequence (SEQ ID NO: 11):
guuuuaguucuauguuggauauugauaaacugauac;

tracrRNA sequence (SEQ ID NO: 12):
uugucaguuuaucaauauccaacaauaguucuaagauaaggccuuaugu gccguagggguauagcgguaucccgaacaauuccgcugcuuugaguauua agcugcuacaucauguagcagc.
```

Example 2: Preparation of CasRfg.3 Protein

1. Vector Construction

A pET28a vector plasmid was digested with BamHI and XhoI, followed by agarose gel electrophoresis to recover a linearized vector through gel extraction. A DNA sequence encoding the CasRfg.3 protein, prepared by conventional methods, was inserted into a cloning region of the pET28a vector via homologous recombination to construct a recombinant vector CasRfg.3-pET28a. The reaction mixture was used to transform Stbl3 competent cells, which were then plated on LB agar containing kanamycin sulfate and cultured overnight at 37° C. Clones were picked for sequencing verification. The sequence of the constructed recombinant vector CasRfg.3-pET28a is presented as SEQ ID NO: 13.

Positive clones with correct sequence were selected, and a single clone was picked for overnight culture. After plasmid extraction, the plasmid was transformed into the expression strain Rosetta (DE3). The transformed cells were plated onto a LB agar plate containing kanamycin sulfate (resistant) and cultured overnight at 37° C.

2. Protein Expression

A single colony was inoculated into 5 ml of LB medium containing kanamycin sulfate (resistant) and cultured overnight at 37° C.

The culture was then transferred at a ratio of 1:100 into 500 ml of LB medium supplemented with kanamycin sulfate (resistant). The culture was incubated at 37° C. with shaking at 220 rpm until an OD of 0.6 was reached. IPTG was added to a final concentration of 0.2 mM, and the culture was induced at 16° C. for 24 hours.

After washing the cells with 15 mL of PBS and centrifuging to collect the cells, the cells were lysed by sonication in lysis buffer. The supernatant, containing a recombinant protein, was obtained by centrifuging at 10,000 g for 30 minutes. The supernatant was filtered through a 0.45 μm filter membrane and then applied to a column for purification.

3. Protein Purification

The recombinant CasRfg.3 protein consists of 1135 amino acids (with the native CasRfg.3 protein composed of 1046 amino acids) and is structured as His tag-NLS-CasRfg.3-SV40 NLS-nucleoplasmin NLS. The CasRfg.3 recombinant protein was purified using an N-terminal His tag through immobilized metal affinity chromatography (IMAC) using Ni Sepharose 6 Fast Flow (Cytiva), followed by ion exchange chromatography (Cytiva HiTrap™ Q FF) and size exclusion chromatography (Cytiva Superdex™ 200 Increase 10/300 GL). The purified recombinant protein was analyzed by SDS-PAGE, displaying a single band.

Example 3: Determination of PAM Sequence of CasRfg.3 Protein

In this example, a single guide RNA (sgRNA) containing a specific guide sequence is combined with the CasRfg.3 recombinant protein purified in Embodiment 2 to cleave an in vitro substrate (containing a spacer sequence and a 7 nt random sequence). After incubation at 37° C., purification, library construction, and next-generation sequencing (NGS) are performed to analyze the PAM sequence of CasRfg.3. The specific operations are as follows:

A. In Vitro Cleavage of a Substrate by CasRfg.3 Protein

```
The sequence of the substrate cleaved by
CasRfg.3 protein in vitro is (SEQ ID NO: 14):
ggagttcagacgtgtgctcttccgatctcagcacaaaaggaaactcaccc taactgtaaagtaattgtgtgttttgagactataaatatgcatgcgagaa aagccttgtttgccaccatgGAACGGCTCGGAGATCATCATTGCGNNNNNN
```

NNgtgagcaagggcgaggagctgttcaccggggtggtgcccatcctggtc gagctggacggcgacgtaaacggccacaagttcagcgtgtccggcagatc ggaagagcacacgtctgaactcc In the sequence, N represents any one of A, T, C, or G.

Double-stranded DNA containing the above sequence is prepared using conventional PCR amplification methods and used as an in vitro cleavage substrate.

The cleavage substrate is sent to a sequencing company for PCR-free library construction and NGS sequencing. The complexity and abundance of the PAM library, consisting of 7 nt random sequences, are analyzed. The results are as follows.

The composition of the four bases A, T, G, and C is basically consistent. The PAM library consisting of 7 nt random sequences includes different combinations totaling $4^7=16,384$, all of which were detected. The complexity and abundance of the PAM library are qualified.

B. Preparation of sgRNA in Conjunction with CasRfg.3

SgRNA containing the specific guide sequence (Cas-Rfg.3-sgRNA) is synthesized in vitro at 37° C. in a system containing T7 RNA polymerase, four ribonucleoside triphosphates, and a DNA template with a T7 promoter. The transcription product is purified using the Ribo™ RNAmax-T7 In vitro Transcription Kit purification reagent. The sgRNA sequence is as follows (SEQ ID NO: 15):

5'-GAACGGCUCGGAGAUCAUCAUUGCGguuuuaguucuauguuggauau ugauaaacugauacgaaauugucaguuuaucaauauccaacaauaguucu aagauaaggccuuaugugccguagggauagggguauccegaacaauucgc ugcuuugaguauuaagcugcuacaucauguagcagc-3'.

The capitalized bases represent the specific guide sequence of the sgRNA.

C. NGS Library Construction and PAM Analysis

A reaction system containing the CasRfg.3 protein, the sgRNA, the in vitro cleavage substrate, and a buffer is prepared to react at 37° C. for 3 hours, followed by 75° C. for 15 minutes. As shown in Table 2.

TABLE 2

| Component | Amount (μl) |
| --- | --- |
| 10xCut Buffer(200 mM HEPES, 1M NaCl, 50 mM MgCl$_2$, 1 mM EDTA) | 5 |
| Cleavage substrate (59.5 ng/μl) | 36.5 |
| CasRfg.3 sgRNA(340.3 ng/μl) | 8 |
| CasRfg.3protein (10 mg/ml) | 0.5 |

The cleaved fragments are subjected to a ligation reaction to add a biotin-labeled adapter (Adapter1) to the ends of the cleavage sites. The biotin-labeled adapter-containing cleavage products are specifically bound to streptavidin-coated magnetic beads (Beads) for purification. The specifically purified fragments are then amplified by PCR and subjected to NGS sequencing.

The NGS library is constructed through the following operations:

a. Add 68.16 μl of SPRISelect Beads (Beckman COULTER, B23318) to a reaction product, mix thoroughly, and incubate at room temperature for 5 minutes. Transfer the product to a magnetic stand and let it adhere for 5 minutes. Transfer the supernatant to a new 1.5 ml tube; then add 34.08 μl of SPRISelect Beads (Beckman COULTER, B23318), mix thoroughly, and incubate at room temperature for 5 minutes. Transfer the product to a magnetic stand and let it adhere for 5 minutes. Discard the supernatant, wash the product twice with 85% ethanol, air-dry at room temperature for 10 minutes, and elute with 50 μl of ddH2O.

b. Perform end repair and add dA-tailing (NEB, E6053L) to the product using the system shown in Table 3, and perform the reaction at 37° C. for 30 minutes.

TABLE 3

Addition of dA-tailing to Ca2 cleavage product

| Component | Amount (μl) |
| --- | --- |
| Ca2 cleavage product | 42 |
| dA-tailing reaction buffer | 5 |
| Klenow Fragment | 3 |
| ddH$_2$O | Up to 50 | c. Add Adapter 1 (annealed from upstream primer: 5'Biosg/gttgacatgctggattgagac ttcctacactctttccctacacgacgctcttccgatc*t (SEQ ID NO: 16) and downstream primer: gatcggaagagcgtcgtgtagg-gaaagatgtaggaagtctcaatccagcatgtcaac (SEQ ID NO: 17)) according to the system in Table 4, and incubate at 20° C. for 30 minutes followed by an overnight reaction at 16° C.

TABLE 4

Addition of Adapter 1 reaction system

| Component | Amount (μl) |
| --- | --- |
| dA-tailed DNA | 38 |
| Adapter 1 | 2 |
| T4 DNA Ligase buffer(10x) | 5 |
| NEB Quick Ligase | 5 |
| ddH$_2$O | Up to 50 |

The above reaction products were purified using SPRISelect Beads after overnight reaction.

d. Product purification using Streptavidin-labeled magnetic beads Dynabeads® M-280 Streptavidin (Invitrogen, 11206D).

e. Recover PCR

Primers from Table 5 were designed and Recover PCR was performed using Q5® Hot Start High-Fidelity 2× Master Mix (NEB, M0494L) according to the system in Table 6 as well as the reaction program in Table 7.

TABLE 5

Recover PCR primers

| Primer ID | Sequence |
| --- | --- |
| Recovery PCR Forward | ggagttcagacgtgtgctc (SEQ ID NO: 18) |
| Recovery PCR Reverse | gttgacatgctggattgagacttc (SEQ ID NO: 19) |

TABLE 6

Recover PCR reaction system

| Component | Amount (μl) |
| --- | --- |
| Streptavidin magnetic beads purified product | 22.5 |
| Recovery PCR Forward(10 uM) | 2.5 |

TABLE 6-continued

Recover PCR reaction system

| Component | Amount (μl) |
|---|---|
| Recovery PCR Reverse(10 uM) | 2.5 |
| Q5 Hot-Start 2x Master Mix | 22.5 |
| ddH2O | Up to 50 |

TABLE 7

Recover PCR reaction program

| Reaction Temperature | Duration | Cycles |
|---|---|---|
| 98° C. | 2 min | 1 |
| 98° C. | 10 sec | 12 |
| 61° C. | 30 sec | |
| 72° C. | 2 min | |
| 72° C. | 2 min | 1 |
| 4° C. | ∞ | | f. Recover PCR product was transferred to a magnetic rack, adsorbed for 5 min, supernatant was transferred to a new 1.5 ml centrifuge tube, 3 μl of Recovery PCR product was taken and diluted by adding 148.5 μl of ddH2O.

g. Index PCR

Index PCR was performed using the primers from Table 8 according to the system of Table 9 as well as the reaction program of Table 10.

TABLE 8

Index PCR primers

| Primer | Sequence |
|---|---|
| IF501 | aatgatacggcgaccaccgagatctacactatagcct acactctttccctacacgacg(SEQ ID NO: 20) |
| IR701 | caagcagaagacggcatacgagatcgagtaatgtgac tggagttcagacgtgtgctc(SEQ ID NO: 21) |

TABLE 9

Index PCR reaction system

| Component | Amount (μl) |
|---|---|
| Recovery PCR diluted product | 12 |
| IF501(10 uM) | 4 |
| IR701(10 uM) | 4 |
| Q5 Hot-Start 2x Master Mix | 20 |
| Total | 40 |

TABLE 10

Index PCR reaction program

Figure 2:
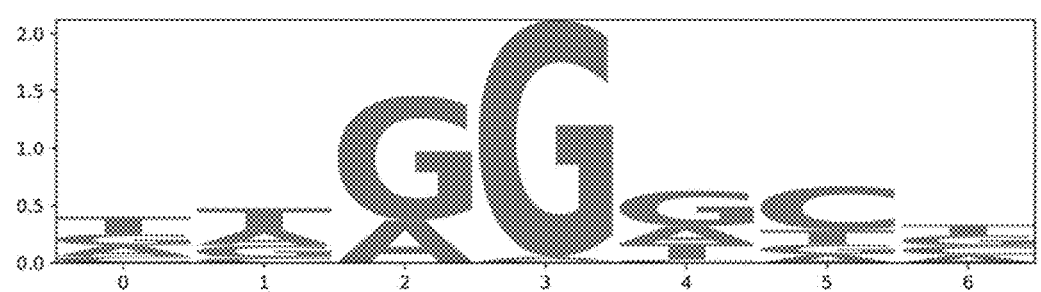
FIG. 2 is a schematic diagram illustrating a PAM sequence recognized by a CasRfg.3 protein.

| Reaction Temperature | Duration | Cycles |
|---|---|---|
| 98° C. | 2 min | 1 |
| 98° C. | 10 sec | 12 |
| 60° C. | 30 sec | |
| 72° C. | 2 min | |
| 72° C. | 2 min | 1 |
| 4° C. | ∞ | | h. The Index PCR product was purified by adding 0.7× SPRISelect Beads, eluted by adding 38 μl ddH2O, and concentration was determined by using Qubit at 22.4 ng/μl, which met the requirements for testing and was sent to NGS for sequencing.

i. Analysis of NGS results: Using the NGS data and following the method described in the reference (A compact Cas9 ortholog from *Staphylococcus auricularis* (SauriCas9) expands the DNA targeting scope. PLOS Biology, 2020, 18 (3), e3000686), the PAM sequence for CasRfg.3 was analyzed using WebLogo software, as shown in FIG. 2.

Thus, the PAM sequence of CasRfg.3 includes: 5'-DDRGDNN-3' (D is A, G or T; R is A or G; N is A, C, G or T). Specifically, the PAM sequence includes: 5'-ATAGGCT-3', 5'-AAGGCT-3', 5'-AGGGTCG-3', 5'-GAGGTCC-3', 5'-TTGGGCT-3', 5'-TGGGGTA-3', 5'-TGGGGGC-3', 5'-GGGGGGA-3', 5'-AGAGGAT-3', 5'-AGGGTCC-3', 5'-ATAGGGA-3', 5'-GTAGAAT-3', 5'-GGGGAAG-3', 5'-TAAGGTT-3', and 5'-TGGGTAG-3'.

The unique PAM of CasRfg.3 expands the range of targetable sequences.

Example 4: Selection of Target Nucleic Acid Sequences in the Human Genome for Cleavage Validation Based on PAM Analysis Results Target nucleic acid sequences in the human genome that are consistent with the PAM sequence identified for the CasRfg.3 protein in Example 3 above were selected for cleavage activity validation. The specific operations are as follows:

A. Amplification of Cleaved Substrate

Based on the analyzed PAM sequences, two different fragments CasRfg.3-N2 and CasRfg.3-N4 with PAM sequences TTGGTCT and GAGGTCG, respectively, were selected from the human genome for cleavage testing.

1. Sequence Information of Fragments CasRfg.3-N2 and CasRfg.3-N4

>CasRfg.3-N2 sequence (SEQ ID NO: 22):
Gaatgggctatttctaagcacggcaggtaccgtcttccccttcccccgcc aacacagctggcccaggacaagaaggtgcagagacaaacaggggggcaccc tgcctgtcctgctaggaactgcaaggcagcgtgccgcacacgctgcctgg gccaatgccacccaggccaggagagggtttggggccagacaccagcccat acccaagggtcccaggggatgtggggagaaggggaatccaccttttcctt ccctcccacctcccaaATAACACACAGACAGCTCTGTTGGTCTgagaatg atggacatttagacactggcgccaggttttgcgcctgaccggcgccacgca gggggtgggcggagcaaagacacacaggtgggctacaggtgtcacacggca ccagccagggcccggggtggctggggtgaggatgggtgtttggccagtga ccaggagtcaggtcaagtccaggtggtcagtgccaggggctccaggaggg gagggcagtgccataaccctcctggtgtccag >CasRfg.3-N4 sequence (SEQ ID NO: 23):
ggcactgtgccctccagattcctcagagcctggtgccaggtgcacctccc cagccctctcagccctgagctctgccaccctgcccgggcttctgccctt gggtcctggcctctcagggtctcctcagctctgcaaggaggggctgggag caggtcccaggctagcagtgggctggaggcctcctgtgtggtctctacct gtccatgCCGAGGGGTCACCTCTGGGTGAGGTCGcacccacccccctcac ggggctgctttgccagaaggtctgttcccctcatggcctctgctactctt -continued

```
tacacttagttcttcccaggaagggcccggtggctgcagataatgtttcc catctgtggagccttcaagggctgggcccatgaggattctgctcccagct tgctcttcctctccagcctgcacccaccaggcccagaatcctgaggatg gagctgctcctgtcccctgaggtggtctaaacctctggggaggcactgga
```

The capitalized bases correspond to the target sequence; the underlined bases represent the PAM sequence.

2. Vector Construction

The CasRfg.3-N2 and CasRfg.3-N4 sequence fragments were amplified and ligated into the pEASY®-Blunt Zero Cloning (TransGen, Cat. No. CB501) vector. The ligation product was heat-shock transformed into *E. coli* 2T1 competent cells (Yingjun Bio, Cat. No. CC007). The transformed ligation product was verified by sequencing.

Figure 3:
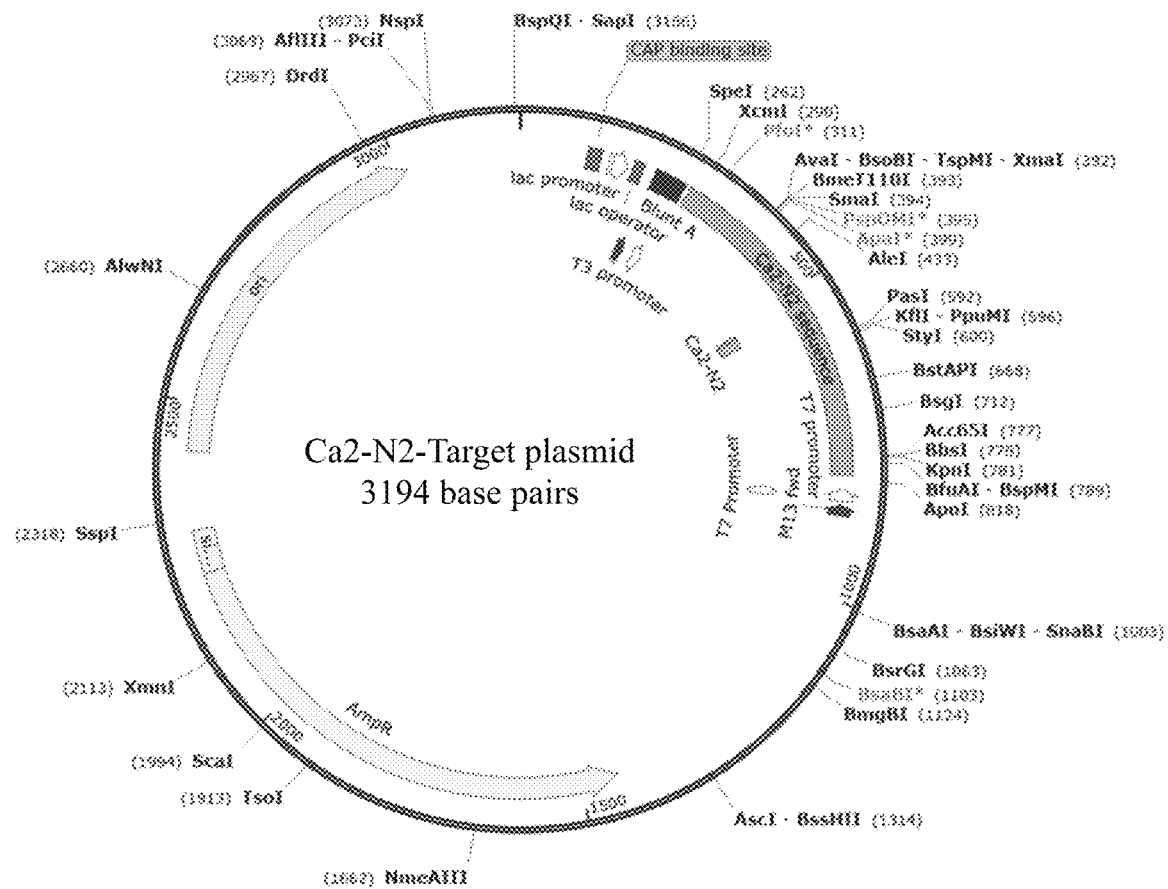
FIG. 3 is a map of a CasRfg.3-N2-Target plasmid vector.
Figure 4:
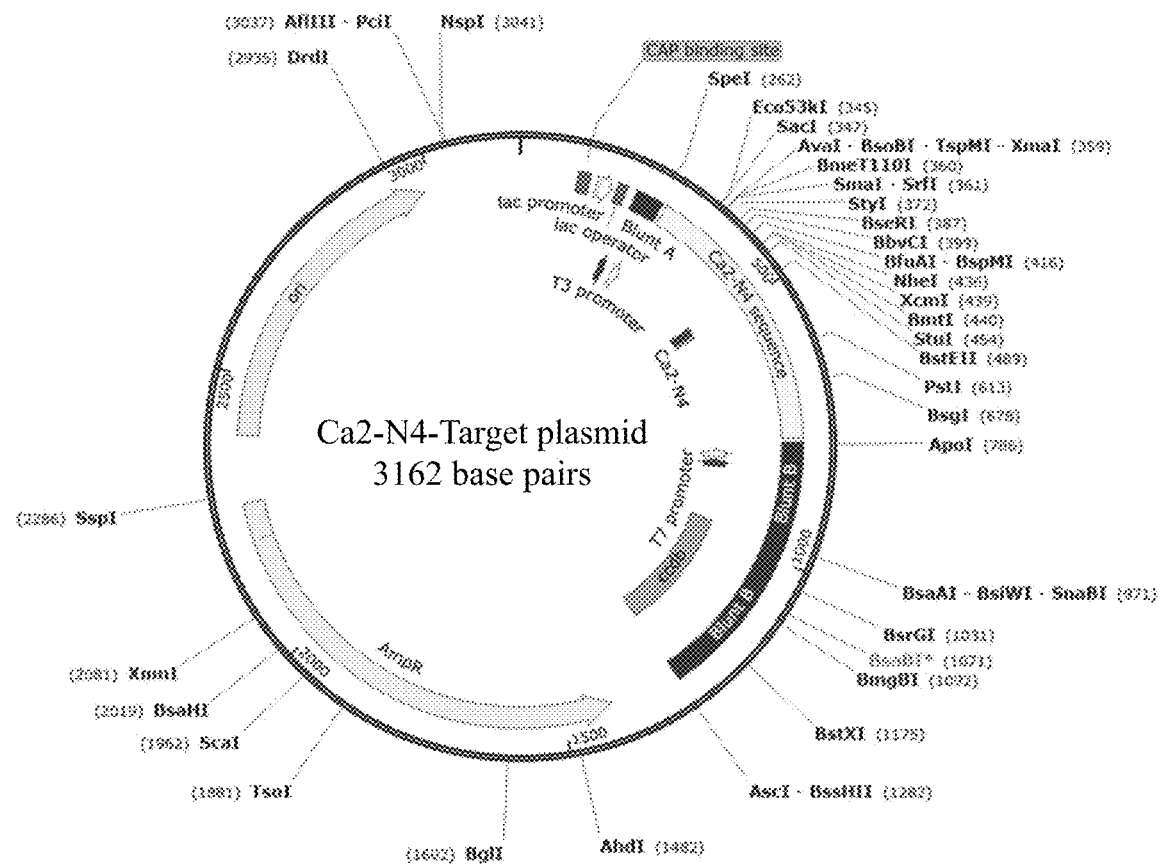
FIG. 4 is a map of a CasRfg.3-N4-Target plasmid vector.

The constructed CasRfg.3-N2-Target plasmid is shown in FIG. 3 and SEQ ID NO: 24; CasRfg.3-N4-Target plasmid is shown in FIG. 4 and SEQ ID NO: 25.

The constructed CasRfg.3-N2-Target plasmid and CasRfg.3-N4-Target plasmid were linearized enzymatically using XmnI (NEB, R0194), and the linearization system is shown in Table 11.

TABLE 11

| Component | Amount (µl) |
| --- | --- |
| Ca2-N2-Target plasmid/Ca2-N4-Target plasmid | 10 µg |
| 10xCutSmart Buffer | 5 |
| XmnI(10 µ/µl) | 1 |
| ddH₂O | Up to 50 |

After completion of the reaction at 37° C. according to the above system, the product was purified using the Wizard® SV Gel and PCR Clean-Up System (Progema, A9282) and the concentration was determined by Nanodrop.

B. In Vitro Transcription of CasRfg.3-N2 Corresponding sgRNA and CasRfg.3-N4 Corresponding sgRNA Two sgRNAs were designed for the target sequences of CasRfg.3-N2 and CasRfg.3-N4 and transcribed in vitro. The sgRNA sequences corresponding to CasRfg.3-N2 and CasRfg.3-N4 are as follows:

```
CasRfg.3-N2-sgRNA sequence (SEQ ID NO: 26):
5'-AUAACACACAGACAGCUCUGguuuuaguucuauguuggauauugaua aacugauacgaaauugucaguuuaucaauauccaacaauaguucuaagau aaggccuuaugugccguagggguauagggguaucccgaacaauuccgcugcu uugaguauuaagcugcuacaucauguagcagc-3'

CasRfg.3-N4-sgRNA sequence (SEQ ID NO: 27):
5'-ccgaggggucaccucugggguguuuuaguucuauguuggauauugaua aacugauacgaaauugucaguuuaucaauauccaacaauaguucuaagau aaggccuuaugugccguagggguauagggguaucccgaacaauuccgcugcu uugaguauuaagcugcuacaucauguagcagc-3'
```

The capitalized bases represent the guide sequence.

Transcription products were purified using purification reagents provided in the Ribo™ RNAmax-T7 In Vitro Transcription Kit, and RNA concentration was determined by Nanodrop for future use.

C. In Vitro Cleavage Experiment

Reaction systems for cleavage were prepared according to Tables 12 and 13, reacted at 37° C., and inactivated at 75° C.

TABLE 12

In vitro cleavage reaction system for CasRfg.3-N2

| Component | Amount (µL) |
| --- | --- |
| 10xCut Buffer (200 mM HEPES, 1M NaCl, 50 mM MgCl₂, 1 mM EDTA) | 5 |
| CasRfg.3-N2-Target linearized plasmid (140.8 ng/µL) | 17 |
| CasRfg.3-N2-sgRNA(178.9 ng/µL) | 15 |
| Purified CasRfg.3 recombinant protein of Embodiment 2 (10 mg/ml) | 0.5 |
| ddH₂O | Up to 50 |

TABLE 13

In vitro cleavage reaction system for CasRfg.3-N4

| Component | Amount (µL) |
| --- | --- |
| 10xCut Buffer (200 mM HEPES, 1M NaCl, 50 mM MgCl₂, 1 mM EDTA) | 5 |
| CasRfg.3-N4-Target linearized plasmid (189.9 ng/µL) | 13 |
| CasRfg.3-N4-sgRNA(428.5 ng/µL) | 6.5 |
| Purified CasRfg.3 recombinant protein of Embodiment 2 (10 mg/ml) | 0.5 |
| ddH₂O | Up to 50 |

Figure 5:
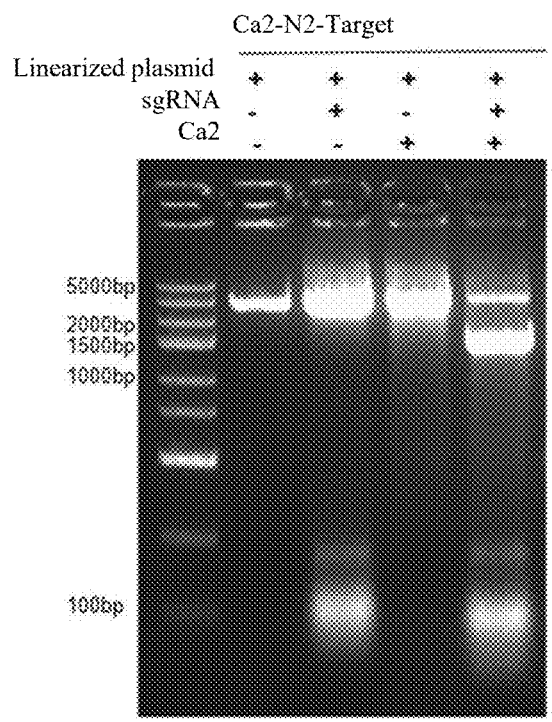
FIG. 5 is an electrophoresis of CasRfg.3-N2 cleavage products, with fragment lengths of 1589 bp/1605 bp.
Figure 6:
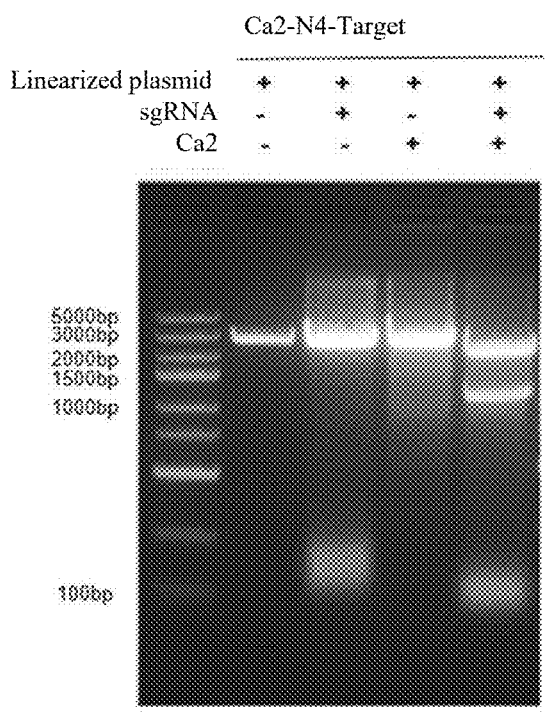
FIG. 6 is an electrophoresis of CasRfg.3-N4 cleavage products, with fragment lengths of 1582 bp/1580 bp.

6 µL of loading buffer was added to the cleavage products, and 30 µL of the cleavage products was used for electrophoresis to assess the cleavage effect. Electrophoresis results are shown in FIGS. 5 and 6. The results demonstrate that the CasRfg.3 protein exhibited gRNA-guided nuclease activity with high cleavage efficiency.

Figure 7:
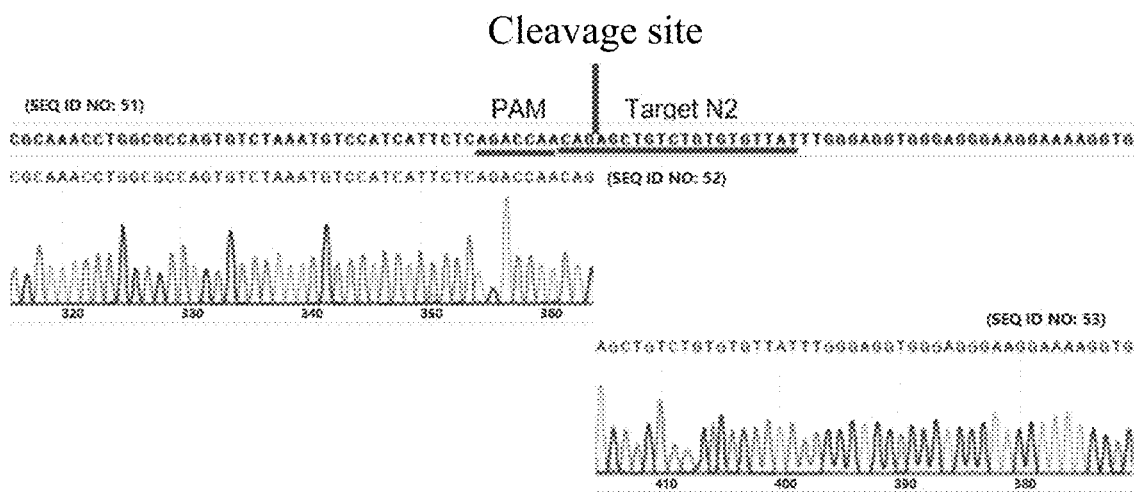
FIG. 7 is a schematic diagram illustrating a sequencing result of CasRfg.3-N2 cleavage fragments.
Figure 8:
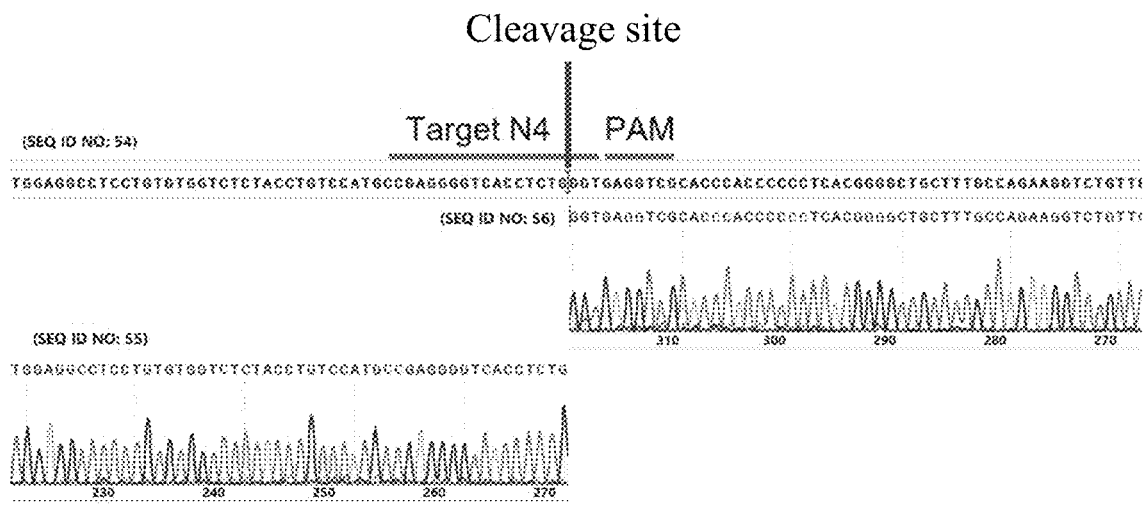
FIG. 8 is a schematic diagram illustrating a sequencing result of CasRfg.3-N4 cleavage fragments.

Fragments resulting from the cleavage were gel-extracted and sequenced. Sequencing results are shown in FIGS. 7 and 8, indicating cleavage activity and revealing the cleavage sites.

Example 5: asRfg.3 Protein Cleavage Stability Experiments

A reaction system was prepared according to Table 14, and the cleavage effect was repeatedly tested at 37° C.

TABLE 14

In vitro cleavage reaction system for CasRfg.3-N2

| Component | Amount (µL) |
| --- | --- |
| 10xCut Buffer(200 mM HEPES, 1M NaCl, 50 mM MgCl₂, 1 mM EDTA) | 5 |
| Linearized CasRfg.3-N2-Target Plasmid of Embodiment 4 (140.8 ng/µL) | 17 |
| CasRfg.3-N2-sgRNA of Embodiment 4 (178.9 ng/µL) | 15 |
| Purified CasRfg.3 Recombinant Protein of Embodiment 2 (10 mg/ml) | 0.5 |
| ddH₂O | Up to 50 |

Figure 9:
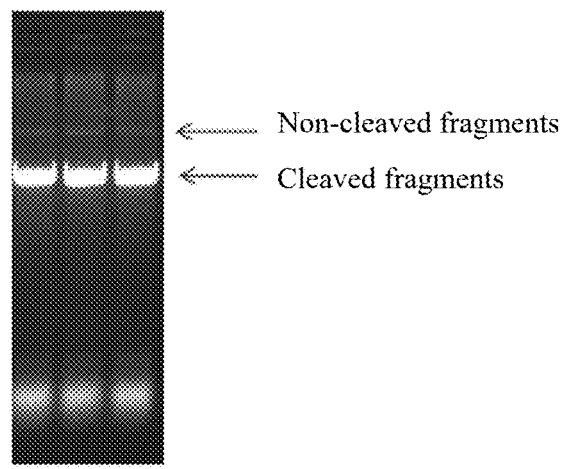
FIG. 9 is a schematic diagram illustrating the consistent cleavage performance of CasRfg.3-N2 across multiple repeated experiments.

After inactivation at 75° C., 6 µL of loading buffer was added to the product. A 30 µL sample was taken for electrophoresis, and the results are shown in FIG. 9, indicating that DNA can be cleaved stably across multiple experiments.

Example 6: Cleavage Effects of asRfg.3 Protein at Different Temperatures

A reaction system was prepared according to Table 15. The cleavage was conducted at 25° C., 30° C., 34.9° C., 37° C., 39.9° C., 45.4° C., 50° C., and 55° C. for the same duration, followed by inactivation at 75° C.

TABLE 15

In vitro cleavage reaction system for CasRfg.3-N2

| Component | Amount (µL) |
|---|---|
| 10xCut Buffer(200 mM HEPES, 1M NaCl, 50 mM MgCl$_2$, 1 mM EDTA) | 5 |
| CasRfg.3-N2-Target Plasmid of Embodiment 4 (140.8 ng/µL) | 17 |
| CasRfg.3-N2-sgRNA of Embodiment 4 (178.9 ng/µL) | 15 |
| CasRfg.3protein of Embodiment 2 (10 mg/ml) | 0.5 |
| ddH$_2$O | Up to 50 |

Figure 10:
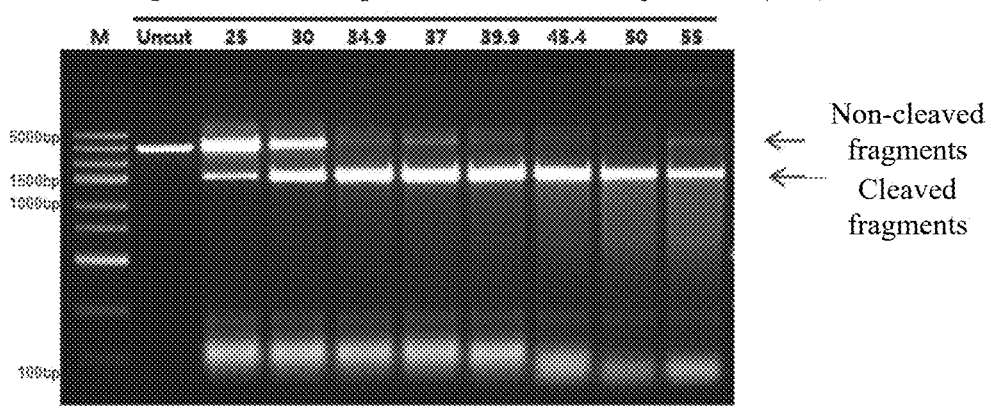
FIG. 10 is a schematic diagram illustrating the cleavage efficiency of CasRfg.3 at different temperatures.

For each cleavage product, 6 µL of loading buffer was added and 30 µL was taken for electrophoresis to assess the cleavage effect. Electrophoresis results are shown in FIG. 10, indicating detectable cleavage activity from 25° C. to 55° C., with higher activity between approximately 35° C. to 55° C., and optimal cleavage activity observed around 50° C.

Example 7: Modification of gRNA Scaffold Sequence

Previous examples have demonstrated that a single molecule sgRNA, obtained by linking the natural DR sequence and tracrRNA sequence corresponding to CasRfg.3, exhibits activity. The scaffold sequence for the sgRNA is referred to as CasRfg.3-sgRNA-scaffold.

Figure 11A:
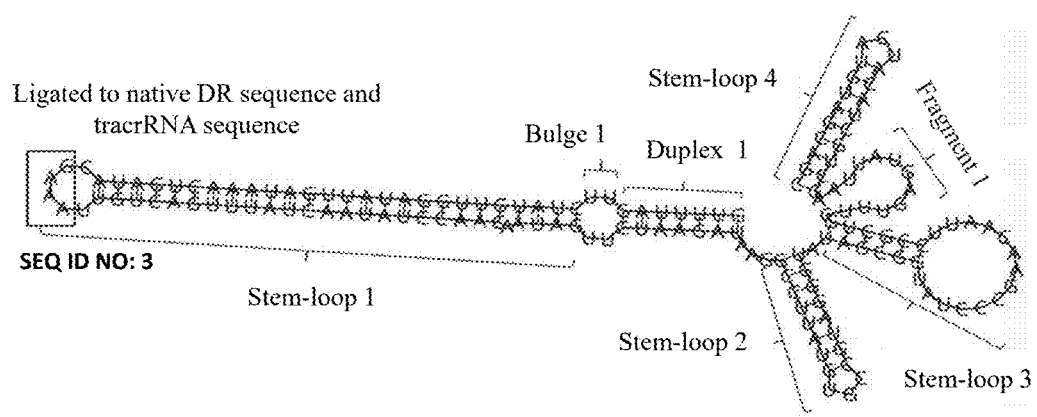
FIGS. 11A-11G are schematic diagrams illustrating predicted secondary structures of various scaffold sequences by RNAfold.

```
>CasRfg.3-sgRNA-scaffold (SEQ ID NO: 3,
160 nt; formed by linking natural DR and
tracrRNA sequences to create the sgRNA
scaffold; shown in FIG. 11A):
5'-GUUUUAGUUCUAUGUUGGAUAUUGAUAAACUGAUACGAAAUUGUCAG
UUUAUCAAUAUCCAACAAUAGUUCUAAGAUAAGGCCUUAUGUGCCGUAGG
GUAUAGCGGUAUCCCGAACAAUUCCGCUGCUUUGAGUAUUAAGCUGCUAC
AUCAUGUAGCAGC-3'
```

Figure 11B:
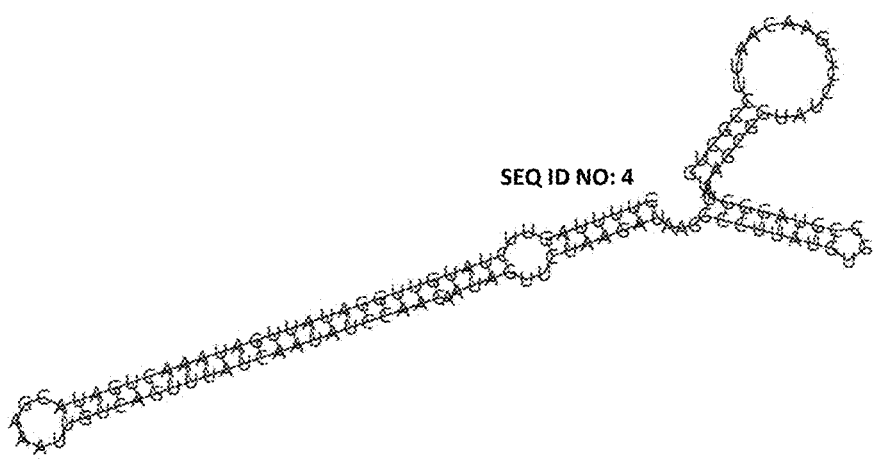

The inventors have partially deleted and truncated the sequence of the CasRfg.3-sgRNA-scaffold, resulting in a shorter, chemically synthesizable sgRNA that retains activity. The specifically designed truncated scaffold sequences are as follows (SEQ ID NOs: 4-9):

```
>tracSL2 (SEQ ID NO: 4, 126 nt; deleted
stem-loop 4 and segment 1; shown in
FIG. 11B):
5'-GUUUUAGUUCUAUGUUGGAUAUUGAUAAACUGAUACGAAAUUGUCAG
UUUAUCAAUAUCCAACAAUAGUUCUAAGAUAAGGCCUUAUGUGCCGUAGG
GUAUAGCGGUAUCCCGAACAAUUCCGCUG-3'

Figure 11C:
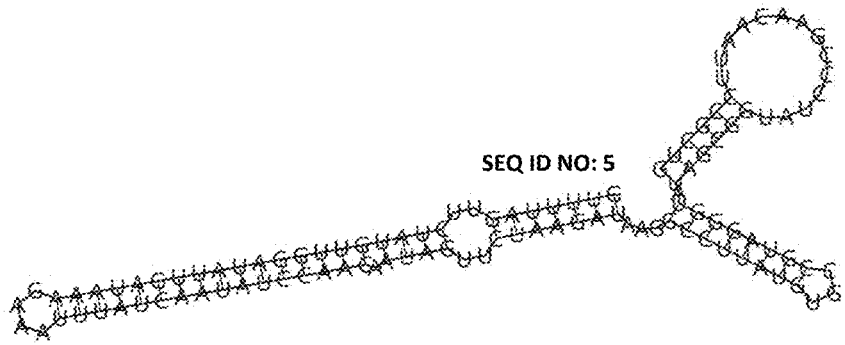

>tracSL2-1 (SEQ ID NO: 5, 112 nt; deleted
stem-loop 4 and segment 1, shortened stem-
loop 1; shown in FIG. 11C):
5'-GUUUUAGUUCUAUGUUGGAUAUUGAUAAAGAAAUUUAUCAAUAUCCA
ACAAUAGUUCUAAGAUAAGGCCUUAUGUGCCGUAGGGUAUAGCGGUAUCC
CGAACAAUUCCGCUG-3'

Figure 11D:
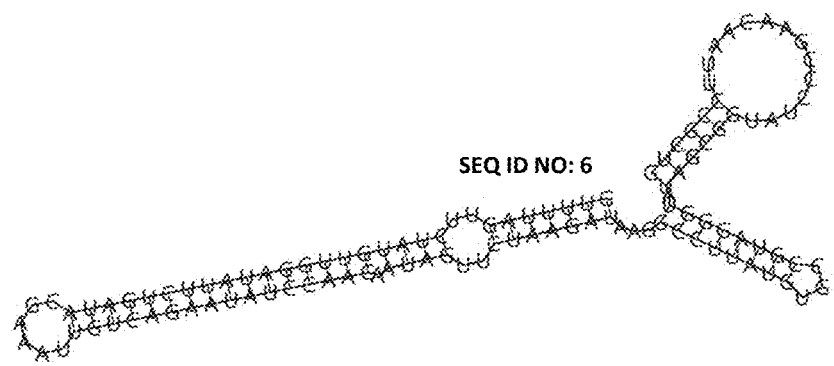

>tracSL2-2 (SEQ ID NO: 6, 114 nt; deleted
stem-loop 4 and segment 1, shortened stem-
loop 1; shown in FIG. 11D):
5'-GUUUUAGUUCUAUGUUGGAUAUUCUGAUACGAAAUUGUCAGAAUAUC
CAACAAUAGUUCUAAGAUAAGGCCUUAUGUGCCGUAGGGUAUAGCGGUAU
CCCGAACAAUUCCGCUG-3'

Figure 11E:
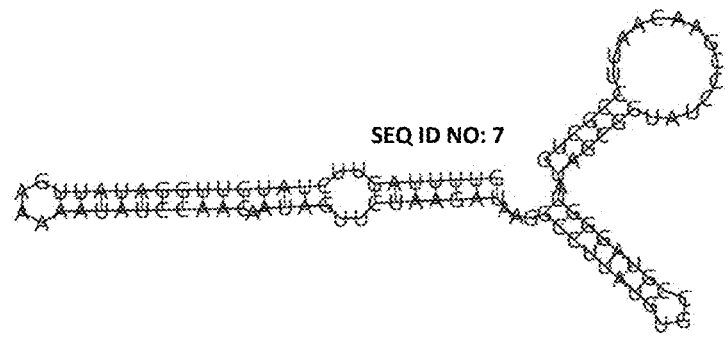
Figure 11F:
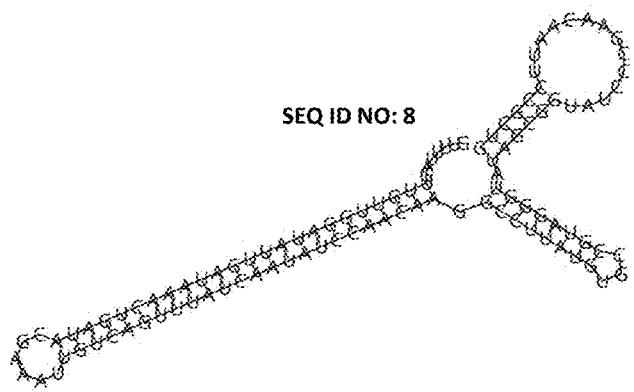
Figure 11G:
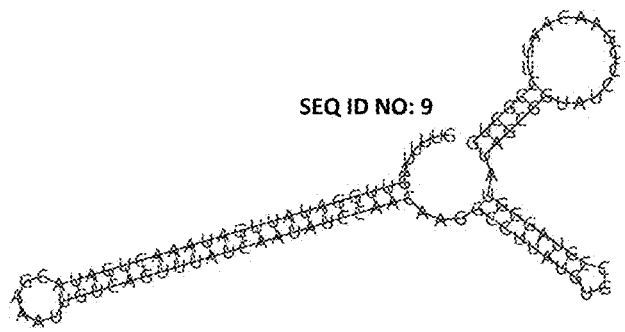

>tracSL2-1 + 2 (SEQ ID NO: 7, 100 nt;
deleted stem-loop 4 and segment 1,
further shortened stem-loop 1; shown
in FIG. 11E):
5'-GUUUUAGUUCUAUGUUGGAUAUUGAAAAAUAUCCAACAAUAGUUCUA
AGAUAAGGCCUUAUGUGCCGUAGGGUAUAGCGGUAUCCCGAACAAUUCCG
CUG-3'

>trac1-05(SEQ ID NO: 8, 108 nt; shown
in FIG. 11 F):
5'-GUUUUAGUUGUUGGAUAUUGAUAAACUGAUACGAAAUUGUCAGUUUA
UCAAUAUCCAACAAGGCCUUAUGUGCCGUAGGGUAUAGCGGUAUCCCGAA
CAAUUCCGCUG-3'

>trac2-05(SEQ ID NO: 9, 105 nt;
shown in FIG. 11 G):
5'-GUUUUAGUUGGAUAUUGAUAAACUGAUACGAAAUUGUCAGUUUAUCA
AUAUCCAACAAGGCCUUAUGUGCCGUAGGGUAUAGCGGUAUCCCGAACAA
UUCCGCUG-3'
```

The secondary structures of the above scaffold sequences were predicted using RNAfold, as shown in FIGS. 11A-G.

The guide sequence (5'-auaacacacagacagcucug-3' (SEQ ID NO: 24)) was ligated to the 5' end of each of the above scaffold sequences to generate full-length sgRNA sequences. The full-length sgRNAs were transcribed in vitro and, using a similar method as described in the previous examples, were mixed with Cut Buffer, the CasRfg.3 protein of Embodiment 2, and the CasRfg.3-N2-Target linearized plasmid prepared in Embodiment 4 for cleavage. The cleavage effect was then detected by electrophoresis.

Figure 12:
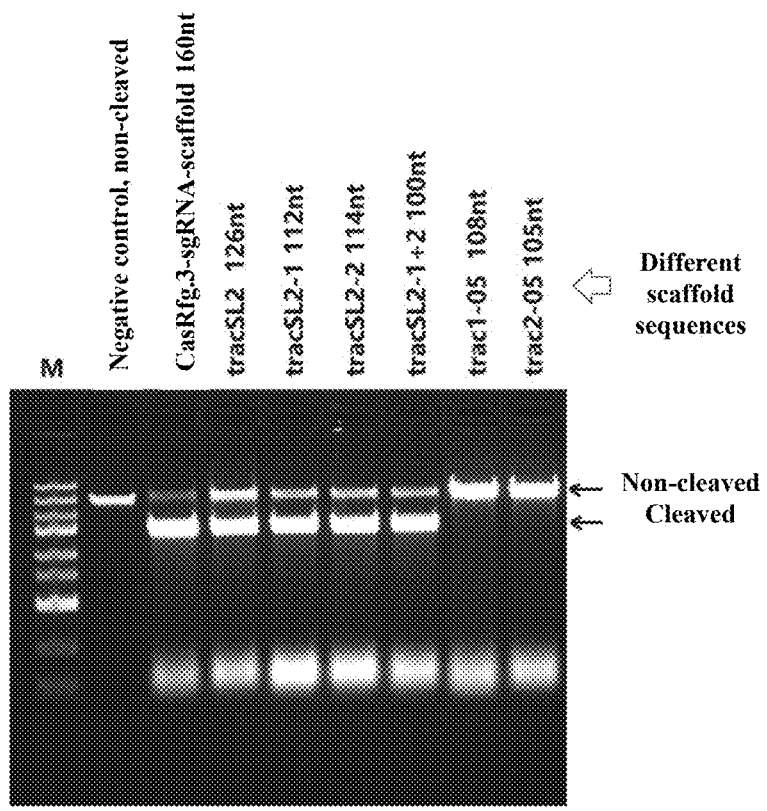
FIG. 12 is a schematic diagram illustrating results of truncated sgRNAs with different scaffold sequences cleaving a same substrate.

As shown in FIG. 12, the full-length gRNA assembled with the tracSL2, tracSL2-1, tracSL2-2, and tracSL2-1+2 truncated scaffolds retained cleavage activity.

In the CasRfg.3-sgRNA-scaffold, stem-loop 4 and segment 1 are deletable regions; stem-loop 1 may be truncated, for example, its stem portion may be shortened without affecting the complex's cleavage activity.

Example 8: Testing of Different Specific PAMs

The PAM for the CasRfg.3 protein is 5'-DDRGDNN-3'. Degenerate primers were designed to construct cleavage substrates containing the corresponding spacer sequence (spacer) of CasRfg.3-N2 and different specific PAM sequences, which were used to test cleavage activity under different PAM conditions.

a. PCR Amplification of Cleavage Substrates
Amplification primers are listed in Table 16.

TABLE 16

| Primer | Sequence |
|---|---|
| Blunt-PR1 | atagggcgaattgaatttagcccaggat (SEQ ID NO: 28) |
| Ca2PAMs-PF2 | cagagctgtctgtgtgttatttgggag (SEQ ID NO: 29) |
| Ca2PAMs-PR2 | tcccaaataacacacagacagctctgdd rgdnngagaatgatggacatttagacac tgg (SEQ ID NO: 30) |
| Blunt-PF1 | ccctcactaaagggactagtccagggat (SEQ ID NO: 31) |

Amplification primers

The primers listed in the table were diluted to 10 pmol/μl for use. Two sets of primers, Blunt-PR1+Ca2PAMs-PF2 and Ca2PAMs-PR2+Blunt-PF1, were used for PCR amplification targeting the CasRfg.3-N2-Target plasmid, resulting in fragments F1 and F2, respectively. The two fragments were cloned into a pEASY-Blunt-Zero vector (TransGen CB501-01) via Gibson assembly, and plated on Ampicillin plates. Different positive clones were picked and sent for sequencing, obtaining various clones containing the CasRfg.3-N2 corresponding spacer sequence and specific PAM sequences.

b. Activity Testing of Different PAM Substrates

From each of the aforementioned different PAM plasmids, 5 μg was linearized using XmnI, followed by heat-inactivation for 15 minutes a 75° C. to inactivate XmnI. Then, 5 μl of the heat-inactivated product was used as the cleavage substrate. Cleavage experiments were conducted respectively using the following sgRNA:

```
>tracSL2-1 + 2-full length (where the
lowercase letters indicate the guide
sequence)
                            (SEQ ID NO: 32)
auaacacacagacagcucugGUUUUAGUUCUAUGUUGGAUAUUGAAAAAU

AUCCAACAAUAGUUCUAAGAUAAGGCCUUAUGUGCCGUAGGGUAUAGCGG

UAUCCCGAACAAUUCCGCUG

>CasRfg.3-sgRNA-full length (where
the lowercase letters indicate the
guide sequence)
                            (SEQ ID NO: 33)
auaacacacagacagcucugGUUUUAGUUCUAUGUUGGAUAUUGAUAAAC

UGAUACGAAAUUGUCAGUUUAUCAAUAUCCAACAAUAGUUCUAAGAUAAG

GCCUUAUGUGCCGUAGGGUAUAGCGGUAUCCCGAACAAUUCCGCUGCUUU

GAGUAUUAAGCUGCUACAUCAUGUAGCAGC
```

The in vitro cleavage reaction system for CasRfg.3-N2 with different PAMs is detailed in Table 17.

TABLE 17

| Component | Amount (μL) |
|---|---|
| 10xCut Buffer(200 mM HEPES, 1M NaCl, 50 mM MgCl$_2$, 1 mM EDTA) | 3 |
| CasRfg.3-N2 heat-inactivated linearized product with different PAMs | 5 |
| CasRfg.3-sgRNA-Full Length/tracSL2-1 + 2-Full Length | 5 μg |
| CasRfg.3 protein of Embodiment 2 (10 mg/ml) | 0.3 |
| ddH$_2$O | Up to 30 |

The reaction was performed at 37° C., and 5 μl of Loading Buffer was added to the cleavage product, from which 15 μl was used for electrophoretic analysis.

Figure 13A:
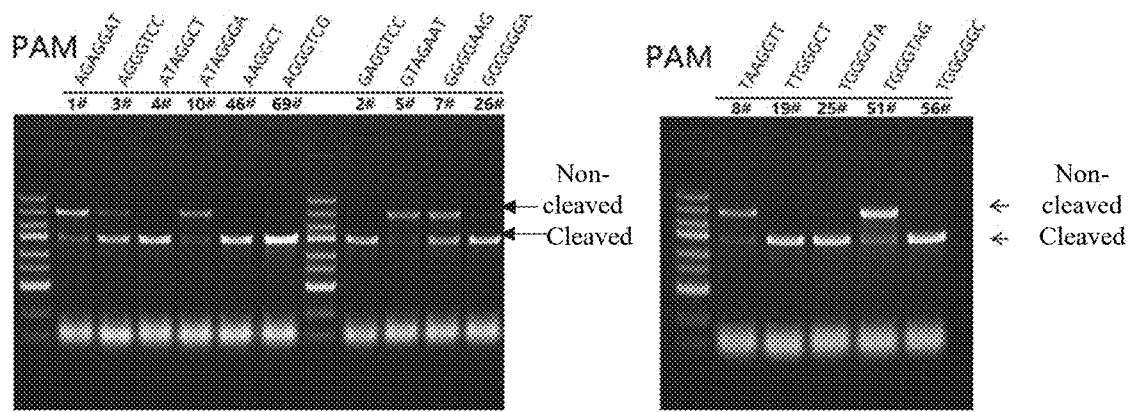
FIG. 13A is a schematic diagram illustrating sgRNA (CasRfg.3-sgRNA-full length) cleavage of Ca2-N2 substrates containing different PAMs.
Figure 13B:
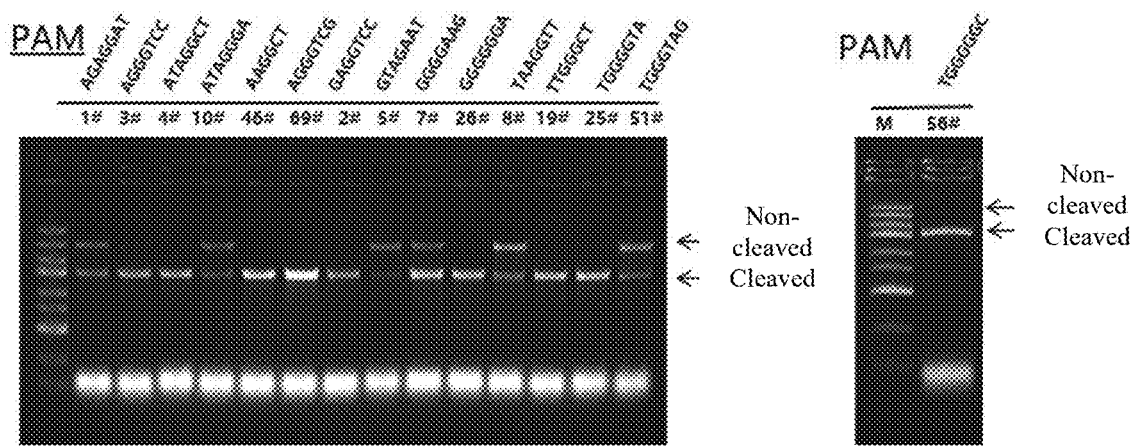
FIG. 13B is a schematic diagram illustrating sgRNA (tracSL2-1+2-full length) cleavage of Ca2-N2 substrates containing different PAMs.

Results are shown in FIGS. 13A and 13B, demonstrating that the CRISPR-CasRfg.3 system can recognize a variety of PAMs, including those shown in Table 18.

TABLE 18

| | | | | |
|---|---|---|---|---|
| 5'-ataggct-3' | 5'-agggtcg-3' | 5'-aaggct-3' | 5'-gaggtcc-3' | 5'-ttgggct-3' |
| 5'-tggggta-3' | 5'-tgggggc-3' | 5'-gggggga-3' | 5'-agaggat-3' | 5'-agggtcc-3' |
| 5'-ataggga-3' | 5'-gtagaat-3' | 5'-ggggaag-3' | 5'-taaggtt-3' | 5'-tgggtag-3' |

Example 9: Effect of Guide Sequence Length on Cleavage Activity

The inventors utilized truncated gRNA scaffolds to construct sgRNAs with guide sequences of 20 nt-24 nt, and conducted cleavage activity assays.

SgRNAs containing guide sequences of various lengths were obtained by in vitro transcription, with sequences as follows:

```
>20 nt guide sequence (SEQ ID NO: 34):
ataacacacagacagctctgGUUUUAGUUCUAUGUUGGAUAUUGAAAAAU

AUCCAACAAUAGUUCUAAGAUAAGGCCUUAUGUGCCGUAGGGUAUAGCGG

UAUCCCGAACAAUUCCGCUG

>21 nt guide sequence (SEQ ID NO: 35):
aataacacacagacagctctgGUUUUAGUUCUAUGUUGGAUAUUGAAAAA

UAUCCAACAAUAGUUCUAAGAUAAGGCCUUAUGUGCCGUAGGGUAUAGCG

GUAUCCCGAACAAUUCCGCUG

>22 nt guide sequence (SEQ ID NO: 36):
aaataacacacagacagctctgGUUUUAGUUCUAUGUUGGAUAUUGAAAA

AUAUCCAACAAUAGUUCUAAGAUAAGGCCUUAUGUGCCGUAGGGUAUAGC

GGUAUCCCGAACAAUUCCGCUG

>23 nt guide sequence (SEQ ID NO: 37):
caaataacacacagacagctctgGUUUUAGUUCUAUGUUGGAUAUUGAAA

AAUAUCCAACAAUAGUUCUAAGAUAAGGCCUUAUGUGCCGUAGGGUAUAG

CGGUAUCCCGAACAAUUCCGCUG
```

-continued

>24 nt guide sequence (SEQ ID NO: 38):
ccaaataacacacagacagctctgGUUUUAGUUCUAUGUUGGAUAUUGAA

AAAUAUCCAACAAUAGUUCUAAGAUAAGGCCUUAUGUGCCGUAGGGUAUA

GCGGUAUCCCGAACAAUUCCGCUG

The aforementioned sgRNAs were respectively mixed with Cut Buffer, the CasRfg.3 protein expressed in Example 2, and the CasRfg.3-N2-Target linearized plasmid prepared in Example 4. The reaction was conducted at 37° C. for 30 minutes. 15 µl of the cleavage product was taken, mixed with 3 µl Loading Buffer, and subsequently subjected to electrophoresis to assess cleavage effects.

Figure 14:
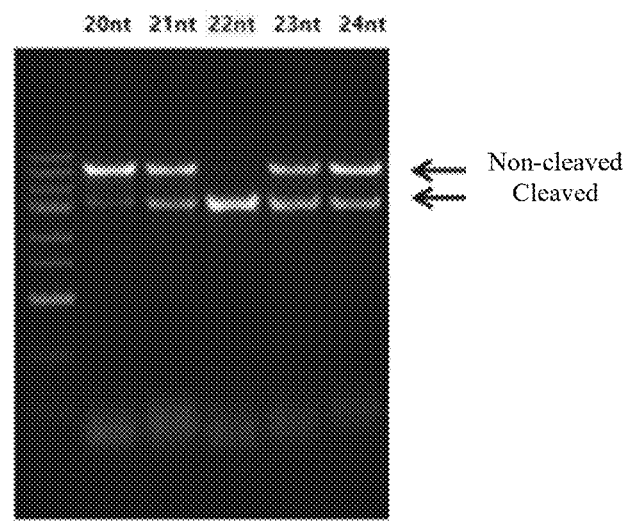
FIG. 14 is a schematic diagram illustrating the cleavage activity of gRNAs with guide sequences of varying lengths.

As shown in FIG. 14, CasRfg.3 exhibited cleavage activity across all guide lengths from 20 nt to 24 nt, with the highest activity observed at 22 nt.

Example 10: No DNA Cleavage Activity Detected for Specific Similar Protein Publicly Available from NCBI NCBI discloses a similar protein (Reference Sequence: WP_085022725.1), annotated as Cas9 nuclease, which the inventors have named Ca9-89, with the amino acid sequence (SEQ ID NO: 39):
MKRKVGFGLDVGIGSVGFAVLSYDKVYDARIEQVGVRLFDSGEEVKNHKR

ASKNQGRRQYRSGRRLIRRRYHRKERAKRFIERIGLLSAAKIKEWQEVNG

NQNIYSIRFRGLSEKLTPEEIADCVIHFCNHRGYREFYEDDVDEKEAGKI

KTALFRFDEKMTEGKYVSVADMILHDKEFATDTQFPNFHNHKNDDEEKYF

LIKRAALRDELRAILQKQQEYYKQLTDQNIAFLCDEIVFVQRDFEDGPGD

KNDKNRKFMGFLDTIGCCMFYKEELRGFRSTVIADIYSLVNGLSQMMYVD

STTGEITFLPEAADDIIEFALKNASITEKDIKKILEKYNLTLIKAEKLEE

NIPQTIKTLKVLKKVLDASGYSYDELIQEEQFDFDKPSKLHELCNLLASN

ITPKRRRKALEKAGWNKDFQAQTKRIHFGGTSNVCYRYMLEAIDAFRHGE

LYGNFQARRKQEQLTDEAENTERVKLLPPFTKEMDEDVVKNVVVFKAINE

TRKIINALIGKYGSPAYINIEVADELGHSIETRRKMTKANNDNMKKKEAI

GAKLVELGLRKEGEVSGKDIARYRLWEQQNGIDLYTGNNIPEADVLSGQY

DVDHIIPFSLILDDTLNNKVLTGMGSNRQAKSNTAPREYLSDKAEAEFIK

RVNVLLKKKISKKKYQYLMVKNLRDSKLLNEWKSRNINDTRYISRFLANY

LNNTLIFNSDKKKNVYAINGAITSRMRKMWLNKKTWGNPEKNRENNLHHA

ADAIVIANLTPAAVELASDNLKLQNIFRQNGKRVTEEYENYLDRAVRKIE

KYYHFNPELAKKLLVSKDRIPSMVRLLREETDKRLVDPSLEEFKMVTPES

FRQNLEQYYNDPEFVASIQMPLVSYKQSKRFSGSFTKDKPIKKKEREDSS

TVKIDSLGNENILDAKSYYCLEVYSTKDNKTALRGLRYVDFKLKDKKMFI

TVPNPENYGKHIMYLFKNDYIVVYNKKGEEKARGFYSSVKAITRDQLYLK

DNNTNVDIIFTIKKDDTVKKYHIDILGQIGGEIKCSAPFLSITEKE.

NCBI also discloses the genome sequence of the bacterium from which the protein is derived, and the inventors accordingly analyzed its DR sequence (SEQ ID NO: 40):
5'-GTTTTAGTTCTATGTTGGATATTGATAAACTGATA-3';
and the tracrRNA sequence (SEQ ID NO: 41):
5'-TTGTCAGTTTATCAATATCCAACAATAGTTCTAAGATAAGGCCTTAT

GTGCCGTAGGGTATAGCGGTATCCCGAACAATTCCGCTCCTTTGTTCATT

AAGCTGCTACATTATGTAGCGGCTTTT-3'.

Figure 16:
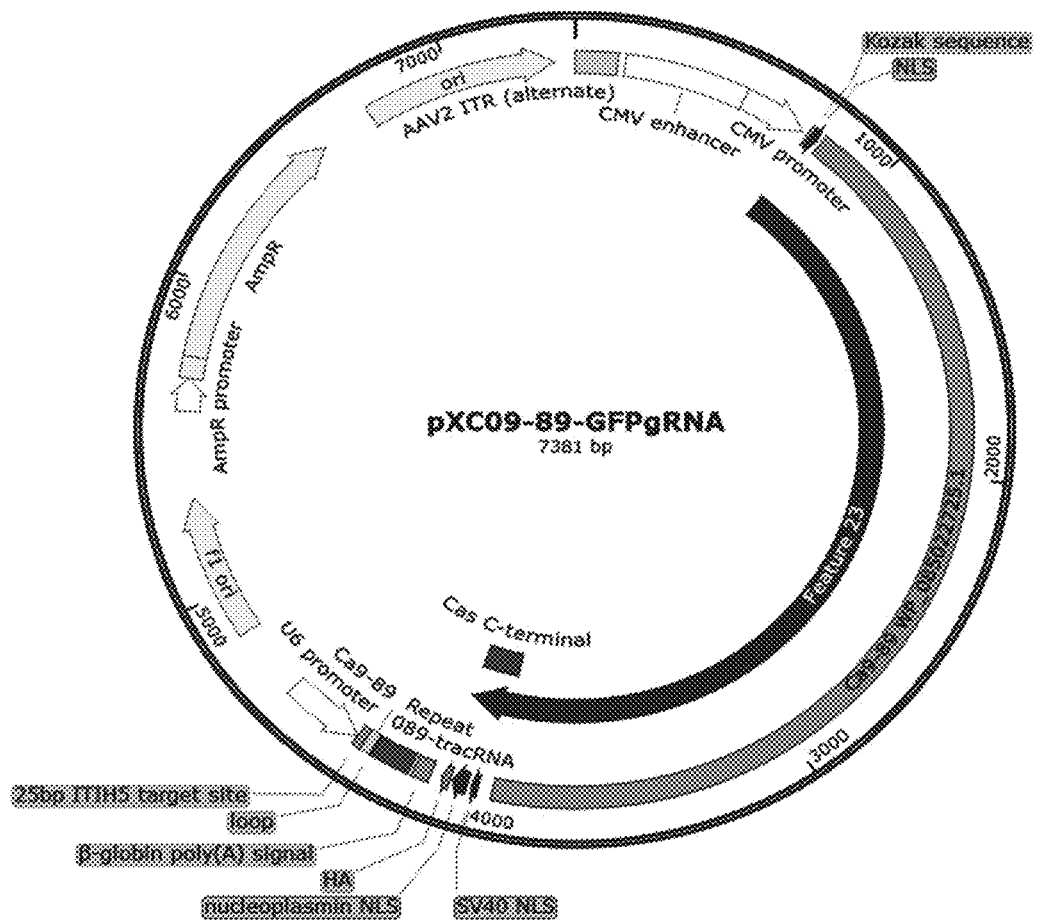
FIG. 16 is a map of the pXC09-89-GFPgRNA plasmid used for expressing a Ca9-89 recombinant protein.

A plasmid vector pXC09-89-GFPgRNA (SEQ ID NO: 42) was prepared by conventional methods. The vector contains the coding sequence for the Ca9-89 recombinant protein and the corresponding sgRNA coding sequence (the DR sequence and tracrRNA sequence were joined into the sgRNA scaffold using the commonly used GAAA linker in the field). The plasmid map is shown in FIG. 16.

The pXC09-89-GFPgRNA plasmid was transfected into 293T cells using Lipofectamine 2000. After 48 hours of transfection, cell lysis was performed using Western and IP cell lysis buffer (Biyuntian P0013). The samples were centrifuged for 5 minutes, and the supernatant was collected and filtered through a 0.45 µm membrane. The protein was then purified using a heparin column (Cytiva HiTrap™ Heparin HP), followed by ion exchange chromatography (Cytiva HiTrap™ Q FF) and size exclusion chromatography (Cytiva Superdex™ 200 Increase 10/300 GL). The purified Ca9-89 recombinant protein was analyzed by SDS-PAGE, which revealed a single band.

The sgRNA corresponding to Ca9-89 was obtained by in vitro transcription.

>Ca9-89sgRNA sequence (SEQ ID NO: 43):
GAACGGCUCGGAGAUCAUCAUUGCGGUUUUAGUUCUAUGUUGGAUAUUGA

UAAACUGAUAGAAAUUGUCAGUUUAUCAAUAUCCAACAAUAGUUCUAAGA

UAAGGCCUUAUGUGCCGUAGGGUAUAGCGGUAUCCCGAACAAUUCCGCUC

CUUUGUUCAUUAAGCUGCUACAUUAUGUAGCGGC.

Using the method of Example 3, the Ca9-89 recombinant protein was subjected to an in vitro cleavage reaction with sgRNA, 10× Cut Buffer, and the in vitro cleavage substrate from Example 3. The reaction was carried out at 37° C. for 3 hours and then at 75° C. for 15 minutes. Following the same procedure as in Example 3, the presumed cleaved fragments were end-repaired by adding biotin-labeled Adapter1 to the nicked ends through a ligation reaction. The presumed cleaved products with biotin-labeled adapters were then specifically bound to streptavidin-labeled magnetic beads (Beads) for purification. The specifically purified fragments were amplified by PCR, but the concentration measured was only 0.355 ng/µl, which did not meet the requirements for NGS sequencing. This result also indicates that the Ca9-89 protein has no detectable DNA cleavage activity or very weak activity. Therefore, the CasRfg.3 protein of the present disclosure achieved an unexpected technical effect.

Example 11: Detection of Single Base Editing Activity of Ca2 Fusion Protein

A. Cloning and Construction of Ca2 Protein Single-Base Editing System

The *Escherichia coli* BL21 strain contains the β-galactosidase gene. The genomic sequence of the BL21-Gold (DE3) pLysS AG strain, with GenBank accession number CP001665.1, was obtained via NCBI search. Sequence analysis was conducted to locate the β-galactosidase gene ECBD_3313 sequence, and a sgRNA targeting this gene matching the Ca2 protein PAM sequence was designed. Additionally, competent cells of the BL21 (DE3) pLysS strain (Shanghai Weidi Bioscience, CAT #: EC1003) were used to confirm the ECBD_3313 sequence through PCR amplification and sequencing verification. Sequences for the PCR validation primers, the finalized ECBD_3313 sequence, and the designed sgRNA sequence are as follows:

```
PCR validation primer sequences:
Primer LacZKO-PF1: (SEQ ID NO: 44)
ACGCCATCAAAAATAATTCGCGTC.

Primer LacZKO-PR1: (SEQ ID NO: 45)
CCGACTGGAAAGCGGGCAGTG

Sequence obtained from PCR amplification
and sequencing of the ECBD_3313:
>ECBD_3313 (SEQ ID NO: 46):
atgaccatgattacggattcactggccgtcgttttacaacgtcgtgactg ggaaaaccctggcgttacccaacttaatcgccttgcagcacatcccctt tcgccagctggcgtaatagcgaagaggcccgcaccgatcgcccttcccaa cagttgcgcagcctgaatggcgaatggcgctttgcctggtttccggcacc agaagcggtgccggaaagctggctggagtgcgatcttcctgaggccgata ctgtcgtcgtccctcaaactggcagatgcacggttacgatgcgcccatc tacaccaacgtgacctatcccattacggtcaatccgccgtttgttccac ggagaatccgacgggttgttactcgctcacatttaatgttgatgaaagct ggctacaggaaggccagacgcgaattattttgatggcgt sgRNA sequence (SEQ ID NO: 47):
5'-uauuacgccagcuggcgaaaGUUUUAGUUCUAUGUUGGAUAUUGAUA

AACUGAUACGAAAUUGUCAGUUUAUCAAUAUCCAACAAUAGUUCUAAGAU

AAGGCCUUAUGUGCCGUAGGGUAUAGCGGUAUCCCGAACAAUUCCGCUGC

UUUGAGUAUUAAGCUGCUACAUCAUGUAGCAGC-3' (here, uauuac gccagcuggcgaaa (SEQ ID NO: 48) is the guide sequence, and the immediate neighboring PAM sequence of the guide sequence in ECBD_3313 is 5'-gggggat-3').
```

The deaminase (APOBEC-1 Domain) and uracil DNA glycosylase inhibitor (UGI Domain) were fused to the N-terminal and C-terminal of the Ca2 protein, respectively, resulting in the APOBEC-1-Ca2-UGI fusion protein (SEQ ID NO: 49).

Using molecular biology methods, a single-base editing vector targeting the *Escherichia coli* β-galactosidase gene was constructed using the aforementioned APOBEC-1-Ca2-UGI fusion protein to obtain the plasmid CBE-Ca2-LacZgRNA02 (SEQ ID NO: 50). The fusion protein expression was driven by the lac UV5 promoter, while the sgRNA expression was driven by the J23119 promoter.

B. Single-Base Editing Detection

The CBE-Ca2-LacZgRNA02 plasmid was transformed via heat shock into BL21 (DE3) pLysS competent cells (Shanghai Weidi Bioscience, CAT #: EC1003). After heat shock transformation, LB medium without antibiotics was added to incubate for 2 hours. The mixture was then plated on Ampicillin plates and incubated overnight. Single colonies (Plaque 1 and Plaque 2) were picked and inoculated into LB medium containing 100 μg/ml ampicillin for 4 hours. PCR amplification was conducted on the cultured bacterial solution using primers LacZKO-PF1 and LacZKO-PR1 along with a high-fidelity PCR enzyme (Ezinkin Biosciences UltraHiPF™ DNA Polymerase Kit, CAT #: PC019). The PCR product was sent for Sanger sequencing (FIG. 17A) to analyze the conversion of C to T at the sgRNA target site, thus evaluating the single-base editing activity of the Ca2 fusion protein.

Figures 17A, 17B:
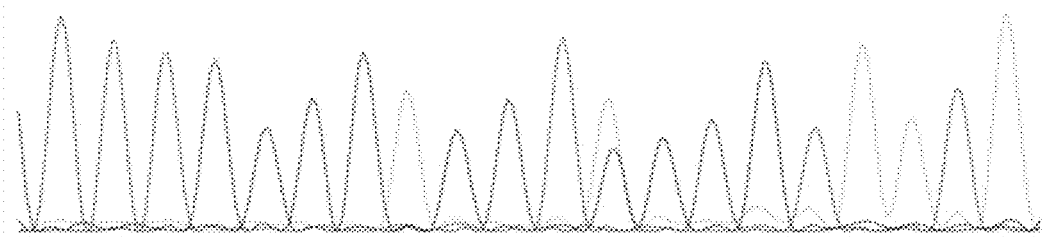
FIGS. 17A-17C shows the sequencing results of CBE-Ca2-LacZgRNA02 single-base editing in *E. coli* β-galactosidase gene, with FIGS. 17B and 17C showing the proportions of A, T, C or G at each base position post-editing.
Figure 17C:
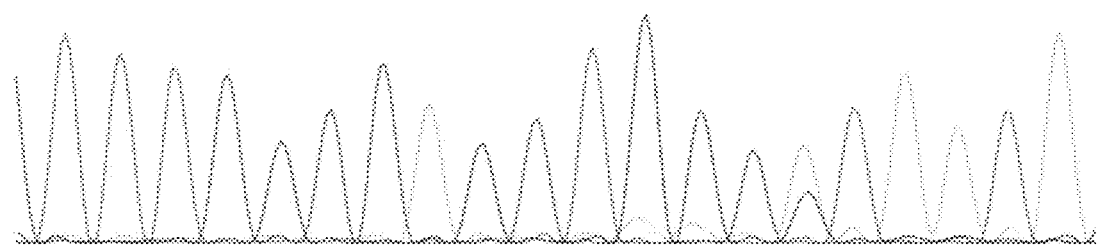

The aforementioned sequencing results indicate that the Ca2 fusion protein can convert a C to a T in the sgRNA target site, leading to overlapping peaks of A+G in the sequencing chromatogram, which demonstrates the single-base editing activity of the Ca2 fusion protein. In Plaques 1 and 2, the G→A mutation efficiency is relatively high, reaching 59% and 63% respectively, as shown in FIGS. 17B and 17C, where FIG. 17B corresponds to Plaque 1 and FIG. 17C corresponds to Plaque 2.

The above-described embodiments express only several embodiments of the present disclosure, which are described in a more specific and detailed manner, but are not to be construed as a limitation on the scope of the present disclosure. It should be pointed out that, for a person of ordinary skill in the art, deformations and improvements may be made without departing from the conception of the present disclosure, which all fall within the scope of protection of the present disclosure. Therefore, the scope of protection of the present disclosure shall be subject to the appended claims. Also, all of the documents referred to in the present disclosure are cited as references in the present disclosure as if each document had been individually cited as a reference.

While the above describes specific embodiments of the present disclosure, it should be understood by those skilled in the art that these are merely illustrative, and that a variety of changes or modifications may be made to these embodiments without departing from the principles and substance of the present disclosure. Thus, the scope of protection of the present disclosure is limited by the appended claims.

What is claimed is:

1. A CRISPR-CAS complex comprising
   (a) a Cas9 protein that comprises an amino acid sequence having at least 98% identity to SEQ ID NO:1; and
   (b) a guide RNA that comprises a sequence selected from SEQ ID NO:3-7,
      wherein the Cas9 protein is able to form a complex with the guide RNA, and wherein the Cas9 protein has nuclease activity or reduced nuclease activity.

2. The CRISPR-CAS complex of claim 1, wherein the guide RNA comprises no more than three stem-loop structures.

3. The CRISPR-CAS complex of claim 1, wherein the Cas9 protein is capable of performing one or more functions at a temperature of 25° C. to 55° C. selected from:
   (a) forming a complex with the guide RNA;
   (b) binding a target nucleic acid when complexed with the guide RNA; and
   (c) cleaving or modifying a target nucleic acid when complexed with the guide RNA.

4. The CRISPR-CAS complex of claim 1, wherein a PAM sequence recognized by the Cas9 protein is 5'-DDRGDNN-3', wherein D represents A, G, or T; R represents A or G; and N represents A, C, G, or T.

5. The CRISPR-CAS complex of claim 1, wherein the Cas9 protein is fused to a heterologous functional domain selected from a reporter protein, a detection label, a localization signal, a DNA binding domain, an epitope tag, a transcription activation domain, and a transcription repression domain.

6. The CRISPR-CAS complex of claim 5, wherein the heterologous functional domain is fused to the N-terminus and/or C-terminus of the Cas9 protein.

7. The CRISPR-CAS complex of claim 5, wherein the Cas9 protein and the heterologous functional domain are fused by a linker.

8. A delivery system comprising the CRISPR-CAS complex of claim 1.

9. A composition that comprises the CRISPR-CAS complex of claim 1.

10. A method for detecting the presence of a target nucleic acid in a test sample, wherein said method comprises
    (a) contacting the CRISPR-CAS complex of claim 1 with a test sample, wherein the Cas9 of the CRISPR-CAS complex is fused to a detectable label;
    (b) binding of a target nucleic acid in the test sample by the CRISPR-CAS complex;
    (c) modifying or cleaving the target nucleic acid by the CRISPR-CAS complex; and
    (d) detecting the presence of the target nucleic acid, wherein detection of the detectable label indicates the presence of the target nucleic acid.

* * * * *

SEQUENCE LISTING

```
Sequence total quantity: 63
SEQ ID NO: 1            moltype = AA  length = 1046
FEATURE                 Location/Qualifiers
source                  1..1046
                        mol_type = protein
                        organism = Anaerovibrio sp.
SEQUENCE: 1
MKRKIGIGLD VGIGSVGFAV LSYDKVYDAR IEQVGVRLFD SGEEPKTKVS KNQGRRQYRA  60
GRRLIRRRYH RKERAKRFIE RIGLLSADKI KEWQEVNGNQ NIYYVRFRGL SEKLTPQEIA  120
DCVIHFCNHR GYREFYEDDV ADEKEAGKIK TALSRFDEKM AAGKYVSVAD MILHDNEFST  180
NTQFPDFHNH KGDDDEKYFL IKRAALRDEL RAILRKQQEF YEQLTEHNID FLCDDIVFVQ  240
RDFEDGPGDK TDKKRKFMGF LDSIGCCMFY KEEVRGYRST VIADIYSLVN GLSKMMYVDS  300
```

```
TTGEITFLPE AADKIIDFAL KNASITEKDI KEILKKYNLT LIKAEKLEEN IPQTIKTLKI    360
LKKILDDSGY SYDELIKEEQ FDFDRPSKLH ELCSLLASNI TPKRRRKALE KAGWNKALQE    420
QTRRIHFGGT SNVCYRYMLE AIDAFRHGEL YGNFQARRNK EQLTDEAENT EKVRLLPPFT    480
KEMDEDVVKN VVVFKAINET RKIINALIGK YGSPAYINIE VADELGHSIE TRRKMTKANN    540
EKMKKKEAIS TKLVELGLRK EGEVSGKDIA RYRLWEQQDG IDLYTGENIP EADVLSGQYD    600
IDHIIPFSLI LDDTLNNKVL TGMGSNRQAK SNKAPREYLS DKAELEFIKR VNILLKKKII    660
SKKKYKYLMV KNLRDSKLLD EWKSRNINDT RYISRFLVNY LNNMLLFNSD KKKNVYAING    720
AITSKMRKLW LNKRTWGTPE KNRENNLHHA ADAIVIANLT PAAVELASDN LKLQNIFRQN    780
GKRVTEEYDN YLDKAVRKME KYYHLNEELA KNLLVRKDRI PSMVRSLREE TDKRLVDTSL    840
EEFNMVTPEA FRKNLEQYYN DSDFVASIQM PLVSYKQSKR FSGSFTKDNP IKKKDKEDSS    900
SVKMDSLGNE NILDAKSYYC LEVYSTKDNK TALRGLRYVD FKLKNKKMFI NVPNPDNYDK    960
HIMYLFKNDY IVVYNKKGEE RIKGYYTGIK NIKANRFYLI SNNDAVRKDF TLSKDDTIKK   1020
YHIDILGQIG GEVKCSAPFL SITEKE                                       1046

SEQ ID NO: 2            moltype = DNA   length = 3141
FEATURE                 Location/Qualifiers
source                  1..3141
                        mol_type = genomic DNA
                        organism = Anaerovibrio sp.
SEQUENCE: 2
atgaaaagaa aaattggaat cgggttggat gttggtatag gttctgtagg ttttgctgta    60
ttgtcgtatg ataaggtata tgatgcccgt atcgaacagg taggggtccg gcttttttgat   120
tctggggaag aacccaaaac aaaagtcagt aagaaccagg ggagacggca atataggggct   180
ggtcgtagat tgattcggcg tagataccat cgtaaagagc gggcaaagag atttattgag    240
cggataggtt tattaagtgc ggacaaaatt aaagaatggc aggaagtaaa tgcaatcag    300
aatatttact atgtgagatt taggggattg tcggaaaagt tcacccaca gaaaattgat    360
gattgcgtta tccattttttg caaccataga ggttatcgtg aattctatga agatgatgtt    420
gcggatgaaa aggaagctgg caagataaag accgcctat ccagatttga tgaaaaaatg    480
gcagctggta agtatgtatc cgttgccgat atgattttgc atgataatga attttctaca    540
aacacccagt ttccagattt ccataatcat aaaggtagtg acgacgaaaa atatttttct    600
attaaacggg cagcgttaag ggatgaactt agggcaatac tccggaagca acaggaattc    660
tatgaacagt tgacggaaca taatattgat ttcttatgtg acgacatagt ttttgttcag    720
cgggattttg aggatggacc cggggataaa actgataaaa agcgtaagtt tatgggtttt    780
ttggatagca taggctgctg tatgttttat aaggaagaag ttagaggtag taggtccaca    840
gtaattgcag atatttattc cttggtaaac ggtttgtcca agatgatgta tgttgacagc    900
accactggtg aaataacatt tttaccggaa gctgctgaca aaattattga ttttgcccta    960
aaaaatgcat ccattactga aaaagatatc aagaaatac tgaagaaata caatttgacc   1020
cttataaagg ctgaaaagct agaggaaaac ataccgcaga ctataaagac tctgaagata   1080
ttgaaaaaga tattggatga tagtgggtat agttatgatg aagaagaacaa ggaagaacaa   1140
tttgattttg ataggccatc caactcctca gaattatgta gtttgttagc cagcaatatt   1200
accccaaaac gcagaagaaa agcattggaa aaagctggct ggaataaagc attgcaagaa   1260
caaaccagga gaatacactt tggtggaaca tcaaatgtat gctatcgcta catgctagaa   1320
gctattgatg ccttcagaca tggtgaatta tatggtaatt tccaagcccg acgaaataag   1380
gaacagctta cagatgaagc agaaaatacg gagaaggtaa gattattacc accgttcaca   1440
aaagaaatgg atgaagatgt ggtaaagaat gtagtggttt tcaaggcaat caatgaaacc   1500
cgcaagataa tcaatgccct tataggcaag tacggttcgc cggcatatat caatattgag   1560
gtggctgatg aactggggca cagtattgaa accaggcgga aaatgaccaa agccaacaac   1620
gaaaaaatga aaaaaaagga ggctattagt acaaagctgg ttgaactggg acttcgtaaa   1680
gaggggggaag tatctggtaa agatatacgc gttatcgtc tatgggagca gcaggatggg   1740
atagatttat atacgggga aaatattcca gaagcggatg tgctgagtgg gcaatatgat   1800
attgatcaca ttatcccatt ttcgctgata ttggatgata ccctaaataa taaggtactg   1860
actggtatgg ggagcaatcg tcaggcaaaa tccaataaag ctccagaga atatttatct   1920
gataaggctg aattggagtt tataaagaga gtaaatatct tactgaagaa aaaaataatc   1980
tcaaagaaaa agtacaagta cttgatggta agaaccttc gtgacagtaa actgctggat   2040
gagtggaagt caagaaatat taacgacacc agatatataa gtcgttttt agtgaactat   2100
ctaaataata tgttgctatt taacagcgat aaaaagaaa atgtatatgc aatcaatggt   2160
gccattacat ccaaaatgcg aaaactgtgg cttaataagc gaacctgggg aactccggaa   2220
aagaacaggg aaaataattt gcatcatgca gctgatgcta tagttattgc caatcttact   2280
ccagctgcag tggaactggc cagtgataac cttaaactcc agaatatttt ccgtcaaaat   2340
ggcaagcgag tgacggagga atatgataat tatcttgata aggcagttcg caagatggag   2400
aagtattatc acttaaatga agaattggcc aagaatctgc tggtacgaaa ggatcgtatt   2460
ccatccatgt taaggtcatt gcgggaggaa acggataaga gattggtgga tacaagtctt   2520
gaggaattca atatggttac accagaagtg ttccgcaaaa atctagagca gtattataat   2580
gactctgatt ttgttgcttc catacagatg ccgttggtat cctataagca gtccaagcgg   2640
ttttctggaa gctttactaa ggataatcct ataagaaaa agataaaga agactcatca   2700
agtgtaaaaa tggactcttt aggcaatgaa atattttgg atgccaaatc gtattactgt   2760
ttggaggtgt attccacaaa agataataag acggctttgc gcggcttag gtatgttgat   2820
tttaaattga aaaacctaa gatgtttatc aatgttccta atccagataa ttatgataag   2880
catattatgt atttgtttaa gaatgattat attggtgtat acaacaaaaa aggagaggaa   2940
agaattaaag gttattatac aggaataaaa aacatcaaag ctaatagatt ttatttgata   3000
agtaacaatg atgcggtgcg aaaagatttt acattatcta aagatgatac tataaaaaaa   3060
tatcacattg atattcttgg gcaaattggt ggtgaggtaa aatgttccgc tccattcttg   3120
tcaataacgg agaaagaata a                                            3141

SEQ ID NO: 3            moltype = RNA   length = 160
FEATURE                 Location/Qualifiers
source                  1..160
                        mol_type = other RNA
                        organism = synthetic construct
```

-continued

```
SEQUENCE: 3
gttttagttc tatgttggat attgataaac tgatacgaaa ttgtcagttt atcaatatcc    60
aacaatagtt ctaagataag gccttatgtg ccgtagggta tagcggtatc ccgaacaatt   120
ccgctgcttt gagtattaag ctgctacatc atgtagcagc                         160

SEQ ID NO: 4            moltype = RNA   length = 126
FEATURE                 Location/Qualifiers
source                  1..126
                        mol_type = other RNA
                        organism = synthetic construct
SEQUENCE: 4
gttttagttc tatgttggat attgataaac tgatacgaaa ttgtcagttt atcaatatcc    60
aacaatagtt ctaagataag gccttatgtg ccgtagggta tagcggtatc ccgaacaatt   120
ccgctg                                                              126

SEQ ID NO: 5            moltype = RNA   length = 112
FEATURE                 Location/Qualifiers
source                  1..112
                        mol_type = other RNA
                        organism = synthetic construct
SEQUENCE: 5
gttttagttc tatgttggat attgataaag aaatttatca atatccaaca atagttctaa    60
gataaggcct tatgtgccgt agggtatagc ggtatcccga acaattccgc tg           112

SEQ ID NO: 6            moltype = RNA   length = 114
FEATURE                 Location/Qualifiers
source                  1..114
                        mol_type = other RNA
                        organism = synthetic construct
SEQUENCE: 6
gttttagttc tatgttggat attctgatac gaaattgtca gaatatccaa caatagttct    60
aagataaggc cttatgtgcc gtagggtata gcggtatccc gaacaattcc gctg         114

SEQ ID NO: 7            moltype = RNA   length = 100
FEATURE                 Location/Qualifiers
source                  1..100
                        mol_type = other RNA
                        organism = synthetic construct
SEQUENCE: 7
gttttagttc tatgttggat attgaaaaat atccaacaat agttctaaga taaggcctta    60
tgtgccgtag ggtatagcgg tatcccgaac aattccgctg                         100

SEQ ID NO: 8            moltype = RNA   length = 108
FEATURE                 Location/Qualifiers
source                  1..108
                        mol_type = other RNA
                        organism = synthetic construct
SEQUENCE: 8
gttttagttg ttggatattg ataaactgat acgaaattgt cagtttatca atatccaaca    60
aggccttatg tgccgtaggg tatagcggta tcccgaacaa ttccgctg                108

SEQ ID NO: 9            moltype = RNA   length = 105
FEATURE                 Location/Qualifiers
source                  1..105
                        mol_type = other RNA
                        organism = synthetic construct
SEQUENCE: 9
gttttagttg gatattgata aactgatacg aaattgtcag tttatcaata tccaacaagg    60
ccttatgtgc cgtagggtat agcggtatcc cgaacaattc cgctg                   105

SEQ ID NO: 10           moltype = DNA   length = 3138
FEATURE                 Location/Qualifiers
source                  1..3138
                        mol_type = other DNA
                        organism = synthetic construct
SEQUENCE: 10
atgaagagaa agatcggcat cggcctggac gtgggcatcg cagcgtggg cttcgccgtg     60
ctgagctacg acaaggtgta cgacgccaga atcgagcagg tgggcgtgag actgttcgac   120
agcggcgagg agcccaagac caaggtgagc aagaaccagg gcagaagaca gtacagagcc   180
ggcagaagac tgatcagaag aagataccac agaaaggaga gagccaagag attcatcgag   240
agaatcggcc tgctgagcgc cgacaagatc aaggagtggc aggaggtgaa cggcaaccag   300
aacatctact acgtgagatt cagaggcctg agcgagaagc tgacccccca ggagatcgcc   360
gactgcgtga tccacttctg caaccacaga ggctacagag agttctacga ggacgacgtg   420
gccgacgaga aggaggccgg caagatcaag accgccctga cgagattcga cgagaagatg   480
gccgccggca gtacgtgag cgtggccgac atgatcctgc acgacaacga gttcagcacc   540
aacacccagt tccccgactt ccacaaccac aagggcgacg acgacgagaa gtacttcctg   600
atcaagagag ccgccctgag agacgagctg agagccatcc tgagaaagca gcaggagttc   660
tacgagcagc tgaccgagca aacatcgac ttcctgtgcg acgacatcgt gttcgtgcag   720
agagacttcg aggacggccc cggcgacaag accgacaaga gagaaagtt catgggcttc   780
```

```
ctggacagca tcggctgctg catgttctac aaggaggagg tgagaggcta cagaagcacc      840
gtgatcgccg acatctacag cctggtgaac ggcctgagca agatgatgta cgtggacagc      900
accaccggcg agatcacctt cctgcccgag gccgccgaca agatcatcga cttcgccctg      960
aagaacgcca gcatcaccga gaaggacatc aaggagatcc tgaagaagta caacctgacc     1020
ctgatcaagg ccgagaagct ggaggagaac atcccccaga ccatcaagac cctgaagatc     1080
ctgaagaaga tcctggacga cagcggctac agctacgacg agctgatcaa ggaggagcag     1140
ttcgacttcg acagacccag caagctgcac gagctgtgca gcctgctggc cagcaacatc     1200
acccccaaga agaagaaaa ggccctggag aaggccggct ggaacaaggc cctgcaggag     1260
cagaccagaa gaatccactt cggcggcacc agcaacgtgt gctacagata catgctggag     1320
gccatcgacg ccttcagaca cggcgagctg tacggcaact tccaggccag aagaaacaag     1380
gagcagctga ccgacgaggc cgagaacacc gagaaggtga gactgctgcc ccccttcacc     1440
aaggagatgg acgaggacgt ggtgaagaac gtggtggtgt tcaaggccat caacgagaca     1500
agaaagatca tcaacgccct gatcggcaag tacggcagcc ccgcctacat caacatcgag     1560
gtggccgacg agctgggcca cagcatcgag acaagaagaa agatgaccaa ggccaacaac     1620
gagaacgatga agaagaagga ggccatcagc accaagctgg tggagctggg cctgagaaag     1680
gagggcgagg tgagcggcaa ggacatcgcc agatacagac tgtgggagca gcggacggc     1740
atcgacctgt acaccggcga gaacatcccc gaggccgacg tgctgagcgg ccagtacgac     1800
atcgaccaca tcatcccctt cagcctgatc ctggacagca ccctgaacaa caaggtgctg     1860
accggcatgg gcagcaacag acaggccaag agcaacaagg ccccccagaga gtacctgagc     1920
gacaaggccg agctggagtt catcaagaga gtgaacatcc tgctgaagaa gaagatcatc     1980
agcaagaaga agtacaagta cctgatggtg aagaacctga gagacagcaa gctgctggac     2040
gagtgagaca gcagaaacat caacgacacc agatacctca gcagattcct ggtgaactac     2100
ctgaacaaca tgctgctgtt caacagcgac aagaagaaga acgtgtacgc catcaacggc     2160
gccatcacca gcaagatgag aaagctgtgg ctgaacaaga gaacctgggg caccccccgag     2220
aagaacagag agaacaacct gcaccacgcc gccgacgcca tcgtgatcgc caacctgacc     2280
cccgccgccg tggagctggc cagcgacaac ctgaaagctgc agaacatctt cagacagaac     2340
ggcaagagag tgaccgagga gtacgacaac tacctggaca aggccgtgag aaagatggag     2400
aagtactacc acctgaacga ggagctggcc aagaacctgc tggtgagaaa ggacagaatc     2460
cccagcatgg tgaagagcct gagagaggag acagacaaga gactggtgga caccagcctg     2520
gaggagttca acatggtgac ccccgaggcc ttcagaaaga cctggagca gtactacgac     2580
gacagcgact tcgtggccag catccagatg cccctggtga gctacaagca gagcaagaga     2640
ttcagcggca gcttcaccaa ggacaacccc atcaagaaga ggacaagga ggacagcagc     2700
agcgtgaaga tggacagcct gggcaacgag aacatcctgg acgccaagag ctactactgc     2760
ctggaggtgt acagcaccaa ggacaacaag accgccctga gaggcctgag atacgtggac     2820
ttcaagctga gaacaagaa gatgttcatc aacgtgccca accccgacaa ctacgacaag     2880
cacatcatgt acctgttcaa gaacgactac atcgtggtgt acaacaagaa gggcgaggag     2940
agaatcaagg ctactacac cggcatcaag aacatcaagg ccaacagatt ctacctgatc     3000
agcaacaacg acgccgtgag aaaggacttc accctgagca aggacgacac catcaagaag     3060
taccacatcg acatcctggg ccagatcggc ggcgaggtga agtgcagcgc ccccttcctg     3120
agcatcaccg agaaggag                                                   3138

SEQ ID NO: 11           moltype = RNA   length = 36
FEATURE                 Location/Qualifiers
source                  1..36
                        mol_type = other RNA
                        organism = synthetic construct
SEQUENCE: 11
gttttagttc tatgttggat attgataaac tgatac                                36

SEQ ID NO: 12           moltype = RNA   length = 120
FEATURE                 Location/Qualifiers
source                  1..120
                        mol_type = other RNA
                        organism = synthetic construct
SEQUENCE: 12
ttgtcagttt atcaatatcc aacaatagtt ctaagataag gccttatgtg ccgtagggta      60
tagcggtatc ccgaacaatt ccgctgcttt gagtattaag ctgctacatc atgtagcagc     120

SEQ ID NO: 13           moltype = DNA   length = 8641
FEATURE                 Location/Qualifiers
source                  1..8641
                        mol_type = other DNA
                        organism = synthetic construct
                        plasmid = CasRfg.3-pET28a
SEQUENCE: 13
tggcgaatgg gacgcgccct gtagcggcgc attaagcgcg gcgggtgtgg tggttacgcg      60
cagcgtgacc gctacacttg ccagcgccct agcgcccgct cctttcgctt tcttcccttc     120
ctttctcgcc acgttcgccg gctttccccg tcaagctcta aatcgggggc tccctttagg     180
gttccgattt agtgctttac ggcacctcga ccccaaaaaa cttgattagg gtgatggttc     240
acgtagtggg ccatcgccct gatagacggt ttttcgccct ttgacgttgg agtccacgtt     300
ctttaatagt ggactcttgt tccaaactgg aacaacactc aacccttatct cggtctattc     360
ttttgattta agggatttt tgccgatttc ggcctattgg ttaaaaaatg agctgattta     420
acaaaaattt aacgcgaatt ttaacaaaat attaacgttt acaatttcag gtggcacttt     480
tcggggaaat gtgcgcggaa cccctatttg tttatttttc taaatacatt caaatatgta     540
tccgctcatg aattaattct tagaaaaact catcgagcat caaatgaaac tgcaatttat     600
tcatatcagg attatcaata ccatattttt gaaaaagccg tttctgtaat gaaggagaaa     660
actcaccgag gcagttccat aggatggcaa gatcctggta tcggtctgcg attccgactc     720
gtccaacatc aatacaacct attaatttcc cctcgtcaaa aataaggtta tcaagtgaga     780
aatcaccatg agtgacgact gaatccggtg agaatggcaa aagtttatgc atttctttcc     840
```

```
agacttgttc aacaggccag ccattacgct cgtcatcaaa atcactcgca tcaaccaaac    900
cgttattcat tcgtgattgc gcctgagcga gacgaaatac gcgatcgctg ttaaaaggac    960
aattacaaac aggaatcgaa tgcaaccggc gcaggaacac tgccagcgca tcaacaatat   1020
tttcacctga atcaggatat tcttctaata cctggaatgc tgttttcccg gggatcgcag   1080
tggtgagtaa ccatgcaatc atcaggagtac ggataaaatg cttgatggtc ggaagaggca   1140
taaattccgt cagccagttt agtctgacca tctcatctgt aacatcattg gcaacgctac   1200
ctttgccatg tttcagaaac aactctggcg catcgggctt cccatacaat cgatagattg   1260
tcgcacctga ttgcccgaca ttatcgcgag cccatttata cccatataaa tcagcatcca   1320
tgttggaatt taatcgcggc ctagagcaag acgtttcccg ttgaatatgg ctcataacac   1380
cccttgtatt actgtttatg taagcagaca gttttattgt tcatgaccaa aatcccttaa   1440
cgtgagtttt cgttccactg agcgtcagac cccgtagaaa agatcaaagg atcttcttga   1500
gatccttttt ttctgcgcgt aatctgctgc ttgcaaacaa aaaaaccacc gctaccagcg   1560
gtggtttgtt tgccggatca agagctacca actctttttc cgaaggtaac tggcttcagc   1620
agagcgcaga taccaaatac tgtccttcta gtgtagccgt agttaggcca ccacttcaag   1680
aactctgtag caccgcctac atacctcgct ctgctaatcc tgttaccagt ggctgctgcc   1740
agtggcgata agtcgtgtct taccgggttg gactcaagac gatagttacc ggataaggcg   1800
cagcggtcgg gctgaacggg gggttcgtgc acacagccca gcttggagcg aacgacctac   1860
accgaactga gatacctaca gcgtgagcta tgagaaagcg ccacgcttcc cgaagggaga   1920
aaggcggaca ggtatccggt aagcggcagg gtcggaacag gagagcgcac gagggagctt   1980
ccagggggaa acgcctggta tctttatagt cctgtcgggt ttcgccacct ctgacttgag   2040
cgtcgatttt tgtgatgctc gtcagggggg cggagcctat ggaaaaacgc cagcaacgcg   2100
gccttttttac ggttcctggc cttttgctgg cctttttgctg acatgttctt tcctgcgtta   2160
tcccctgatt ctgtggataa ccgtattacc gcctttgagt gagctgatac cgctcgccgc   2220
agccgaacga ccgagcgcag cgagtcagtg agcgaggaag cggaagagcg cctgatgcgg   2280
tattttctcc ttacgcatct gtgcggtatt tcacaccgca tatatggtgc actctcagta   2340
caatctgctc tgatgccgca tagttaagcc agtatacact ccgctatcgc tacgtgactg   2400
ggtcatggct gcgccccgac acccgccaac acccgctgac gcgccctgac gggcttgtct   2460
gctcccggca tccgcttaca gacaagctgt gaccgtctcc gggagctgca tgtgtcagag   2520
gttttcaccg tcatcaccga aacgcgcgag gcagctgcgg taaagctcat cagcgtggtc   2580
gtgaagcgat tcacagatgt ctgcctgttc atccgcgtca agtcgttga gtttctccag   2640
aagcgttaat gtctggcttc tgataaagcg ggccatgtta agggcggttt ttcctgtttt   2700
ggtcactgat gcctccgtgt aagggggatt tctgttcatg ggggtaatga taccgatgaa   2760
acgagagagg atgctcacga tacgggttac tgatgatgaa catgcccggt tactggaacg   2820
ttgtgagggt aaacaactgg cggtatggat gcggcgggac cagagaaaaa tcactcaggg   2880
tcaatgccag cgcttcgtta atacagatgt aggtgttcca cagggtagcc agcagcatcc   2940
tgcgatgcag atccggaaca taatggtgca gggcgctgac ttccgcgttt ccagacttta   3000
cgaaacacgg aaaccgaaga ccattcatgt tgttgctcag tcgcagacg ttttgcagca   3060
gcagtcgctt cacgttcgct cgcgtatcgg tgattcattc tgctaaccag taaggcaacc   3120
ccgccagcct agcccgggtcc tcaacgacag gagcacgatc atgcgcaccc gtggggccgc   3180
catgccggcg ataatggcct gcttctcgcc gaaacgtttg gtggcgggac cagtgacgaa   3240
ggcttgagcg agggcgtgca agattccgaa taccgcaagc gacaggccga tcatcgtcgc   3300
gctccagcga aagcggtcct cgccgaaaat gacccagagc gctgccggca cctgtcctac   3360
gagttgcatg ataagaagaa cagtcataag tgcggcgacg atagtcatgc cccgcgccca   3420
ccggaaggag ctgactgggt tgaaggctct caagggcatc ggtcgagatc ccggtgccta   3480
atgagtgagc taacttacat taattgcgtt gcgctcactg cccgctttcc agtcgggaaa   3540
cctgtcgtgc cagctgcatt aatgaatcgg ccaacgcgcg gggagaggcg gtttgcgtat   3600
tgggcgccag ggtggttttt cttttcacca gtgagacggg caacagctga ttgcccttca   3660
ccgcctggcc ctgagagagt tgcagcaagc ggtccacgct ggtttgcccc agcaggcgaa   3720
aatcctgttt gatggtggtt aacggcggga tataacatga gctgtcttcg gtatcgtcgt   3780
atcccactac cgagatatcc gcaccaacgc gcagcccgga ctcggtaatg gcgcgcattg   3840
cgcccagcgc catctgatcg ttggcaacca gcatcgcagt gggaacatgg ccctcattca   3900
gcatttgcat ggtttgttga aaaccggaca tggcactcca gtcgccttcc cgttccgcta   3960
tcggctgaat ttgattgcga gtgagatatt tatgccagcc agccagacgc agacgcgccg   4020
agacagaact taatgggccc gctaacagcg cgatttgctg gtgacccaat gcgaccagat   4080
gctccagcgc cagtcgcgta ccgtcttcat gggagaaaat aatactgttg atgggtgtct   4140
ggtcagagac atcaagaaat aacgccgaaa cattagtgca ggcagcttcc acagcaatgg   4200
catcctggtc atccagcgga tagttaatga tcagcccact gacgcgttgc gcgagaagat   4260
tgtgcaccgc cgctttacag gcttcgacgc cgcttcgttc taccatcgac accaccacgc   4320
tggcacccag ttgatcggcg cgagatttaa tcgccgcgac aatttgcgac ggcgcgtgca   4380
gggccagact ggaggtggca acgccaatca gcaacgactg tttgcccgcc agttgttgtg   4440
ccacgcggtt gggaatgtaa ttcagctccg ccatcgccgc ttccactttt tcccgcgttt   4500
tcgcagaaac gtggctggcc tggttcacca cgcgggaaac ggtctgataa gagacaccgg   4560
catactctgc gacatcgtat aacgttactg gtttcacatt caccaccctg aattgactct   4620
cttccgggcg ctatcatgcc ataccgcgaa aggttttgcg ccattcgatg gtgtccgggaa   4680
tctcgacgct ctcccttatg cgactcctgc attaggaagc agcccagtag taggttgagg   4740
ccgttgagca ccgccgccgc aaggaatggt gcatgcaagg agatggcgcc caacagtccc   4800
ccggccacgg ggcctgccac catacccacg ccgaaacaag cgctcatgag cccgaagtgg   4860
cgagcccgat cttcccccatc ggtgatgtcg gcgatatagg cgccagcaac cgcacctgtg   4920
gcgccggtga tgccggccac gatgcgtccg gcgtagagga tcgagatctc gatcccgcga   4980
aattaatacg actcactata gggaattgt gagcggataa caattcccct ctagaaataa   5040
ttttgtttaa ctttaagaag gagatatacc atgggcagca gccatcatca tcatcatcac   5100
agcagcggcc tggtgccgcg cggcagccat atggctagca tgactggtgg acagcaaatg   5160
ggtcgcggat ccccggcagc taagaaaaag aaactggatg gcagcgtcga catgaagaga   5220
aagatccgca tcggcctgga cgtgggcatc ggctcgttcg gcgctgagctac   5280
gacaaggtgt acgacgccag aatcgagcag gtgggcgtga gactgttcga cagcggcgag   5340
gagcccaaga ccaaggtgag caagaaccag ggcagaagca gtacagagc cggcagaaga   5400
ctgatcagaa gaagatacca cagaaggag agagccaaga gattcatcga gaatcggc    5460
ctgctgagcc ccgacaagat caaggagtgg caggaggtga acggcaacca gaacatctac   5520
tacgtgagat tcagaggcct gagcgagaag ctgaccccccc aggagatcgc cgactgcgtg   5580
```

```
atccacttct gcaaccacag aggctacaga gagttctacg aggacgacgt ggccgacgag    5640
aaggaggccg gcaagatcaa gaccgccctg agcagattcg acgagaagat ggccgccggc    5700
aagtacgtga gcgtggccga catgatcctg cacgacaacg agttcagcac caacacccag    5760
ttccccgact tccacaacca caagggcgac gacgacgaga agtacttcct gatcaagaga    5820
gccgccctga gagacgagct gagagccatc ctgagaaagc agcaggagtt ctacgagcag    5880
ctgaccgagc acaacatcga cttcctgtgc gacgacatcg tgttcgtgca gagagacttc    5940
gaggacggcc ccggcgacaa gaccgacaag aagagaaagt tcatgggctt cctggacagc    6000
atcggctgct gcatgttcta caaggaggag gtgagaggct acagaagcac cgtgatcgcc    6060
gacatctaca gcctggtgaa cggcctgagc aagatgatgt acgtggacag caccaccggc    6120
gagatcacct tcctgcccga ggccgccgac aagatcatcg acttcgccct gaagaacgcc    6180
agcatcaccg agaaggacat caaggagatc ctgaagaagt acaacctgac cctgatcaag    6240
gccgagaagc tggaggagaa catccccag accatcaaga ccctgaagat cctgaagaag    6300
atcctggacg acagcggcta cagctacgac gagctgatca aggaggagca gttcgacttc    6360
gacagaccca gcaagctgca cgagctgtgc agcctgctgg ccagcaacat caccccaag    6420
agaagaagaa aggccctgga aaggccggc tggaacaag ccctgcagga gcagaccaga    6480
agaatccact tcggcggcac cagcaacgtg tgctacagat acatgctgga ggccatcgac    6540
gccttcgaga acggcgagct gtacggcaac ttccaggcca aagaaacaa ggagcagctg    6600
accgacgagg ccgagaacac cgagaaggtg agactgctgc cccccttcac caaggagatg    6660
gacgaggacg tggtgaagaa cgtggtggtg ttcaaggcca tcaacgagac aagaaagatc    6720
atcaacgccc tgatcggcaa gtacggcagc cccgcctaca tcaacatcga ggtgccgac    6780
gagctgggcc acagcatcga caagaaga aagatgacca aggccaacaa cgagaagatg    6840
aagaagaagg aggccatcag caccaagctg gtggagctgg gcctgagaaa ggagggcgag    6900
gtgagcggca aggacatcgc cagatacaga ctgtgggagc agcaggacgg catcgacctg    6960
tacaccggcg agaacatccc cgaggccgac gtgctgagcg ccagtacga catcgaccac    7020
atcatcccct tcagcctgat cctggacgac accctgaaca caaggtgct gaccggcatg    7080
ggcagcaaca gacaggccaa gagcaacaag gccccccaag agtacctgag cgacaaggcc    7140
gagctggagt tcatcaagag agtgaacatc ctgctgaaga agaagatcat cagcaagaag    7200
aagtacaagt acctgatggt gaagaacctg agagacagca gctgctgga cgagtggaag    7260
agcagaaaca tcaacgacac cagatacatc agcagattcc tggtaacta cctgaacaac    7320
atgctgctgt tcaacagcga caagaagaac gtgtacg ccatcaacgg cgccatcacc    7380
agcaagatga gaaagctgtg gctgaacaag agaacctggg gcacccccga gaagaacaga    7440
gagaacaacc tgcaccacgc cgccgacgcc atcgtgatcg ccaacctgac ccccgccgcc    7500
gtggagctgg ccagcgacaa cctgaagctg cagaacatct tcagacagaa cggcaagaga    7560
gtgaccgagg agtacgacaa ctacctggac aaggccgtga gaaagatgga agtgtactac    7620
caccgaacg aggagctggc caagaacctg ctggtgacaa agggcgagaa gcccagcatg    7680
gtgagaagcc tgagagagga gacagacaag agactggtgg acaccagcct ggaggagttc    7740
aacatggtga ccccgaggc cttcagaaag aacctggagc agtactacaa cgacagcgac    7800
ttcgtggcca gcatccagat gccctggtg agctacaagc agagcaagag attcagcggc    7860
agcttcacca aggacaaccc catcaagaag aaggacaagg aggacagcag ccgtgaag    7920
atggacagcc tgggcaacga gaacatcctg gacgccaaga gctactactg cctggaggtg    7980
tacagcacca aggacaacaa gaccgccctg agaggcctga gatacgtgga cttcaagctg    8040
aagaacaaga gatgttcat caacgtgccc aaccccgaca ctacgacaa gcacatcatg    8100
tacctgttca gaacgacta catctgtgtg tacaacagga gggcgaggag gagaatcaag    8160
ggctactaca ccggcatcaa gaacatcaag gccaacagat tctacctgat cagcaacaac    8220
gacgccgtga aaggactt caccctgagc aaggacgaca ccatcaagaa gtaccacatc    8280
gacatcctgg ccagatcgg cggcgaggtg aagtgcagcg ccccttcct gagcatcacc    8340
gagaaggaga caggcggcg cccccggcg gcgccgcg ccggcagcg cagccctaag    8400
aaaaaacgaa aagttggcag cggaagcaaa aggccggcgg ccacgaaaaa ggccggccag    8460
gcaaaaaaga aaaagtaact cgagcaccac caccaccacc actgagatcc ggctgctaac    8520
aaagcccgaa aggaagctga gttggctgct gccaccgctg agcaataact agcataaccc    8580
cttgggccct ctaaacgggt cttgaggggt ttttgctga aggaggaac tatatccgga    8640
t                                                                   8641

SEQ ID NO: 14          moltype = DNA  length = 273
FEATURE                Location/Qualifiers
source                 1..273
                       mol_type = other DNA
                       organism = synthetic construct
SEQUENCE: 14
ggagttcaga cgtgtgctct tccgatctca gcacaaaagg aaactcaccc taactgtaaa     60
gtaattgtgt gttttgagac tataaatatg catgcgagaa aagccttgtt tgccaccatg    120
gaacggctcg gagatcatca ttgcgnnnnn nngtgagcaa gggcgaggag ctgttcaccg    180
gggtggtgcc catcctggtc gagctggacg gcgacgtaaa cggccacaag ttcagcgtgt    240
ccggcagatc ggaagagcac acgtctgaac tcc                                 273

SEQ ID NO: 15          moltype = RNA  length = 185
FEATURE                Location/Qualifiers
source                 1..185
                       mol_type = other RNA
                       organism = synthetic construct
SEQUENCE: 15
gaacggctcg gagatcatca ttgcggtttt agttctatgt tggatattga taaactgata     60
cgaaattgtc agtttatcaa tatccaacaa tagttctaag ataaggcctt atgtgccgta    120
gggtatagcg gtatcccgaa caattccgct gctttgagta ttaagctgct acatcatgta    180
gcagc                                                                185

SEQ ID NO: 16          moltype = DNA  length = 59
FEATURE                Location/Qualifiers
source                 1..59
```

```
                        PCR_primers =
                            fwd_seq:gttgacatgctggattgagacttcctacactctttccctacacgacgctct
                            tccgatct,rev_seq:gatcggaagagcgtcgtgtagggaaagagtgtaggaagtctc
                            aatccagcatgtcaac
                        mol_type = other DNA
                        organism = synthetic construct
SEQUENCE: 16
gttgacatgc tggattgaga cttcctacac tctttcccta cacgacgctc ttccgatct   59

SEQ ID NO: 17           moltype = DNA  length = 58
FEATURE                 Location/Qualifiers
source                  1..58
                        PCR_primers =
                            fwd_seq:gttgacatgctggattgagacttcctacactctttccctacacgacgctct
                            tccgatct,rev_seq:gatcggaagagcgtcgtgtagggaaagagtgtaggaagtctc
                            aatccagcatgtcaac
                        mol_type = other DNA
                        organism = synthetic construct
SEQUENCE: 17
gatcggaaga gcgtcgtgta gggaaagagt gtaggaagtc tcaatccagc atgtcaac    58

SEQ ID NO: 18           moltype = DNA  length = 19
FEATURE                 Location/Qualifiers
source                  1..19
                        PCR_primers =
                            fwd_seq:ggagttcagacgtgtgctc,rev_seq:gttgacatgctggattgagactt
                            c
                        mol_type = other DNA
                        organism = synthetic construct
SEQUENCE: 18
ggagttcaga cgtgtgctc                                               19

SEQ ID NO: 19           moltype = DNA  length = 24
FEATURE                 Location/Qualifiers
source                  1..24
                        PCR_primers =
                            fwd_seq:ggagttcagacgtgtgctc,rev_seq:gttgacatgctggattgagactt
                            c
                        mol_type = other DNA
                        organism = synthetic construct
SEQUENCE: 19
gttgacatgc tggattgaga cttc                                         24

SEQ ID NO: 20           moltype = DNA  length = 58
FEATURE                 Location/Qualifiers
source                  1..58
                        PCR_primers =
                            fwd_seq:aatgatacggcgaccaccgagatctacactatagcctacactctttcccta
                            cacgacg,rev_seq:caagcagaagacggcatacgagatcgagtaatgtgactggagt
                            tcagacgtgtgctc
                        mol_type = other DNA
                        organism = synthetic construct
SEQUENCE: 20
aatgatacgg cgaccaccga gatctacact atagcctaca ctctttccct acacgacg    58

SEQ ID NO: 21           moltype = DNA  length = 57
FEATURE                 Location/Qualifiers
source                  1..57
                        PCR_primers =
                            fwd_seq:aatgatacggcgaccaccgagatctacactatagcctacactctttcccta
                            cacgacg,rev_seq:caagcagaagacggcatacgagatcgagtaatgtgactggagt
                            tcagacgtgtgctc
                        mol_type = other DNA
                        organism = synthetic construct
SEQUENCE: 21
caagcagaag acggcatacg agatcgagta atgtgactgg agttcagacg tgtgctc     57

SEQ ID NO: 22           moltype = DNA  length = 532
FEATURE                 Location/Qualifiers
source                  1..532
                        mol_type = other DNA
                        organism = synthetic construct
SEQUENCE: 22
gaatgggcta tttctaagca cggcaggtac cgtcttcccc ttcccccgcc aacacagctg   60
gcccaggaca agaaggtgca gagacaaaca gggggcaccc tgcctgtcct gctaggaact  120
gcaaggcagc gtgccgcaca cgctgcctgg gccaatgcca cccaggccag gagagggttt  180
ggggccagac accagcccat acccaagggt cccaggggat gtggggagaa gggaatcca   240
ccttttcctt ccctccccac tcccaaataa cacacagaca gctctgttgg tctgagaatg  300
atggacattt agacactggc gccaggtttg cgcctgaccg gcgccacgca ggggtgggcg  360
```

```
gagcaaagac acacaggtgg gctacaggtg tcacacggca ccagccaggg cccggggtgg    420
ctggggtgag gatgggtgtt tggccagtga ccaggagtca ggtcaagtcc aggtggtcag    480
tgccaggggc tccaggaggg gagggcagtg ccataaccct cctggtgtcc ag            532

SEQ ID NO: 24           moltype = DNA  length = 500
FEATURE                 Location/Qualifiers
source                  1..500
                        mol_type = other DNA
                        organism = synthetic construct
SEQUENCE: 23
ggcactgtgc cctccagatt cctcagagcc tggtgccagg tgcacctccc cagccctctc     60
agccctgag  ctctgccacc ctgcccgggc ttctgccctt gggtcctggc ctctcagggt    120
ctcctcagct ctgcaaggag gggctgggag caggtcccag gctagcagtg ggctggaggc    180
ctcctgtgtg gtctctacct gtccatgccg aggggtcacc tctgggtgag gtcgcaccca    240
ccccctcac  ggggctgctt tgccagaagg tctgttcccc tcatggcctc tgctactctt    300
tacacttagt tcttcccagg aagggcccgg tggctgcaga taatgtttcc catctgtgga    360
gccttcaagg gctgggccca tgaggattct gctcccagct tgctcttcct ctccagcctg    420
cacccaccag gccccagaat cctgaggatg gagctgctc  tgtccctga ggtggtctaa     480
acctctgggg aggcactgga                                                500

SEQ ID NO: 24           moltype = DNA  length = 3194
FEATURE                 Location/Qualifiers
source                  1..3194
                        mol_type = other DNA
                        organism = synthetic construct
                        plasmid = CasRfg.3-N2-Target
SEQUENCE: 24
agcgcccaat acgcaaaccg cctctccccg cgcgttggcc gattcattaa tgcagctggc     60
acgacaggtt tcccgactgg aaagcgggca gtgagcgcaa cgcaattaat gtgagttagc    120
tcactcatta ggcaccccag gctttacact ttatgcttcc ggctcgtatg ttgtgtggaa    180
ttgtgagcgg ataacaattt cacacaggaa acagctatga ccatgattac gccaagctca    240
gaattaaccc tcactaaagg gactagtcca gggatctgga caccaggagg ttatggcac     300
tgccctcccc tcctggagcc cctggcactg accacctgga cttgacctga ctcctggtca    360
ctggccaaac acccatcctc accccagcca ccccgggccc tggctggtgc cgtcgtgacac   420
ctgtagccca cctgtgtgtc tttgctccgc ccaccctgc  gtgggcgcgg tcaggcgcaa   480
acctggcgcc agtgtctaaa tgtccatcat tctcagacca acagagctgt ctgtgtgtta    540
tttgggaggt gggagggaag gaaaaggtgg attcccttc  tccccacatc ccctgggacc    600
cttgggtatg ggctggtgtc tggccccaaa ccctctcctg gctgggtgg  cattggccca    660
ggcagcgtgt gcggcacgct gccttgcagt tcctagcagg acaggcaggg tgccccctgc    720
ttgtctctgc accttcttgt cctgggccag ctgtgttggc gggggaaggg gaagacggta    780
cctgccgtgc ttagaaatag cccattcatc ctgggctaaa ttcaattcgc cctatagtga    840
gtcgtattac aattcactgg ccgtcgtttt acaacgtcgt gactgggaaa accctggcgt    900
tacccaactt aatcgccttg cagcacatcc ccctttcgcc agctggcgta atagcgaaga    960
ggcccgcacc gatcgccctt cccaacagtt gcgcagccta tacgtacggc agtttaaggt   1020
ttacacctat aaaagagaga gccgttatcg tctgtttgtg gatgtacaga gtgatattat   1080
tgacacgccg gggcgacgga tggtgatccc cctggccagt gcacgtctgc tgtcagataa   1140
agtctcccgt gaacttttacc cggtggtgca tatcgatgag gaaagctgac gcatgatgac   1200
caccgatatg gccagtgtgc cggtctccgt tatcggggaa gaagtggctg atctcagcca    1260
ccgcgaaaat gacatcaaaa acgccattaa cctgatgttc tggggaatat aaggcgcgcc   1320
acattcaaat atgtatccgc tcatgagatt atcaaaaagg atcttcacct agatcctttt    1380
aaattaaaaa tgaagtttta aatcaatcta agtatatat  gagtaaactt ggtctgacag    1440
ttaccaatgc ttaatcagtg aggcacctat ctcagcgatc tgtctatttc gttcatccat    1500
agttgcctga ctccccgtcg tgtagataac tacgatacgg gagggcttac catctggccc    1560
cagtgctgca atgataccgc gagacccacg ctcaccggct ccagatttat cagcaataaa    1620
ccagccagcc ggaagggccg agcgcagaag tggtcctgca actttatccg cctccatcca    1680
gtctattaat tgttgccggg aagctagagt aagtagttcg ccagttaata gtttgcgcaa    1740
cgttgttgcc attgctacag gcatcgtggt gtcacgctcg tcgtttggta tggcttcatt    1800
cagctccggt tcccaacgat caaggcgagt tacatgatcc ccatgttgt  gcaaaaaagc    1860
ggttagctcc ttcggtcctc cgatcgttgt cagaagtaag ttggccgcag tgttatcact    1920
catggttatg gcagcactgc ataattctct tactgtcatg ccatccgtaa gatgcttttc    1980
tgtgactggt gagtactcaa ccaagtcatt ctgagaatag tgtatgcggc gaccgagttg    2040
ctcttgcccg gcgtcaatac gggataatac cgcgccacat agcagaactt taaaagtgct    2100
catcattgga aaacgttctt cggggcgaaa actctcaagg atcttaccgc tgttgagatc    2160
cagttcgatg taaccactc  gtgcacccaa ctgatcttca gcatctttta ctttcaccag    2220
cgtttctggg tgagcaaaaa caggaaggca aaatgccgca aaaaagggaa taagggcgac    2280
acggaaatgt tgaatactca tactcttcct ttttcaatat tattgaagca tttatcaggg    2340
ttattgtctc atgaccaaaa tcccttaacg tgagttttcg ttccactgag cgtcagaccc    2400
cgtagaaaag atcaaaggat cttcttgaga tcctttttt  ctgcgcgtaa tctgctgctt    2460
gcaaacaaaa aaaccaccgc taccagcggt ggtttgtttg ccggatcaag agctaccaac    2520
tctttttccg aaggtaactg gcttcagcag agcgcagata ccaaatactg ttcttctagt    2580
gtagccgtag ttaggccacc acttcaagaa ctctgtagca ccgcctacat acctcgctct    2640
gctaatcctg ttaccagtgg ctgctgccag tggcgataag tcgtgtctta ccgggttgga    2700
ctcaagacga tagttaccgg ataaggcgca gcggtcgggc tgaacggggg gttcgtgcac    2760
acagcccagc ttggagcgaa cgacctacac cgaactgaga tacctacagc gtgagctatg    2820
agaaagcgcc acgcttcccg aagggagaaa ggcggacagg tatccggtaa gcggcagggt    2880
cggaacagga gagcgcacga gggagcttcc agggggaaac gcctggtatc tttatagtcc    2940
tgtcgggttt cgccacctct gacttgagcg tcgatttttg tgatgctcgt caggggggcg    3000
gagcctatgg aaaaacgcca gcaacgcggc ctttttacgg ttcctggcct tttgctggcc    3060
ttttgctcac atgttctttc ctgcgttatc ccctgattct gtggataacc gtattaccgc    3120
```

```
ctttgagtga gctgataccg ctcgccgcag ccgaacgacc gagcgcagcg agtcagtgag   3180
cgaggaagcg gaag                                                     3194

SEQ ID NO: 25           moltype = DNA  length = 3162
FEATURE                 Location/Qualifiers
source                  1..3162
                        mol_type = other DNA
                        organism = synthetic construct
                        plasmid = CasRfg.3-N4-Target
SEQUENCE: 25
agcgcccaat acgcaaaccg cctctccccg cgcgttggcc gattcattaa tgcagctggc   60
acgacaggtt tcccgactgg aaagcgggca gtgagcgcaa cgcaattaat gtgagttagc   120
tcactcatta ggcaccccag gctttacact ttatgcttcc ggctcgtatg ttgtgtggaa   180
ttgtgagcgg ataacaattt cacacaggaa acagctatga ccatgattac gccaagctca   240
gaattaaccc tcactaaagg gactagtcca gggatggcac tgtgccctcc agattcctca   300
gagcctggtg ccaggtgcac ctccccagcc ctctcagccc ctgagctctg ccaccctgcc   360
cgggcttctg cccttgggtc ctggcctctc agggtctcct cagctctgca aggagggget   420
gggagcaggt cccaggctag cagtggcgctg gaggcctgct gtgtggtctc tacctgtcca   480
tgccgagggg tcacctctgg gtgaggtcgc acccacccc ctcacggggc tgctttgcca   540
gaaggtctgt tcccctcatg gcctctgcta ctctttacac ttagttcttc ccaggaaggg   600
cccggtggct gcagataatg tttcccatct gtggagcctt caagggctgg gcccatgagg   660
attctgctcc cagcttgctc ttcctctcca gcctgcaccc accaggcccc agaatcctga   720
ggatggagct gctcctgtcc cctgaggtgg tctaaacctc tggggaggca ctggaatcct   780
gggctaaatt caattcgccc tatagtgagt cgtattacaa ttcactggcc gtcgttttac   840
aacgtcgtga ctgggaaaac cctggcgtta cccaacttaa tcgccttgca gcacatcccc   900
ctttcgccag ctggcgtaat agcgaagagg cccgcaccga tcgcccttcc caacagttgc   960
gcagcctata cgtacggcag tttaaggttt acacctataa agagagagc gttatcgtc   1020
tgtttgtgga tgtacagagt gatattattg acacgccggg gcgacggatg gtgatccccc   1080
tggccagtgc acgtctgctg tcagataaag tctcccgtga actttacccg gtggtgcata   1140
tcggggatga aagctggcgc atgatgacca ccgatatgc cagtgtgccg gtctccgtta   1200
tcggggaaga agtggctgat ctcagccacc gcgaaatga catcaaaaac gccattaacc   1260
tgatgttctg gggaatataa ggcgcgccac attcaaatat gtatccgctc atgagattat   1320
caaaaaggat cttcacctag atcctttaa attaaaaatg aagttttaaa tcaatctaaa   1380
gtatatatga gtaaacttgg tctgacagtt accaatgctt aatcagtgag gcacctatct   1440
cagcgatctg tctatttcgt tcatccatag ttgcctgact cccgtcgtg tagataacta   1500
cgatacggga gggcttacca tctggcccca gtgctgcaat gataccgcga cccacgct   1560
caccggctcc agatttatca gcaataaacc agccagccgg aagggccgag cgcagaagtg   1620
gtcctgcaac tttatccgcc tccatccagt ctattaattg ttgccgggaa gctagagtaa   1680
gtagttcgcc agttaatagt ttgcgcaacg ttgttgccat tgctacaggc atcgtggtgt   1740
cacgctcgtc gtttggtatg gcttcattca gctccggttc caacgatca aggcgagtta   1800
catgatcccc catgttgtgc aaaaaagcgg ttagctcctt cggtcctccg atcgttgtca   1860
gaagtaagtt ggccgcagtg ttatcactca tggttatggc agcactgcat aattctctta   1920
ctgtcatgcc atccgtaaga tgcttttctg tgactggtga gtactcaacc aagtcattct   1980
gagaatagtg tatgcggcga ccgagttgct cttgcccggc gtcaatacgg gataataccg   2040
cgccacatag cagaacttta aaagtgctca tcattggaaa acgttcttcg gggcgaaaac   2100
tctcaaggat cttaccgctg ttgagatcca gttcgatgta acccactcgt gcacccaact   2160
gatcttcagc atcttttact ttcaccagcg tttctgggtg agcaaaaaca ggaaggcaaa   2220
atgccgcaaa aaagggaata agggcgacac ggaaatgttg aatactcata ctcttccttt   2280
ttcaatatta ttgaagcatt tatcaggtt attgtctcat gaccaaaatc ccttaacgtg   2340
agttttcgtt ccactgagcg tcagaccccg tagaaaagat caaaggatct tcttgagatc   2400
ctttttttct gcgcgtaatc tgctgcttgc aaacaaaaaa accaccgcta ccagcggtgg   2460
tttgtttgcc ggatcaagag ctaccaactc ttttttccgaa ggtaactggc ttcagcagag   2520
cgcagatacc aaatactgtt cttctagtgt agccgtagtt aggccaccac ttcaagaact   2580
ctgtagcacc gcctacatac ctcgctctgc taatcctgtt accagtggct gctgccagtg   2640
gcgataagtc gtgtcttacc gggttggact caagacgata gttaccggat aaggcgcagc   2700
ggtcgggctg aacgggggg tcgtgcacac agcccagctt ggagcgaacg acctacaccg   2760
aactgagata cctacagcgt gagctatgag aaagcgccac gcttcccgaa gggagaaagg   2820
cggacaggta tccggtaagc ggcagggtcg gaacaggaga gcgcacgagg gagcttccag   2880
ggggaaacgc ctggtatctt tatagtcctg tcgggtttcg ccacctctga cttgagcgtc   2940
gatttttgtg atgctcgtca gggggggcgga gcctatgaa aaacgccagc aacgcggcct   3000
ttttacggtt cctggccttt tgctggcctt tgctcacat gttctttcct gcgttatccc   3060
ctgattctgt ggataaccgt attaccgcct ttgagtgagc tgataccgct cgccgcagcc   3120
gaacgaccga gcgcagcgag tcagtgagcg aggaagcgga ag                      3162

SEQ ID NO: 26           moltype = RNA  length = 180
FEATURE                 Location/Qualifiers
source                  1..180
                        mol_type = other RNA
                        organism = synthetic construct
SEQUENCE: 26
ataacacaca gacagctctg gtttagttc tatgttggat attgataaac tgatacgaaa    60
ttgtcagttt atcaatatcc aacaatagtt ctaagataag gccttatgtg ccgtaggta    120
tagcggtatc ccgaacaatt ccgctgcttt gagtattaag ctgctacatc atgtagcagc   180

SEQ ID NO: 27           moltype = RNA  length = 180
FEATURE                 Location/Qualifiers
source                  1..180
                        mol_type = other RNA
                        organism = synthetic construct
```

```
SEQUENCE: 27
ccgagggtc   acctctgggt   gttttagttc   tatgttggat   attgataaac   tgatacgaaa    60
ttgtcagttt   atcaatatcc   aacaatagtt   ctaagataag   gccttatgtg   ccgtagggta   120
tagcggtatc   ccgaacaatt   ccgctgcttt   gagtattaag   ctgctacatc   atgtagcagc   180

SEQ ID NO: 28           moltype = DNA   length = 28
FEATURE                 Location/Qualifiers
source                  1..28
                        PCR_primers =
                        fwd_seq:ccctcactaaagggactagtccagggat,rev_seq:atagggcgaattga
                        atttagcccaggat
                        mol_type = other DNA
                        organism = synthetic construct
SEQUENCE: 28
atagggcgaa   ttgaatttag   cccaggat                                             28

SEQ ID NO: 29           moltype = DNA   length = 27
FEATURE                 Location/Qualifiers
source                  1..27
                        PCR_primers =
                        fwd_seq:cagagctgtctgtgtgttatttgggag,rev_seq:tcccaataacacac
                        agacagctctgddrgdnngagaatgatggacatttagacactgg
                        mol_type = other DNA
                        organism = synthetic construct
SEQUENCE: 29
cagagctgtc   tgtgtgttat   ttgggag                                              27

SEQ ID NO: 30           moltype = DNA   length = 59
FEATURE                 Location/Qualifiers
source                  1..59
                        PCR_primers =
                        fwd_seq:cagagctgtctgtgtgttatttgggag,rev_seq:tcccaataacacac
                        agacagctctgddrgdnngagaatgatggacatttagacactgg
                        mol_type = other DNA
                        organism = synthetic construct
SEQUENCE: 30
tcccaaataa   cacacagaca   gctctgddrg   dnngagaatg   atggacattt   agacactgg     59

SEQ ID NO: 31           moltype = DNA   length = 28
FEATURE                 Location/Qualifiers
source                  1..28
                        PCR_primers =
                        fwd_seq:ccctcactaaagggactagtccagggat,rev_seq:atagggcgaattga
                        atttagcccaggat
                        mol_type = other DNA
                        organism = synthetic construct
SEQUENCE: 31
ccctcactaa   agggactagt   ccagggat                                             28

SEQ ID NO: 32           moltype = RNA   length = 120
FEATURE                 Location/Qualifiers
source                  1..120
                        mol_type = other RNA
                        organism = synthetic construct
SEQUENCE: 32
ataacacaca   gacagctctg   gttttagttc   tatgttggat   attgaaaaat   atccaacaat    60
agttctaaga   taaggcctta   tgtgccgtag   ggtatagcgg   tatcccgaac   aattccgctg   120

SEQ ID NO: 33           moltype = RNA   length = 180
FEATURE                 Location/Qualifiers
source                  1..180
                        mol_type = other RNA
                        organism = synthetic construct
SEQUENCE: 33
ataacacaca   gacagctctg   gttttagttc   tatgttggat   attgataaac   tgatacgaaa    60
ttgtcagttt   atcaatatcc   aacaatagtt   ctaagataag   gccttatgtg   ccgtagggta   120
tagcggtatc   ccgaacaatt   ccgctgcttt   gagtattaag   ctgctacatc   atgtagcagc   180

SEQ ID NO: 34           moltype = RNA   length = 120
FEATURE                 Location/Qualifiers
source                  1..120
                        mol_type = other RNA
                        organism = synthetic construct
SEQUENCE: 34
ataacacaca   gacagctctg   gttttagttc   tatgttggat   attgaaaaat   atccaacaat    60
agttctaaga   taaggcctta   tgtgccgtag   ggtatagcgg   tatcccgaac   aattccgctg   120

SEQ ID NO: 35           moltype = RNA   length = 121
FEATURE                 Location/Qualifiers
```

```
source                       1..121
                             mol_type = other RNA
                             organism = synthetic construct
SEQUENCE: 35
aataacacac agacagctct ggttttagtt ctatgttgga tattgaaaaa tatccaacaa    60
tagttctaag ataaggcctt atgtgccgta gggtatagcg gtatcccgaa caattccgct   120
g                                                                   121

SEQ ID NO: 36                moltype = RNA  length = 122
FEATURE                      Location/Qualifiers
source                       1..122
                             mol_type = other RNA
                             organism = synthetic construct
SEQUENCE: 36
aaataacaca cagacagctc tggttttagt tctatgttgg atattgaaaa atatccaaca    60
atagttctaa gataaggcct tatgtgccgt agggtatagc ggtatcccga acaattccgc   120
tg                                                                  122

SEQ ID NO: 37                moltype = RNA  length = 123
FEATURE                      Location/Qualifiers
source                       1..123
                             mol_type = other RNA
                             organism = synthetic construct
SEQUENCE: 37
caaataacac acagacagct ctggttttag ttctatgttg gatattgaaa aatatccaac    60
aatagttcta agataaggcc ttatgtgccg tagggtatag cggtatcccg aacaattccg   120
ctg                                                                 123

SEQ ID NO: 38                moltype = RNA  length = 124
FEATURE                      Location/Qualifiers
source                       1..124
                             mol_type = other RNA
                             organism = synthetic construct
SEQUENCE: 38
ccaaataaca cacagacagc tctggtttta gttctatgtt ggatattgaa aaatatccaa    60
caatagttct aagataaggc cttatgtgcc gtagggtata gcggtatccc gaacaattcc   120
gctg                                                                124

SEQ ID NO: 39                moltype = AA  length = 1046
FEATURE                      Location/Qualifiers
source                       1..1046
                             mol_type = protein
                             organism = Anaerovibrio sp.
SEQUENCE: 39
MKRKVGFGLD VGIGSVGFAV LSYDKVYDAR IEQVGVRLFD SGEEVKNHKR ASKNQGRRQY    60
RSGRRLIRRR YHRKERAKRF IERIGLLSAA KIKEWQEVNG NQNIYSIRFR GLSEKLTPEE   120
IADCVIHFCN HRGYREFYED DVDEKEAGKI KTALFRFDEK MTEGKYVSVA DMILHDKEFA   180
TDTQFPNFHN HKNDDEEKYF LIKRAALRDE LRAILQKQQE YYKQLTDQNI AFLCDEIVFV   240
QRDFEDGPGD KNDKNRKFMG FLDTIGCCMF YKEELRGFRS TVIADIYSLV NGLSQMMYVD   300
STTGEITFLP EAADDIIEFA LKNASITEKD IKKILEKYNL TLIKAEKLEE NIPQTIKTLK   360
VLKKVLDASG YSYDELIQEE QFDFDKPSKL HELCNLLASN ITPKRRRKAL EKAGWNKDFQ   420
AQTKRIHFGG TSNVCYRYML EAIDAFRHGE LYGNFQARRK QEQLTDEAEN TERVKLLPPF   480
TKEMDEDVVK NVVVFKAINE TRKIINALIG KYGSPAYINI EVADELGHSI ETRRKMTKAN   540
NDNMKKKEAI GAKLVELGLR KEGEVSGKDI ARYRLWEQQN GIDLYTGNNI PEADVLSGQY   600
DVDHIIPFSL ILDDTLNNKV LTGMGSNRQA KSNTAPREYL SDKAEAEFIK RVNVLLKKKI   660
SKKKYQYLMV KNLRDSKLLN EWKSRNINDT RYISRFLANY LNNTLIFNSD KKKNVYAING   720
AITSRMKMW LNKKTWGNPE KNRENNLHHA ADAIVIANLT PAAVELASDN LKLQNIFRQN    780
GKRVTEEYEN YLDRAVRKIE KYYHFNPELA KKLLVSKDRI PSMVRLLREE TDKRLVDPSL   840
EEFKMVTPES FRQNLEQYYN DPEFVASIQM PLVSYKQSKF FSGSFTKDKP IKKKEREDSS   900
TVKIDSLGNE NILDAKSYYC LEVYSTKDNK TALRGLRYVD FKLKDKKMFI TVPNPENYGK   960
HIMYLFKNDY IVVYNKKGEE KARGFYSSVK AITRDQLYLK DNNTNVDIIF TIKKDDTVKK  1020
YHIDILGQIG GEIKCSAPFL SITEKE                                       1046

SEQ ID NO: 40                moltype = DNA  length = 35
FEATURE                      Location/Qualifiers
source                       1..35
                             mol_type = other DNA
                             organism = synthetic construct
SEQUENCE: 40
gttttagttc tatgttggat attgataaac tgata                               35

SEQ ID NO: 41                moltype = DNA  length = 124
FEATURE                      Location/Qualifiers
source                       1..124
                             mol_type = other DNA
                             organism = synthetic construct
SEQUENCE: 41
ttgtcagttt atcaatatcc aacaatagtt ctaagataag gccttatgtg ccgtagggta    60
tagcggtatc cgaacaatt ccgctccttt gttcattaag ctgctacatt atgtagcggc   120
``` tttt                                                                     124

SEQ ID NO: 42          moltype = DNA   length = 7381
FEATURE                Location/Qualifiers
source                 1..7381
                       mol_type = other DNA
                       organism = synthetic construct
SEQUENCE: 42
cctgcaggca gctgcgcgct cgctcgctca ctgaggccgc ccgggcgtcg ggcgaccttt    60
ggtcgcccgg cctcagtgag cgagcgagcg cgcagagagg gagtggccaa ctccatcact   120
aggggttcct gcggcctcta gactcgaggc gttgacattg attattgact agttattaat   180
agtaatcaat tacggggtca ttagttcata gcccatatat ggagttccgc gttacataac   240
ttacggtaaa tggcccgcct ggctgaccgc ccaacgaccc ccgcccattg acgtcaataa   300
tgacgtatgt tcccatagta acgccaatag ggactttcca ttgacgtcaa tgggtggagt   360
atttacggta aactgcccac ttggcagtac atcaagtgta tcatatgcca agtacgcccc   420
ctattgacgt caatgacggt aaatggcccg cctggcatta tgcccagtac atgaccttat   480
gggactttcc tacttggcag tacatctacg tattagtcat cgctattacc atggtgatgc   540
ggttttggca gtacatcaat gggcgtggat agcggtttga ctcacgggga tttccaagtc   600
tccacccat tgacgtcaat gggagtttgt tttggcacca aaatcaacgg gactttccaa    660
aatgtcgtaa caactccgcc ccattgacgc aaatgggcgg taggcgtgta cggtgggagg   720
tctatataag cagagctctc tggctaacta ccggtgccac catgccggca gctaagaaaa   780
agaaactgga tggcagcgtc gacatgaaga aaaggtgagg cttcggcctg gacgtgggca   840
tcggcagcgt gggcttcgcc gtgctgagct acgacaaggt gtacgacgct agaatcgagc   900
aagtgggcgt gagactgttc gacagcgcg aagaggtgaa gaaccacaag agagctagca   960
agaaccaagg ccggagacag tacagaagcg gccgagact gatcagacgg agataccaca   1020
gaaaggagag agccaagaga ttcatcgaga gaatcgcct gctgagcgcc gccaagatca   1080
aggagtggca agaggtgaac ggcaatcaga acatctacag catcagattc agaggcctga   1140
gcgagaagct gaccccgag gagatcgccg actgcgtgat ccacttctgc aaccacagag   1200
gctacagaga gttctacgag gacgacgtgg acgagaagga ggccggcaag atcaagaccg   1260
ccctgttcag attcgacgag aagatgaccg agggcaagta cgtgagcggc gccgacatga   1320
tcctgcacga caaggagttc gccaccgaca cacagttccc caacttccac aaccacaaga   1380
acgacgacga ggagaagtac ttcctgatca gagagccgc cctgagagac gaactgagag   1440
ccatcctgca gaagcagcaa gagtactaca gcagctgac cgatcagaac atcgccttcc   1500
tgtgcgacga gatcgtgttc gtgcagagag acttcgagga cggccccggc gacaagaaca   1560
acaagaacag aaagttcatg ggcttcctgg acaccatcgg ctgctgcatg ttctacaagg   1620
aggagctgag aggcttcaga agcaccgtga tcgccgacat ctacagcctg gtgaacggcc   1680
tgagccaaat gatgtacgtg gacagcacca ccggcgagat caccttcctg cccgaggccg   1740
ccgacgacat catcgagttc gccctgaaga acgctagcat cacagaaaag gacatcaaga   1800
agatcctgga gaatgacaac ctgacccgtga tcaaggccga gaagctggag gagaacatcc   1860
ctcagaccat caagaccctg aaggtgctga gaaggtgct ggacgctagc ggctacagct   1920
acgacgagct gatccaagag gagcagttcg acttcgacaa gctagcaag ctgcacgagc   1980
tgtgcaacct gctggctagc aacatcaccc ctaagagacg gagaaaggcc ctggagaagg   2040
ccggctggaa caaggacttc caagctcaga ccaagagact ccacttcggc ggcacaagca   2100
acgtgtgcta cagatacatg ctggaggcca tcgacgcctt cagacacggc gagctgtacg   2160
gcaacttcca agctagaaga aagcaagagc agctgaccga cgaggccgag aacaccgaga   2220
gagtgaagct gctgccccc ttcacaaagg agatggacga ggacgtggtg aagaacgtgg    2280
tcgtgttcaa ggccatcaac gagacaagaa agatcatcaa cgccctgatc ggcaagtacg   2340
gcagccccgc ctacatcaac atcgaggtgg ccgacagctg ggccacagc atcgagacaa    2400
gaagaaagat gaccaaggcc aacaacgaca acatgaagaa aaaggaggct atcggcgcca   2460
agctggtgga gctgggcctg agaaaggagg gcgaggtgag cggcaaggac atcgctagat   2520
acagactgtg ggagcagcag aaccgcatcg acctgtacac cggcaacaac atccccgagg   2580
ccgacgtgct gagcgggcag tacgacgtgg accacatcgt cccccttcagc ctgatcctgg   2640
acgacaccct gaacaacaag gtgctgaccg gcatgggcag caacagacaa gccaagagca   2700
acaccgcccc tagagagtac ctgagcgaca aggccgaggc cgagttcatc aagagagtga   2760
acgtgctgct gaagaaaaag atcagcaaga aaaagtatca gtacctgctg gtgaagaacc   2820
tgagagacag caagctgctg aacgagtgga gagcagaaaa catcaacgac acaagataca   2880
tcagcagatt cctggccaac tacctgaaca cacccgat cttcaacagc gacaagaaaa    2940
agaacgtgta cgccatcaac ggcgccatca agcagaat gagaaagatg tggctgaaca    3000
aaaagacctg gggcaacccc gagaagaaca gagaaacca cctgcaccac gccgccgatg   3060
ccatcgtgat cgccaacctg acccccgccg ccgtggagct ggctagcgaa aacctgaagc   3120
tgcagaacat cttccggcag aacgggaaaa gagtgaccga ggagtacgag aactacctgg   3180
acagagccgt gagaaagatc gagaagtact accactcaa ccccgagctg gccaagaagc    3240
tgctggtgag caaggacaga atccctagca tggtgagact gctgagagag gaaaccgaca   3300
agagactggt ggaccctagc ctggaggagt tcaagatggt gacccccgag agcttcgaca   3360
agaacctgga gcagtactac aacgaccccg agttcgtggc tagcattcag atgcccctgg   3420
tgagctacaa gcagagcaag agattcagcg gcagcttcac caaggacaag cccatcaaga   3480
aaaaggagag agaggacagc agcaccgtga gatcgacag cctgggcaac gagaacatcc   3540
tggacgccaa gagctactac tgcctggagg tgtacagcac aaaagacaaa aaaccgctc   3600
tgcggggcct gagatacgtg gacttcaagc tgaaggacaa gaagatgttc atcaccgtgg   3660
ccaaccccga gaattatggc aagcacatca tgtacctgtt caagaacgac tacatcgtgg   3720
tgtacaacaa gaagggcgag gagaaggcta gagcttcta cagcagcgtg aaggccatca   3780
caagagatca gctgtacctg aaggacaaca caccaacgt ggacatcatc ttcaccatca    3840
agaaggacga caccgtgaag aagtaccaca ttgacatcct ggggcagatc ggcggcgaga   3900
tcaagtcag cgccccctc ctgagcatca ccgagaaga agctagaag gcggagcgc       3960
gcggcgccgc cgccggcagc ggcagcccta agaaaaaacg aaaagttggc agcggaagca   4020
aaggccggc ggcacgaaa aggccggcc aggcaaaaaa gaaaagctc gagtaccat        4080
acgatgttcc agattacgct tgagaattcc ccttgagcat ctgacttctg gctaataaag   4140
gaaatttatt tcattgcaa tagtgtgtt gaattttttg tgtctctcag gtaccaaaaa     4200
aagcgctac ataatgtagc agcttaatga acaaaggagc ggaattgttc gggataccgc    4260

```
tataccctac ggcacataag gccttatctt agaactattg ttggatattg ataaactgac  4320
aatttctatc agtttatcaa tatccaacat agaactaaaa ccgcaatgat gatctccgag  4380
ccgttcggtg tttcgtcctt tccacaagat atataaagcc aagaaatcga aatactttca  4440
agttacggta agcatatgat agtccatttt aaaacataat tttaaaactg caaactaccc  4500
aagaaattat tactttctac gtcacgtatt ttgtactaat atctttgtgt ttacagtcaa  4560
attaattcca attatctctc taacagcctt gtatcgtata tgcaaatatg aaggaatcat  4620
gggaaatagg ccctcgcggc cgcaggaacc cctagtgatg gagttggcca ctccctctct  4680
gcgcgctcgc tcgctcactg aggccgggcg accaaaggtc gcccgacgcc cgggctttgc  4740
ccgggcggcc tcagtgagcg agcgagcgcg cagctgcctg caggggcgcc tgatgcggta  4800
ttttctcctt acgcatctgt gcggtatttc acaccgcata cgtcaaagca accatagtac  4860
gcgccctgta gcggcgcatt aagcgcggcg ggtgtggtgg ttacgcgcag cgtgaccgct  4920
acacttgcca gcgccttagc gcccgctcct ttcgctttct tcccttcctt tctcgccacg  4980
ttcgccggct ttccccgtca agctctaaat cgggggctcc ctttagggtt ccgatttagt  5040
gctttacggc acctcgaccc caaaaaactt gatttgggtg atggttcacg tagtgggcca  5100
tcgccctgat agacggtttt tcgccctttg acgttggagt ccacgttctt aatagtgga  5160
ctcttgttcc aaactggaac aacactcaac tctatctcgg gctattcttt tgatttataa  5220
gggattttgc cgatttcggt ctattggtta aaaaatgagc tgatttaaca aaaatttaac  5280
gcgaatttta acaaaatatt aacgtttaca attttatggt gcactctcag tacaatctgc  5340
tctgatgccg catagttaag ccagccccga cacccgccaa cacccgctga cgcgccctga  5400
cgggcttgtc tgctcccggc atccgcttac agacaagctg tgaccgtctc cgggagctgc  5460
atgtgtcaga ggttttcacc gtcatcaccg aaacgcgcga cgcaaaggg cctcgtgata  5520
cgcctatttt tataggttaa tgtcatgata ataatggttt cttagacgtc aggtggcact  5580
tttcggggaa atgtgcgcgg aaccccctatt tgtttatttt tctaaataca ttcaaatatg  5640
tatccgctca tgagacaata accctgataa atgcttcaat aatattgaaa aggaagagt  5700
atgagtattc aacatttccg tgtcgccctt attcccttt ttgcggcatt ttgccttcct  5760
gttttgctc acccagaaac gctggtgaaa gtaaaagatg ctgaagatca gttgggtgca  5820
cgagtgggtt acatcgaact ggatctcaac agcggtaaga tccttgagag ttttcgcccc  5880
gaagaacgtt ttccaatgat gagcactttt aaagttctgc tatgtggcgc ggtattatcc  5940
cgtattgacg ccgggcaaga gcaactcggt cgccgcatac actattctca gaatgacttg  6000
gttgagtact caccagtcac agaaaagcat cttacggatg gcatgacagt aagagaatta  6060
tgcagtgctg ccataaccat gagtgataac actgcggcca acttacttct gacaacgatc  6120
ggaggaccga aggagctaac cgcttttttg cacaacatgg gggatcatgt aactcgcctt  6180
gatcgttggg aacggagct gaatgaagcc ataccaaacg acgagcgtga ccacacgatg  6240
cctgtagcaa tggcaacaac gttgcgcaaa ctattaactg gcgaactact tactctagct  6300
tcccggcaac aattaataga ctggatggag gcggataaag ttgcaggacc acttctgcgc  6360
tcggcccttc cggctggctg gtttattgct gataaatctg gagccggtga gcgtggaagc  6420
cgcggtatca ttgcagcact ggggccagat ggtaagccct cccgtatcgt agttatctac  6480
acgacgggga gtcaggcaac tatggatgaa cgaaatagac agatcgctga gataggtgcc  6540
tcactgatta agcattggta actgtcagac caagtttact catatatact ttagattgat  6600
ttaaaacttc atttttaatt taaaaggatc taggtgaaga tccttttga taatctcatg  6660
accaaaatcc cttaacgtga gttttcgttc cactgagcgt cagaccccgt agaaaagatc  6720
aaaggatctt cttgagatcc ttttttctg cgcgtaatct gctgcttgca acaaaaaaa  6780
ccaccgctac cagcggtggt ttgtttgccg gatcaagagc taccaactct ttttccgaag  6840
gtaactggct tcagcagagc gcagatacca aatactgttc ttctagtgta gccgtagtta  6900
ggccaccact tcaagaactc tgtagcaccg cctacatacc tcgctctgct aatcctgtta  6960
ccagtggctg ctgccagtgg cgataagtcg tgtcttaccg ggttggactc aagacgatag  7020
ttaccggata aggcgcagcg gtcgggctga acggggggtt cgtgcacaca gcccagcttg  7080
gagcgaacga cctacaccga actgagatac ctacagcgtg agctatgaga aagcgccacg  7140
cttcccgaag ggagaaaggc ggacaggtat ccggtaagcg gcagggtcgg aacaggagag  7200
cgcacgaggg agcttccagg gggaaacgcc tggtatcttt atagtcctgt cgggtttcgc  7260
cacctctgac ttgagcgtcg atttttgtga tgctcgtcag ggggcggag cctatgaaa  7320
aacgccagca acgcggcctt tttacggttc ctggccttt gctggccttt tgctcacatg  7380
t                                                                 7381
```

SEQ ID NO: 43          moltype = RNA   length = 184
FEATURE                Location/Qualifiers
source                 1..184
                       mol_type = other RNA
                       organism = synthetic construct
SEQUENCE: 43
gaacggctcg agatcatca ttgcggtttt agttctatgt tggatattga taaactgata      60
gaaattgtca gtttatcaat atccaacaat agttctaaga taaggcctta tgtgccgtag    120
ggtatagcgg tatcccgaac aattccgctc ctttgttcat taagctgcta cattatgtag    180
cggc                                                                 184

SEQ ID NO: 44          moltype = DNA   length = 19
FEATURE                Location/Qualifiers
source                 1..19
                       PCR_primers =
                       fwd_seq:acgccacaaaaaaacgcgc,rev_seq:ccgactggaaagcgggcagtg
                       mol_type = other DNA
                       organism = synthetic construct
SEQUENCE: 44
acgccacaaa aaaacgcgc                                                  19

SEQ ID NO: 45          moltype = DNA   length = 21
FEATURE                Location/Qualifiers
source                 1..21
                       PCR_primers =

-continued

```
                    fwd_seq:acgccacaaaaaaacgcgc,rev_seq:ccgactggaaagcgggcagtg
                    mol_type = other DNA
                    organism = synthetic construct
SEQUENCE: 45
ccgactggaa agcgggcagt g                                             21

SEQ ID NO: 46       moltype = DNA   length = 440
FEATURE             Location/Qualifiers
source              1..440
                    mol_type = other DNA
                    organism = synthetic construct
SEQUENCE: 46
atgaccatga ttacggattc actggccgtc gttttacaac gtcgtgactg ggaaaaccct    60
ggcgttaccc aacttaatcg ccttgcagca catccccctt cgccagctgg cgtaatagc   120
gaagaggccc gcaccgatcg cccttcccaa cagttgcgca gcctgaatgg cgaatgcgc   180
tttgcctggt ttccggcacc agaagcggtg ccggaaagct ggctggagtg cgatcttcct   240
gaggccgata ctgtcgtcgt ccccctcaaac tggcagatgc acggttacga tgcgcccatc   300
tacaccaacg tgacctatcc cattacggtc aatccgccgt tgttcccac ggagaatccg    360
acgggttgtt actcgctcac atttaatgtt gatgaaagct ggctacagga aggccagacg   420
cgaattattt ttgatggcgt                                              440

SEQ ID NO: 47       moltype = RNA   length = 180
FEATURE             Location/Qualifiers
source              1..180
                    mol_type = other RNA
                    organism = synthetic construct
SEQUENCE: 47
tattacgcca gctggcgaaa gttttagttc tatgttggat attgataaac tgatacgaaa    60
ttgtcagttt atcaatatcc aacaatagtt ctaagataag gccttatgtg ccgtaggta   120
tagcggtatc cgaacaatt ccgctgcttt gagtattaag ctgctacatc atgtagcagc   180

SEQ ID NO: 48       moltype = RNA   length = 20
FEATURE             Location/Qualifiers
source              1..20
                    mol_type = other RNA
                    organism = synthetic construct
SEQUENCE: 48
tattacgcca gctggcgaaa                                               20

SEQ ID NO: 49       moltype = AA   length = 1569
FEATURE             Location/Qualifiers
source              1..1569
                    mol_type = protein
                    organism = synthetic construct
PEPTIDE             1..1569
                    note = APOBEC-1-Ca2-UGI fusion protein
SEQUENCE: 49
MKRTADGSEF ESPKKKRKVS SETGPVAVDP TLRRRIEPHE FEVFFDPREL RKETCLLYEI    60
NWGGRHSIWR HTSQNTNKHV EVNFIEKFTT ERYFCPNTRC SITWFLSWSP CGECSRAITE   120
FLSRYPHVTL FIYIARLYHH ADPRNRQGLR DLISSGVTIQ IMTEQESGYC WRNFVNYSPS   180
NEAHWPRYPH LWVRLYVLEL YCIILGLPPC LNILRRKQPQ LTFFTIALQS CHYQRLPPHI   240
LWATGLKSGG SSGGSSGSET PGTSESATPE SSGGSSGGSV DKRKIGIGLD VGIGSVGFAV   300
LSYDKVYDAR IEQVGVRLFD SGEEPKTKVS KNQGRRQYRA GRRLIRRRYH RKERAKRFIE   360
RIGLLSADKI KEWQEVNGNQ NIYYVRFRGL SEKLTPQEIA DCVIHFCNHR GYREFYEDDV   420
ADEKEAGKIK TALSRFDEKM AAGKYVSVAD MILHDNEFST NTQFPDFHNH KGDDDEKYFL   480
IKRAALRDEL RAILRKQQEF YEQLTEHNID FLCDDIVFVQ RDFEDGPGDK TDKKRKFMGF   540
LDSIGCCMFY KEEVRGYRST VIADIYSLVN GLSKMMYVDS TTGEITFLPE AADKIIDFAL   600
KNASITEKDI KEILKKYNLT LIKAEKLEEN IPQTIKTLKI LKKILDDSGY SYDELIKEEQ   660
FDFDRPSKLH ELCSLLASNI TPKRRRKALE KAGWNKALQE QTRRIHFGGT SNVCYRMLE   720
AIDAFRHGEL YGNFQARRNK EQLTDEAENT EKVRLLPPFT KEMDEDVVKN VVVFKAINET   780
RKIINALIGK YGSPAYINIE VADELGHSIE TRRKMTKANN EKMKKKEAIS TKLVELGLRK   840
EGEVSGKDIA RYRLWEQQDG IDLYTGENIP EADVLSGQYD IDHIIPFSLI LDDTLNNKVL   900
TGMGSNRQAK SNKAPREYLS DKAELEFIKR VNILLKKKII SKKKYKYLMV KNLRDSKLLD   960
EWKSRNINDT RYISRFLVNY LNNMLLFNSD KKKNVYAING AITSKMRKLW LNKRTWGTPE  1020
KNRENNLHHA ADAIVIANLT PAAVELASDN LKLQNIFRQN GKRVTEEYDN YLDKAVRKME  1080
KYYHLNEELA KNLLVRKDRI PSMVRSLREE TDKRLVDTSL EEFNMVTPEA FRKNLEQYYN  1140
DSDFVASIQM PLVSYKQSKR FSGSFTKDNP IKKKDKEDSS SVKMDSLGNE NILDAKSYYC  1200
LEVYSTKDNK TALRGLRYVD FKLKNKKMFI NVPNPDNGHI HIMYLFKNDY IVVYNKKGEE  1260
RIKGYYTGIK NIKANRFYLI SNNDAVRKDF TLSKDDTIKK YHIDILGQIG GEVKCSAPFL  1320
SITEKESGGS GGSGGSGGSG GSTNLSDIIE KETGKQLVIQ ESILMLPEEV EEVIGNKPES  1380
DILVHTAYDE STDENVMLLT SDAPEYKPWA LVIQDSNGEN KIKMLSGGSS GSGGSTNLSD  1440
IIEKETGKQL VIQESILMLP EEVEEVIGNK PESDILVHTA YDESTDENVM LLTSDAPEYK  1500
PWALVIQDSN GENKIKMLSG GSKRTADGSE FPKKKRKVGS GSKRPAATKK AGQAKKKKLE  1560
YPYDVPDYA                                                          1569

SEQ ID NO: 50       moltype = DNA   length = 7730
FEATURE             Location/Qualifiers
source              1..7730
                    mol_type = other DNA
```

```
                     organism = synthetic construct
                     plasmid = CBE-Ca2-LacZgRNA02
SEQUENCE: 50
catgattcct tcatatttgc atatacgagc ggccgccata gtacgcgccc tgtagcggcg    60
cattaagcgc ggcgggtgtg gtggttacgc gcagcgtgac cgctacactt gccagcgcct   120
tagcgcccgc tccttccgct ttcttccctt cctttctcgc cacgttcgcc ggctttcccc   180
gtcaagctct aaatcggggg ctcccttag ggttccgatt tagtgcttta cggcacctcg   240
accccaaaaa acttgatttg ggtgatggtt cacgtagtgg gccatcgccc tgatagacgg   300
tttttcgccc tttgacgttg gagtccacgt tctttaatag tggactcttg ttccaaactg   360
gaacaacact caactctatc tcgggctatt cttttgattt ataagggatt ttgccgattt   420
cggtctattg gttaaaaaat gagctgattt aacaaaaatt taacgcgaat tttaacaaaa   480
tattaacgtt tacaatttta tggtgcactc tcagtacaat ctgctctgat gccgcatagt   540
taagccagcc ccgacacccg ccaacacccg ctgacgcgcc ctgacgggct tgtctgctcc   600
cggcatccgc ttacagacaa gctgtgaccg tctccggagc ctgcatgtgt cagaggtttt   660
caccgtcatc accgaaacgc gcgagacgaa agggcctcgt gatacgccta ttttttatagg   720
ttaatgtcat gataataatg gtttcttaga cgtcaggtgg cacttttcgg ggaaatgtgc   780
gcggaaccc tatttgttta tttttctaaa tacattcaaa tatgtatccg ctcatgagac   840
aataaccctg ataaatgctt caataatatt gaaaaaggaa gagtatgagt attcaacatt   900
tccgtgtcgc ccttattccc ttttttgcgg cattttgcct tcctgttttt gctcacccag   960
aaacgctggt gaaagtaaaa gatgctgaag atcagttggg tgcacgagtg ggttacatcg  1020
aactggatct caacagcggt aagatccttg agagttttcg ccccgaagaa cgttttccaa  1080
tgatgagcac ttttaaagtt ctgctatgtg gcgcggtatt atcccgtatt gacgccggc   1140
aagagcaact cggtcgccgc atacactatt ctcagaatga cttggttgag tactcaccag  1200
tcacagaaaa gcatcttacg gatggcatga cagtaagaga attatgcagt gctgccataa  1260
ccatgagtga taacactgcg gccaacttac ttctgacaac gatcggagga ccgaaggagc  1320
taaccgcttt tttgcacaac atgggggatc atgtaactcg ccttgatcgt tgggaaccgg  1380
agctgaatga agccatacca aacgacgagc gtgacaccac gatgcctgta gcaatggcaa  1440
caacgttgcg caaactatta actggcgaac tacttactct agcttcccgg caacaattaa  1500
tagactggat ggaggcggat aaagttgcag gaccacttct gcgctcggcc cttccggctg  1560
gctggtttat tgctgataaa tctggagccg gtgagcgtgg aagccgcggt atcattgcag  1620
cactggggcc agatggtaag ccctcccgta tcgtagttat ctacacgacg gggagtcagg  1680
caactatgga tgaacgaaat agacagatcg ctgagatagg tgcctcactg attaagcatt  1740
ggtaactgtc agaccaagtt tactcatata ctttagat tgatttaaaa cttcattttt  1800
aatttaaaag gatctaggtg aagatccttt ttgataatct catgaccaaa atcccttaac  1860
gtgagttttc gttccactga gcgtcagacc ccgtagaaaa gatcaaagga tcttcttgag  1920
atcctttttt tctgcgcgta atctgctgct tgcaaacaaa aaaaccaccg ctaccagcgg  1980
tggtttgttt gccggatcaa gagctaccaa ctcttttcc gaaggtaact ggcttcagca   2040
gagcgcagat accaaatact gttcttctag tgtagccgta gttaggccac cacttcaaga  2100
actctgtagc accgcctaca tacctgctc tgctaatcct gttaccagtg gctgctgcca  2160
gtggcgataa gtcgtgtctt accgggttgg actcaagacg atagttaccg gataaggcgc  2220
agcggtcggg ctgaacgggg ggttcgtgca cacagcccag cttggagcga acgacctaca  2280
ccgaactgag atacctacag cgtgagctat gagaaagcgc cacgcttccc gaagggagaa  2340
aggcggacag gtatccggta agcggcaggg tcggaacagg agagcgcacg agggagcttc  2400
cagggggaaa cgcctggtat ctttatagtc ctgtcgggtt tcgccacctc tgacttgagc  2460
gtcgattttt gtgatgctcg tcagggggggc ggagcctatg gaaaaacgcc agcaacgcgg  2520
cctttttacg gttcctggcc ttttgctggc cttttgctca catgtcaatt gacattgatt  2580
attgactagt ccggtttac acttttatgct tccggctcgt ataatgtgtg gattttgagt  2640
taggatctaa agaggagaaa accggtgcca ccatgaaacg gacagccgac ggaagcgagt  2700
tcgagtcacc aaaaaagaag cggaaagtct cctcagagac tgggcctgtc gccgtcgatc  2760
caaccctgcg ccgccggatt gaacctcacg agtttgaagt gttctttgac ccccgggagc  2820
tgagaaagga gacatgcctg ctgtacgaga tcaactggggg aacgtca tccatctgccaa  2880
ggcacacctc tcagaacaca aataagcacg tggaggtgaa cttcatcgag aagtttacca  2940
cagagcggta cttctgcccc aataccagat gtagcatcac atggtttctg agctggtccc  3000
cttgcgagag tgtgcagg gccatcaccg agttcctgtc cagatatcca cacgtgacac  3060
tgtttatcta catcgccagg ctgtatcacc acgcagacca aaggaatagg caggggctgc  3120
gcgatctgat cagctccggc gtgaccatca agatcatgac agagcaggag tccggctact  3180
gctggcggaa cttcgtgaat tattctccta gcaacgaggc ccactggcct aggtacccac  3240
acctgtgggt gcgcctgtac gtgctggagc tgtattgcat catcctgggc ctgcccctt    3300
gtctgaatat cctgcggaga aagcagcccc agctgacctt ctttacaatc gccctgcagt  3360
cttgtcacta tcagaggctg ccaccccaca tcctgtgggc cacaggcctg aagtctggga  3420
gatctagcgg aggatcctct ggcagcgaga caccaggaac aagcgagtca gcaacaccag  3480
agagcagtgg cggcagcagc ggcggcagcg tcgacaagag aaagatcggc atcggcctga  3540
acgtgggcat cggcagcgtg ggcttcgccg tgctgagcta cgacaaggtg tacgacgcca  3600
gaatcgagca ggtgggcgtg agactgttcg acagcgggcga accaaggtga gcaagagttc  3660
gcaagaacca gggcagaaga cagtacgagg ccggcagaag actgatcaga gaagatacc   3720
acagaaagga gagagccaaa gattcatcg agagaatcgg cctgctgagc gccgacaaga  3780
tcaaggagtg gcaggaggtg aacggcaacc agaacatcta ctacgtgaga ttcagaggcc  3840
tgagcgagaa gctgaccccc caggagatcg ccgactgcgt gatccacttc tgcaaccaca  3900
gaggctacag agagttctac gaggacgacg tggccgacga gaagatca   3960
agaccgccct gagcagattc gacgagaaga tggccgccgg caagtacgtg agcgtggccg  4020
acatgatcct gcacgacaac gagttcagca ccaacccca gttccccgac ttccacaacc  4080
acaagggcga cgacgacgag aagtacttcc tgatcaagag agccgccctg agagacgagc  4140
tgagagcctt cctgagaaag cagcaggagt ctacgagca gctgaccgag cacaacatcg  4200
acttcctgtg cgacgatcg tgttcgtgc agagagacctt ccgggcgacttc   4260
agaccgacaa gaagagaaag ttcatgggct tcctggacag catcggctgc tgcatgttct  4320
acaaggagga ggtgagaggc tacagaagca ccgtgatcgc cgacatctac agcctggtga  4380
acggcctgag caagatgatg tacgtggaca gcaccaccgg cgagatcacc ttcctgccca  4440
aggccgccga caagatcatc gacttcgccc tgaagaacgc cagcatcacc gagaaggaca  4500
tcaaggagat cctgaagaag tacaacctga ccctgatcaa ggcgagaag ctggaggaga  4560
```

```
acatccccca gaccatcaag accctgaaga tcctgaagaa gatcctggac gacagcggct  4620
acagctacga cgagctgatc aaggaggagc agttcgactt cgacagaccc agcaagctgc  4680
acgagctgtg cagcctgctg gccagcaaca tcaccccccaa gagaagaaga aaggccctgg  4740
agaaggccga ctggaacaag gccctgcagg agcagaccag aagaatccac ttcggcggca  4800
ccagcaacgt gtgctacaga tacatgctgg aggccatcga cgccttcaga cacggcgagc  4860
tgtacggcaa cttccaggcc agaagaaaca aggagcagct gaccgacgag gccgagaaca  4920
ccgagaaggt gagactgctg ccccccttca ccaaggagat ggacgaggac gtggtgaaga  4980
acgtggtggt gttcaaggcc atcaacgaga caagaaagat catcaacgcc ctgatcggca  5040
agtacggcag ccccgcctac atcaacatcg aggtggccga cgagctgggc cacagcatcg  5100
agacaagaag aaagatgacc aaggccaaca acgagaagat gaagaagaag gaggccatca  5160
gcaccaagct ggtggagctg ggcctgaaga aggagggcga ggtgagcggc aaggacatcg  5220
ccagatacag actgtgggag cagcaggacg gcatcgacct gtacaccggc gagaacatcc  5280
ccgaggccga cgtgctgagc ggccagtacg acatcgacca tcatccccc ttcagcctga  5340
tcctggacga caccctgaac aacaaggtgc tgaccggcga tggcagcaac agacaggcca  5400
agagcaacaa ggcccccaga gagtacctga cgcacaaggc cgagctggag ttcatcaaga  5460
gagtgaacat cctgctgaag aagaaagatca tcagcaagaa gaagtacaag tacctgatgg  5520
tgaagaacct gagagacagc aagctgctgg acgagtggaa gagcagaaac atcaacgaca  5580
ccagatacat cagcagattc ctggtgaact acctgaacaa catgctgctg ttcaacacgcg  5640
acaagaagaa gaacgtgtac gccatcaacg cgccatcac cagcaagatg agaaagctgt  5700
ggctgaacaa gagaacctgg ggcacccccg agaagaacag agagaacaac ctgcaccacg  5760
ccgccgacgc catcgtgatc gccaacctga ccccccgccg cgtggagctg gccagcgaca  5820
acctgaagct gcagaacatc ttcagacaga acggcaagag agtgaccgag gagtacgaca  5880
actacctgga caaggccgtg agaaagatgg agaagtacta ccacctgaac gaggagctgg  5940
ccaagaaacct gctggtgaga aaggacagaa tccccagcat ggtgagaagc ctgagagagg  6000
agacagacaa gagactggtg gacaccagcc tggaggagtt caatatggtg acccccgagg  6060
ccttcagaaa gaacctggag cagtactaca cgacacgca cttcgtggcc agcatccaga  6120
tgccctggt gagctacaag cagagcaaga gattcagcgg cagcttcacc aaggacaacc  6180
ccatcaagaa gaaggacaag gaggacagca gcagcgtgaa gatggacagc ctgggcaacg  6240
agaacatcct ggacgccaag agctactact gcctggaggt gtacagcacc aaggacaaca  6300
agaccgccct gagaggcctg agatacgtgg acttcaagct gaagaacaag aagatgttca  6360
tcaacgtgcc caaccccgac aactacgaca gcacatcat gtacctgttc aagaacgact  6420
acatcgtggt gtacaacaag aagggcgagg agagaatcaa gggctactac accggcatca  6480
gaacatcaa ggcaacaga ttctacctga tcagcaacaa cgacgccgtg agaaaggact  6540
tcacccctgag caaggacgac accatcaaga agtaccacat cgacctcctg ggccagatga  6600
gcggcgaggt gaagtgcagc gccccccttcc tgagcatcac cgagaaggag agcggcggga  6660
gcggcgggag cggcgggagc ggcgggagcg gggggagcac taatctgagc gacatcattg  6720
agaaggagac tggaaacag ctggtcattc aggagtccat cctgatgctg cctgaggagg  6780
tggaggaagt gatcggcaac aagccagagt ctgcatcct ggtgcacacc gcctacgacg  6840
agtccaacaga tgagaatgtg atgctgctga cctctgacga ccccgagtat aagccttcgg  6900
ccctggtcat ccaggattct aacggcgaga ataagatcaa gatgctgagc ggaggatccg  6960
gaggatctgg aggcagcacc aacctgtctc acatcatcga aggagagaca ggcaagcagc  7020
tggtcatcca ggagagcatc ctgatgctgc ccgaagaagt cgaagaagtg atcggaaaca  7080
agcctggaga cgatatcctg gtccataccg cctacgacga gagtaccgac gaaaatgtga  7140
tgctgctgac atccgacgcc ccagagtata gccctgggc tctggtcatc caggattcca  7200
acggagagaa caaaatcaaa atgctgtctg cggctcaaa agaaccgcc gacggcagcg  7260
aatttcctaa gaaaaaacga aaagttgca gcggaagcaa aaggccgggcg ccacgaaaa  7320
aggccggcca ggcaaaaaag aaaaagctcg agtacccata cgatgttcca gattacgctt  7380
gagaattcta gaataacctg aggtaccgtt aacaaataaa acgaaaggct cagtcgaaag  7440
actgggcctt tcgttttatc tgttgtttgc ggtgaacgct ctcgtcgact tgacagctag  7500
ctcagtccta ggtataatac tagttattac gccagctggc gaaagttta gttctatgtt  7560
ggatattgat aaactgatac gaaattgtca gtttatcaat atccaacaat agttctaaga  7620
taaggcctta tgtgccgtag ggtatagcgg tatcccgaac aattccgctg ctttgagtat  7680
taagctgcta catcatgtag cagctttttt ctcgaggttt aaacagatct              7730

SEQ ID NO: 51         moltype = DNA   length = 94
FEATURE               Location/Qualifiers
source                1..94
                      mol_type = other DNA
                      organism = synthetic construct
SEQUENCE: 51
cgcaaacctg gcgccagtgt ctaaatgtcc atcattctca gaccaacaga gctgtctgtg   60
tgttatttgg gaggtgggag ggaaggaaaa ggtg                               94

SEQ ID NO: 52         moltype = DNA   length = 49
FEATURE               Location/Qualifiers
source                1..49
                      mol_type = other DNA
                      organism = synthetic construct
SEQUENCE: 52
cgcaaacctg gcgccagtgt ctaaatgtcc atcattctca gaccaacag                49

SEQ ID NO: 53         moltype = DNA   length = 45
FEATURE               Location/Qualifiers
source                1..45
                      mol_type = other DNA
                      organism = synthetic construct
SEQUENCE: 53
agctgtctgt gtgttatttg ggaggtggga gggaaggaaa aggtg                    45
```

```
SEQ ID NO: 54              moltype = DNA    length = 103
FEATURE                    Location/Qualifiers
source                     1..103
                           mol_type = other DNA
                           organism = synthetic construct
SEQUENCE: 54
tggaggcctc ctgtgtggtc tctacctgtc catgccgagg ggtcacctct gggtgaggtc    60
gcacccaccc ccctcacggg gctgctttgc cagaaggtct gtt                    103

SEQ ID NO: 55              moltype = DNA    length = 51
FEATURE                    Location/Qualifiers
source                     1..51
                           mol_type = other DNA
                           organism = synthetic construct
SEQUENCE: 55
tggaggcctc ctgtgtggtc tctacctgtc catgccgagg ggtcacctct g             51

SEQ ID NO: 56              moltype = DNA    length = 52
FEATURE                    Location/Qualifiers
source                     1..52
                           mol_type = other DNA
                           organism = synthetic construct
SEQUENCE: 56
ggtgaggtcg cacccacccc cctcacgggg ctgctttgcc agaaggtctg tt             52

SEQ ID NO: 57              moltype = DNA    length = 80
FEATURE                    Location/Qualifiers
source                     1..80
                           mol_type = other DNA
                           organism = synthetic construct
SEQUENCE: 57
gcgttaccca acttaatcgc cttgcagcac atccccctttt cgccagctgg cgtaatagcg    60
aagaggcccg caccgatcgc                                                80

SEQ ID NO: 58              moltype = DNA    length = 80
FEATURE                    Location/Qualifiers
source                     1..80
                           mol_type = other DNA
                           organism = synthetic construct
SEQUENCE: 58
cgcaatgggt tgaattagcg gaacgtcgtg tagggggaaa gcggtcgacc gcattatcgc    60
ttctccgggc gtggctagcg                                                80

SEQ ID NO: 59              moltype = AA     length = 27
FEATURE                    Location/Qualifiers
source                     1..27
                           mol_type = protein
                           organism = synthetic construct
SEQUENCE: 59
GVTQLNRLAA HPPFASWRNS EEARTDR                                        27

SEQ ID NO: 60              moltype = DNA    length = 80
FEATURE                    Location/Qualifiers
source                     1..80
                           mol_type = other DNA
                           organism = synthetic construct
variation                  49
                           note = n is a or g
SEQUENCE: 60
gcgttaccca acttaatcgc cttgcagcac atccccctttt cgccagctng cgtaatagcg    60
aagaggcccg caccgatcgc                                                80

SEQ ID NO: 61              moltype = AA     length = 1368
FEATURE                    Location/Qualifiers
source                     1..1368
                           mol_type = protein
                           organism = Anaerovibrio sp.
SEQUENCE: 61
MDKKYSIGLD IGTNSVGWAV ITDEYKVPSK KFKVLGNTDR HSIKKNLIGA LLFDSGETAE    60
ATRLKRTARR RYTRRKNRIC YLQEIFSNEM AKVDDSFFHR LEESFLVEED KKHERHPIFG   120
NIVDEVAYHE KYPTIYHLRK KLVDSTDKAD LRLIYLALAH MIKFRGHFLI EGDLNPDNSD   180
VDKLFIQLVQ TYNQLFEENP INASGVDAKA ILSARLSKSR RLENLIAQLP GEKKNGLFGN   240
LIALSLGLTP NFKSNFDLAE DAKLQLSKDT YDDDLDNLLA QIGDQYADLF LAAKNLSDAI   300
LLSDILRVNT EITKAPLSAS MIKRYDEHHQ DLTLLKALVR QQLPEKYKEI FFDQSKNGYA   360
GYIDGGASQE EFYKFIKPIL EKMDGTEELL VKLNREDLLR KQRTFDNGSI PHQIHLGELH   420
AILRRQEDFY PPLKDNREKI EKILTFRIPY YVGPLARGNS RFAWMTRKSE ETITPWNFEE   480
VVDKGASAQS FIERMTNFDK NLPNEKVLPK HSLLYEYFTV YNELTKVKYV TEGMRKPAFL   540
SGEQKKAIVD LLFKTNRKVT VKQLKEDYFK KIECFDSVEI SGVEDRFNAS LGTYHDLLKI   600
IKDKDFLDNE ENEDILEDIV LTLTLFEDRE MIEERLKTYA HLFDDKVMKQ LKRRRYTGWG   660
```

```
RLSRKLINGI RDKQSGKTIL DFLKSDGFAN RNFMQLIHDD SLTFKEDIQK AQVSGQGDSL  720
HEHIANLAGS PAIKKGILQT VKVVDELVKV MGRHKPENIV IEMARENQTT QKGQKNSRER  780
MKRIEEGIKE LGSQILKEHP VENTQLQNEK LYLYYLQNGR DMYVDQELDI NRLSDYDVDH  840
IVPQSFLKDD SIDNKVLTRS DKNRGKSDNV PSEEVVKKMK NYWRQLLNAK LITQRKFDNL  900
TKAERGGLSE LDKAGFIKRQ LVETRQITKH VAQILDSRMN TKYDENDKLI REVKVITLKS  960
KLVSDFRKDF QFYKVREINN YHHAHDAYLN AVVGTALIKK YPKLESEFVY GDYKVYDVRK 1020
MIAKSEQEIG KATAKYFFYS NIMNFFKTEI TLANGEIRKR PLIETNGETG EIVWDKGRDF 1080
ATVRKVLSMP QVNIVKKTEV QTGGFSKESI LPKRNSDKLI ARKKDWDPKK YGGFDSPTVA 1140
YSVLVVAKVE KGKSKKLKSV KELLGITIME RSSFEKNPID FLEAKGYKEV KKDLIIKLPK 1200
YSLFELENGR KRMLASAGEL QKGNELALPS KYVNFLYLAS HYEKLKGSPE DNEQKQLFVE 1260
QHKHYLDEII EQISEFSKRV ILADANLDKV LSAYNKHRDK PIREQAENII HLFTLTNLGA 1320
PAAFKYFDTT IDRKRYTSTK EVLDATLIHQ SITGLYETRI DLSQLGGD              1368

SEQ ID NO: 62           moltype = AA  length = 1053
FEATURE                 Location/Qualifiers
source                  1..1053
                        mol_type = protein
                        organism = Anaerovibrio sp.
SEQUENCE: 62
MKRNYILGLD IGITSVGYGI IDYETRDVID AGVRLFKEAN VENNEGRRSK RGARRLKRRR   60
RHRIQRVKKL LFDYNLLTDH SELSGINPYE ARVKGLSQKL SEEEFSAALL HLAKRRGVHN  120
VNEVEEDTGN ELSTKEQISR NSKALEEKYV AELQLERLKK DGEVRGSINR FKTSDYVKEA  180
KQLLKVQKAY HQLDQSFIDT YIDLLETRRT YYEGPGEGSP FGWKDIKEWY EMLMGHCTYF  240
PEELRSVKYA YNADLYNALN DLNNLVITRD ENEKLEYYEK FQIIENVFKQ KKKPTLKQIA  300
KEILVNEEDI KGYRVTSTGK PEFTNLKVYH DIKDITARKE IIENAELLDQ IAKILTIYQS  360
SEDIQEELTN LNSELTQEEI EQISNLKGYT GTHNLSLKAI NLILDELWHT NDNQIAIFNR  420
LKLVPKKVDL SQQKEIPTTL VDDFILSPVV KRSFIQSIKV INAIIKKYGL PNDIIIELAR  480
EKNSKDAQKM INEMQKRNRQ TNERIEEIIR TTGKENAKYL IEKIKLHDMQ EGKCLYSLEA  540
IPLEDLLNNP FNYEVDHIIP RSVSFDNSFN NKVLVKQEEA SKKGNRTPFQ YLSSSDSKIS  600
YETFKKHILN LAKGKGRISK TKKEYLLEER DINRFSVQKD FINRNLVDTR YATRGLMNLL  660
RSYFRVNNLD VKVKSINGGF TSFLRRKWKF KKERNKGYKH HAEDALIIAN ADFIFKEWKK  720
LDKAKKVMEN QMFEEKQAES MPEIETEQEY KEIFITPHQI KHIKDFKDYK YSHRVDKKPN  780
RELINDTLYS TRKDDKGNTL IVNNLNGLYD KDNDKLKKLI NKSPEKLLMY HHDPQTYQKL  840
KLIMEQYGDE KNPLYKYYEE TGNYLTKYSK KDNGPVIKKI KYYGNKLNAH LDITDDYPNS  900
RNKVVKLSLK PYRFDVYLDN GVYKFVTVKN LDVIKKENYY EVNSKAYEEA KKLKKISNQA  960
EFIASFYNND LIKINGELYR VIGVNNDLLN RIEVNMIDIT YREYLENMND KRPPRIIKTI 1020
ASKTQSIKKY STDILGNLYE VKSKKHPQII KKG                              1053

SEQ ID NO: 63           moltype = DNA  length = 20
FEATURE                 Location/Qualifiers
source                  1..20
                        mol_type = other DNA
                        organism = synthetic construct
SEQUENCE: 63
tttcgccagc tggcgtaata                                               20
```